US007003495B1

(12) United States Patent
Burger et al.

(10) Patent No.: US 7,003,495 B1
(45) Date of Patent: Feb. 21, 2006

(54) PORTABLE ELECTRONIC AUTHORIZATION SYSTEM AND METHOD

(75) Inventors: Todd O. Burger, Lexington, MA (US); Rob Cohen, Sudbury, MA (US); Karlin Jessen, Reading, MA (US); Joshua Hassol, Lexington, MA (US); Stuart Lipoff, Newton, MA (US)

(73) Assignee: Chameleon Network Inc., Concord, MA (US)

( * ) Notice: Subject to any disclaimer, the term of this patent is extended or adjusted under 35 U.S.C. 154(b) by 409 days.

(21) Appl. No.: 09/675,438

(22) Filed: Sep. 28, 2000

Related U.S. Application Data

(60) Provisional application No. 60/156,356, filed on Sep. 28, 1999, provisional application No. 60/167,050, filed on Nov. 23, 1999, provisional application No. 60/184,425, filed on Feb. 23, 2000, provisional application No. 60/217,542, filed on Jul. 12, 2000.

(51) Int. Cl.
*G06F 17/60* (2006.01)

(52) U.S. Cl. .................. 705/50; 235/375; 235/379; 235/380; 235/487; 235/492; 705/14; 705/26; 705/27; 705/39; 705/40; 705/41; 705/44; 705/68; 705/75; 380/30; 713/172

(58) Field of Classification Search ................ 705/67, 705/39–41, 26, 14, 27, 68, 44, 50, 75; 713/200, 713/201, 202, 172; 235/375, 379, 380, 487; 235/492; 710/33; 380/30
See application file for complete search history.

(56) References Cited

U.S. PATENT DOCUMENTS

| | | | |
|---|---|---|---|
| 4,701,601 A | 10/1987 | Francini et al. | |
| 4,791,283 A | 12/1988 | Burkhardt | |
| 4,868,376 A * | 9/1989 | Lessin et al. | ............... 235/492 |
| 5,276,311 A | 1/1994 | Hennige | |
| 5,386,104 A | 1/1995 | Sime | .......................... 235/379 |
| 5,544,246 A | 8/1996 | Mandelbaum et al. | ........ 380/23 |
| 5,546,471 A | 8/1996 | Merjanian | ................... 382/124 |

(Continued)

FOREIGN PATENT DOCUMENTS

DE     198 16 117 A1     10/1999

(Continued)

OTHER PUBLICATIONS

Rocket Librarian User guide (Oct. 29, 1999), v1.2; Nuvo-MEdia, Inc. 34 pages. Retrieved from IDS.*

(Continued)

*Primary Examiner*—James A Reagan
(74) *Attorney, Agent, or Firm*—Wolf, Greenfield & Sacks, P.C.

(57) ABSTRACT

In one embodiment an apparatus includes a housing; a user authenticator, supported by the housing, that authenticates an identity of a user; at least one memory, supported by the housing, that stores transaction information for at least first and second media; and at least one output, supported by the housing, that releases at least a portion of the transaction information to a point-of-sale (POS) terminal after the user authenticator has authenticated the identity of the user. In another embodiment, a method involves steps of: storing transaction information for at least first and second media in a memory of a device; receiving as input a user's selection of one of the at least first and second media; displaying a visual indication to the user regarding which of the at least first and second media has been selected; and transferring at least a portion of the transaction information from the device to a point-of-sale (POS) terminal.

39 Claims, 25 Drawing Sheets

U.S. PATENT DOCUMENTS

| | | | |
|---|---|---|---|
| 5,546,523 A * | 8/1996 | Gatto | 345/811 |
| 5,585,787 A | 12/1996 | Wallerstein | |
| 5,590,038 A | 12/1996 | Pitroda | |
| 5,598,474 A | 1/1997 | Johnson | 380/23 |
| 5,598,792 A | 2/1997 | Wales | |
| 5,623,552 A | 4/1997 | Lane | 382/124 |
| 5,745,574 A | 4/1998 | Muftic | 380/23 |
| 5,748,737 A | 5/1998 | Daggar | 380/24 |
| 5,777,903 A | 7/1998 | Piosenka et al. | |
| 5,815,657 A | 9/1998 | Williams et al. | 395/186 |
| 5,854,891 A * | 12/1998 | Postlewaite et al. | 713/202 |
| 5,867,795 A | 2/1999 | Novis et al. | 455/566 |
| 5,870,723 A | 2/1999 | Pare, Jr. et al. | 705/39 |
| 5,907,142 A | 5/1999 | Kelsey | 235/380 |
| 5,915,023 A | 6/1999 | Bernstein | 380/24 |
| 5,917,913 A | 6/1999 | Wang | 380/25 |
| 5,920,640 A | 7/1999 | Salatino et al. | 382/124 |
| 5,940,525 A | 8/1999 | Itsumi | 382/124 |
| 5,943,423 A | 8/1999 | Muftic | 380/25 |
| 5,974,146 A | 10/1999 | Randle et al. | 380/24 |
| 5,978,496 A | 11/1999 | Harkin | 382/124 |
| 5,979,773 A | 11/1999 | Findley, Jr. et al. | 235/492 |
| 5,982,913 A | 11/1999 | Brumbley et al. | 382/124 |
| 6,012,636 A * | 1/2000 | Smith | 235/380 |
| 6,038,551 A | 3/2000 | Barlow et al. | |
| 6,095,416 A * | 8/2000 | Grant et al. | 235/449 |
| 6,182,892 B1 * | 2/2001 | Angelo et al. | 235/380 |
| 6,188,309 B1 | 2/2001 | Levine | |
| 6,282,656 B1 * | 8/2001 | Wang | 713/201 |
| 6,308,887 B1 | 10/2001 | Korman et al. | |
| 6,334,121 B1 | 12/2001 | Primeaux et al. | |
| 6,374,757 B1 | 4/2002 | Farkash | |
| 6,545,605 B1 | 4/2003 | Van Horn et al. | |
| D490,840 S | 6/2004 | Arakaki et al. | |
| D491,186 S | 6/2004 | Arakaki et al. | |
| D491,953 S | 6/2004 | Arakaki et al. | |
| D496,365 S | 9/2004 | Liu et al. | |
| D498,236 S | 11/2004 | Liu et al. | |
| D506,998 S | 7/2005 | Liu et al. | |
| 2001/0039512 A1 | 11/2001 | Nicholson | |
| 2002/0040321 A1 | 4/2002 | Nicholson | |
| 2002/0052193 A1 | 5/2002 | Chetty | |
| 2002/0062251 A1 | 5/2002 | Anandan et al. | |
| 2002/0077992 A1 | 6/2002 | Tobin | |
| 2002/0093426 A1 | 7/2002 | Jackson et al. | |
| 2003/0106935 A1 | 6/2003 | Burchette, Jr. | |
| 2003/0218066 A1 | 11/2003 | Fernandes et al. | |
| 2004/0029569 A1 | 2/2004 | Khan et al. | |
| 2004/0094624 A1 | 5/2004 | Fernandes et al. | |
| 2004/0159700 A1 | 8/2004 | Khan et al. | |
| 2004/0260608 A1 | 12/2004 | Lewis et al. | |

FOREIGN PATENT DOCUMENTS

| | | |
|---|---|---|
| EP | 0 791 899 A2 | 8/1997 |
| EP | 0 791 899 A3 | 8/1997 |
| EP | 1 231 578 A | 8/2002 |
| GB | 2 298 505 | 9/1996 |
| WO | WO 94/17498 | 8/1994 |
| WO | WO 95/35546 | 12/1995 |
| WO | WO 98/12670 A1 | 3/1998 |
| WO | WO 99/08238 | 2/1999 |
| WO | WO 99/27492 | 6/1999 |
| WO | WO 99/34314 | 7/1999 |
| WO | WO 99/38117 A1 * | 7/1999 |
| WO | WO 00/51010 A1 | 8/2000 |
| WO | WO 01/24123 A1 | 4/2001 |
| WO | WO 01/65360 A2 | 9/2001 |
| WO | WO 01/65360 A3 | 9/2001 |
| WO | WO 03/029942 A2 | 4/2003 |

OTHER PUBLICATIONS

Matthew French, One Card For All Charges, The Pocket Vaults, Mass High Tech—The Journal of New England Technology, Apr. 9, 2001.

RocketLibrarian™ User's Guide (Macintosh Version) version 1.2, NuvoMedia, Inc. (published sometime prior to Oct. 29, 1999), 34 pgs.

Queuecard Web Site downloaded on Jul. 22, 2005 from website http://www.queuecard.com/index.html "Home" page.

Queuecard Web Site downloaded on Jul. 22, 2005 from website http://www.queuecard.com/prod/index.html "Products" page.

Vivotech Web Site downloaded on Jul. 22, 2005 from website http://www.vivotech.com/aboutus/"About Us" page.

Vivotech, Vivowallet™ Literature downloaded on Jul. 22, 2005 from website http://www.viveotech.com (2 pages).

* cited by examiner

US 7,003,495 B1

PORTABLE ELECTRONIC AUTHORIZATION SYSTEM AND METHOD

RELATED APPLICATIONS

This application claims the benefit of each of the following U.S. Provisional Patent Applications: (1) Application Ser. No. 60/156,356, filed Sep. 28, 1999; (2) Application Ser. No. 60/167,050, filed Nov. 23, 1999; (3) Application Ser. No. 60/184,425, filed Feb. 23, 2000; and (4) Application Ser. No. 60/217,542, filed Jul. 12, 2000.

FIELD OF THE INVENTION

The present inventions are directed to novel systems and methods for engaging in transactions involving financial and/or non-financial media.

BACKGROUND OF THE INVENTION

People often times carry wallets with them when they engage in their day to day activities. A typical wallet is made of leather or other suitable material, and is generally a foldable structure that readily fits into a pocket or purse. A wallet typically includes a number of pockets, pouches, or the like for storing items such as a driver's license, a social security card, identification cards, credit cards, debit cards, membership cards, commuter passes, access tools, business cards, cash, coupons, event tickets, transportation tickets, frequent customer cards (e.g., a frequent flier card), medical information cards, receipts, photographs, etc.

Wallets are frequently stolen, lost, or misplaced. When any of these events occurs, not only must the wallet itself be replaced, but all of the contents of the wallet must be replaced as well. As anyone who has lost a wallet can testify, replacing the contents of a wallet can be cumbersome and expensive. In addition, if a wallet is stolen or if a lost wallet falls into the wrong hands, the contents of the wallet may be used to engage in unauthorized activities which financially detriment the wallet owner, as well as any banks, credit issuers, and/or other institutions that issued financial media to the wallet owner.

While the wallet owner is generally able to "cancel" financial media in such situations by contacting the respective financial media issuers, often times this is done too late, i.e., after one or more media have been exploited by the unauthorized user. In some cases, the wallet owner may not recall all of the contents of the now stolen wallet, and so fail to report the theft of one or more items. Further, in addition to any cash contained in a lost or stolen wallet, many media issued by non-financial media issuers have a significant cash value, e.g., transportation tickets, event tickets, commuter passes, and the like, and therefore represent an immediate (and often times unrecoverable) financial loss to the wallet owner. Moreover, the misappropriation of media issued by non-financial media issuers that contain personal information, e.g., a drivers license, social security card, identification card, etc., present the opportunity for an unauthorized possessor of a wallet to engage in the practice known as "identity theft," whereby the possessor may assume the identity of the wallet owner for various fraudulent purposes, e.g., using the assumed identity to obtain and exploit one or more new financial media.

SUMMARY OF THE INVENTION

According to one aspect of the present invention, an apparatus includes a housing; a user authenticator, supported by the housing, that authenticates an identity of a user; at least one memory, supported by the housing, that stores transaction information for at least first and second media; and at least one output supported by the housing, that releases at least a portion of the transaction information to a point-of-sale (POS) terminal after the user authenticator has authenticated the identity of the user.

According to another aspect of the present invention, a method involves steps of: (a) storing transaction information for at least first and second media in a memory of a device (b) using the device to authenticate an identity of a user; and (c) after authenticating the identity of the user with the device, transferring at least a portion of the transaction information from the device to a point-of-sale (POS) terminal.

According to another aspect of the present invention, an apparatus includes: a housing; at least one memory, supported by the housing, that stores transaction information for at least one media; a user authenticator, supported by the housing, that authenticates an identity of a user of the apparatus; and at least one output, supported by the housing, that, after the user authenticator has authenticated the identity of the user, releases an embedded identification code of the apparatus from the housing that enables a device receiving the embedded identification ID code to authenticate the identity of the apparatus.

According to another aspect of the present invention, a method involves steps of: storing transaction information for at least one media in a memory of a first device; using the first device to authenticate an identity of a user; and after authenticating the identity of the user with the first device, releasing an embedded identification code of the apparatus from the housing that enables a second device receiving the embedded identification code to authenticate the identity of the first device.

According to another aspect of the present invention, an apparatus includes: at least one memory that stores transaction information for at least first and second media; at least one input that enables a user to select one of the at least first and second media; a display that provides a visual indication to the user regarding which of the at least first and second media has been selected with the at least one input; and at least one output that selectively releases at least a portion of the transaction information to a point-of-sale (POS) terminal.

According to another aspect of the present invention, a method involves steps of: storing transaction information for at least first and second media in a memory of a device; receiving as input a user's selection of one of the at least first and second media; displaying a visual indication to the user regarding which of the at least first and second media has been selected; and transferring at least a portion of the transaction information from the device to a point-of-sale (POS) terminal.

According to another aspect of the present invention, an apparatus includes: at least one memory that stores transaction information for at least one financial media and at least one non-financial media; and at least one output that selectively releases at least a portion of the transaction information to a point-of-sale (POS) terminal.

According to another aspect of the present invention, a method involves steps of: storing transaction information for at least one financial media and at least one non-financial media in a memory of a device; and transferring at least a portion of the transaction information from the device to a point-of-sale (POS) terminal.

According to another aspect of the present invention, a system includes: a housing; at least one memory, supported by the housing, that stores transaction information for at least one media; a device releasably attached to the housing; and configuring means, supported by the housing, for selectively configuring the device to hold the transaction information so that the device may be used to engage in a transaction involving the at least one media.

According to another aspect of the present invention, a method involves steps of: (a) storing transaction information for at least one media in a memory of a first device, the first device having a second device releasably attached thereto; (b) while the second device is attached to the first device, configuring the second device to hold the transaction information for the at least one media based on the contents of the memory; (c) detaching the second device from the first device; and (d) using the second device to engage in a transaction involving the at least one media.

According to another aspect of the present invention, a system includes: a first device including a user authenticator that authenticates an identity of a user; and a second device releasably attached to the first device, wherein the second device holds transaction information for at least one media so that the second device may be used to engage in a transaction involving the at least one media, and wherein the second device is detached from the first device after the user authenticator has authenticated the identity of the user.

According to another aspect of the present invention, a method involves steps of: with a first device, authenticating an identity of a user; and after authenticating the identity of a user with the first device, detaching a second device from the first device, the second device holding transaction information for at least one media so that the second device may be used to engage in a transaction involving the at least one media.

According to another aspect of the present invention, a system includes: a first device; a second device that has the first device releasably attached thereto, the second device including means for selectively configuring the first device to hold transaction information for a first media but not for a second media so that the first device may be used to engage in a transaction involving the first media but not the second media, and the second device further including means for selectively configuring the first device to hold transaction information for the second media but not for the first media so that the first device may be used to engage in a transaction involving the second media but not the first media.

According to another aspect of the present invention, a method involves steps of: selectively configuring a device to hold transaction information for a first media but not for a second media so that the device may be used to engage in a transaction involving the first media but not the second media; and selectively configuring the device to hold transaction information for the second media but not the first media so that the device may be used to engage in a transaction involving the second media but not the first media.

According to another aspect of the present invention, a system includes: at least one memory that stores first transaction information for a first media; at least one output that selectively releases at least a portion of the first transaction information to a point-of-sale (POS) terminal; and means for enabling a person to whom the first media is issued to selectively add second transaction information for a second media to the memory.

According to another aspect of the present invention, a method involves steps of: storing first transaction information for a first media in a memory of a device; releasing at least a portion of the first transaction information to a point-of-sale (POS) terminal; and in response to a request by the person to whom the first transaction information is issued, adding second transaction information for a second media to the memory.

According to another aspect of the present invention, a system includes: at least one memory that stores first transaction information for a first media and second transaction information for a second media; at least one output that selectively releases at least a portion of the first transaction information to a point-of-sale (POS) terminal; and means for enabling a person to whom the first media is issued to selectively remove at least a portion of the second transaction information from the memory.

According to another aspect of the present invention, a method involves steps of: storing first transaction information for a first media and second transaction information for a second media in a memory of a device; releasing at least a portion of the first transaction information to a point-of-sale (POS) terminal; and, in response to a request by the person to whom the second media is issued, removing at least a portion of the second transaction information from the memory.

According to another aspect of the present invention, a system includes: at least one memory that stores transaction information for at least one media; at least one output that selectively releases at least a portion of the transaction information to a point-of-sale (POS) terminal; and means for enabling at least one functional characteristic of the at least one media to be altered by altering the contents of the least one memory.

According to another aspect of the present invention, a method involves: storing transaction information for at least one media in a memory of a device; releasing at least a portion of the transaction information to a point-of-sale (POS) terminal; and altering at least one functional characteristic of the at least one media by altering the contents of the least one memory.

According to another aspect of the present invention, an apparatus includes: a housing; a user authenticator, supported by the housing, that authenticates an identity of a user; at least one memory that, supported by the housing, stores first transaction information for a first media and second transaction information for a second media; and at least one output, supported by the housing, that releases the first transaction information only after the user authenticator has authenticated the identity of the user, and that releases the second information without requiring the user authenticator to have authenticated the identity of the user.

According to another aspect of the present invention, a method involves steps of: storing first transaction information for a first media and second transaction information for a second media in at least one memory of a device; using the device to authenticate an identity of a user; releasing the first transaction information only after the identity of the user has been authenticated; and releasing the second transaction information without requiring the identity of the user to be authenticated.

According to another aspect of the present invention, a system includes: a first device; and a second device having the first device releasably attached thereto such that, when the first device is attached to the second device, the second device causes the first device to generate a machine-readable code for only a predetermined, finite period of time after the first device is detached from the second device.

According to another aspect of the present invention, a method involves a step of generating a machine-readable code on a device for only a predetermined, finite period of time.

According to another aspect of the present invention, an apparatus includes: a portable substrate; a power supply supported by the substrate; and at least one controller supported by the substrate and powered by the power supply, the at least one controller being configured to generate a simulated magnetic stripe on the substrate.

According to another aspect of the present invention, an method involves a step of generating a simulated magnetic stripe on a portable device.

According to another aspect of the present invention, a system includes: at least one memory that stores transaction information for at least one media; a user authenticator that authenticates an identity of the user; and a display that provides a visual indication to the user regarding the at least one media, the visual indication being displayed for only a predetermined, finite period of time after the user authenticator has authenticated the identity of the user.

According to another aspect of the present invention, a method involves steps of: authenticating an identity of a user; and displaying a visual indication to the user regarding the at least one media for only a predetermined, finite period of time after authenticating the identity of the user.

According to another aspect of the present invention, a system includes a portable device that can be used to engage in point-of-sale (POS) transactions; and a device remote from the portable device, that can disable an ability of the portable device to engage in POS transactions.

According to another aspect of the present invention, a method involves steps of: providing a portable device that can be used to engage in point-of-sale transactions; and at a location remote from the portable device, disabling an ability of the portable device to engage in POS transactions.

According to another aspect of the present invention, a method involves steps of: storing transaction authorization information for at least two media in a first memory of a first device; and storing the transaction authorization information for the at least two media in a second memory, which is disposed at a location remote from the first device.

According to another aspect of the present invention, a system includes: a first device; and a second device having the first device releasably attached thereto such that, when the first device is attached to the second device, the second device can cause the first device to generate a machine-readable code after the first device is detached from the second device, the second device including at least one controller configured so as to be capable of causing the first device to generate the machine-readable code only for a finite, predetermined period of time.

According to another aspect of the present invention, a method involves a step of configuring a first device such that the first device is capable, for only a predetermined, finite period of time, of generating a machine-readable code on a second device.

According to another aspect of the present invention, a method involves steps of: receiving information at a first device that has been transmitted over an electronic communication link; and after receiving the information at the first device, using a media at the first device to access a quantity of credit or cash reserves that could not be accessed prior to the first device receiving the information.

DETAILED DESCRIPTION

A new method and system for producing, distributing, storing, and using the typical contents of an individual's wallet is disclosed herein. Essentially, the system may enable individuals to replace nearly all of the paper and plastic contents of their wallets with a single, hand-held portable electronic authorization device. The system may include the portable electronic authorization devices, removable morphing tokens associated with such devices, associated computer peripherals, software and certain network capabilities. As a whole, the system may eliminate virtually all of the distribution costs and security concerns associated with paper and plastic media.

Because the device may incorporate many different media that are commonly stored in a person's wallet, possibly including both financial and non-financial media, it is much more than a simple point-of-sale (POS) device. Therefore, the device may be more appropriately referred to as a multi-purpose, "point-of-transaction" device. In any situation of presentment, whether for purposes such as building security, demonstrating membership or using credit or debit capacity, the system is designed to perform tasks more safely, securely and with greater ease than is possible with prior art systems. Further, while certain computer technologies are involved, the preferred embodiment is such that some people may barely recognize it as a computer, seeing instead a more comfortable to carry, easier-to-use, safer and more securely packaged means of transporting typical wallet contents.

The system's business model may comprise an independent organization acting as a media-neutral multi-service provider of other issuers' various financial and non-financial media, that also may enable individuals and retailers to add or create their own secure (and where appropriate, non-secure media) using a device with a self-contained set of authentication security features, which may even be password-free. This device may operate over existing financial transaction networks, while also having links to a highly secure network system for certain functionality. The self-contained authentication functionality of the device itself ensures privacy, while providing sufficient accountability/traceability to satisfy law enforcement concerns.

Figure 1:
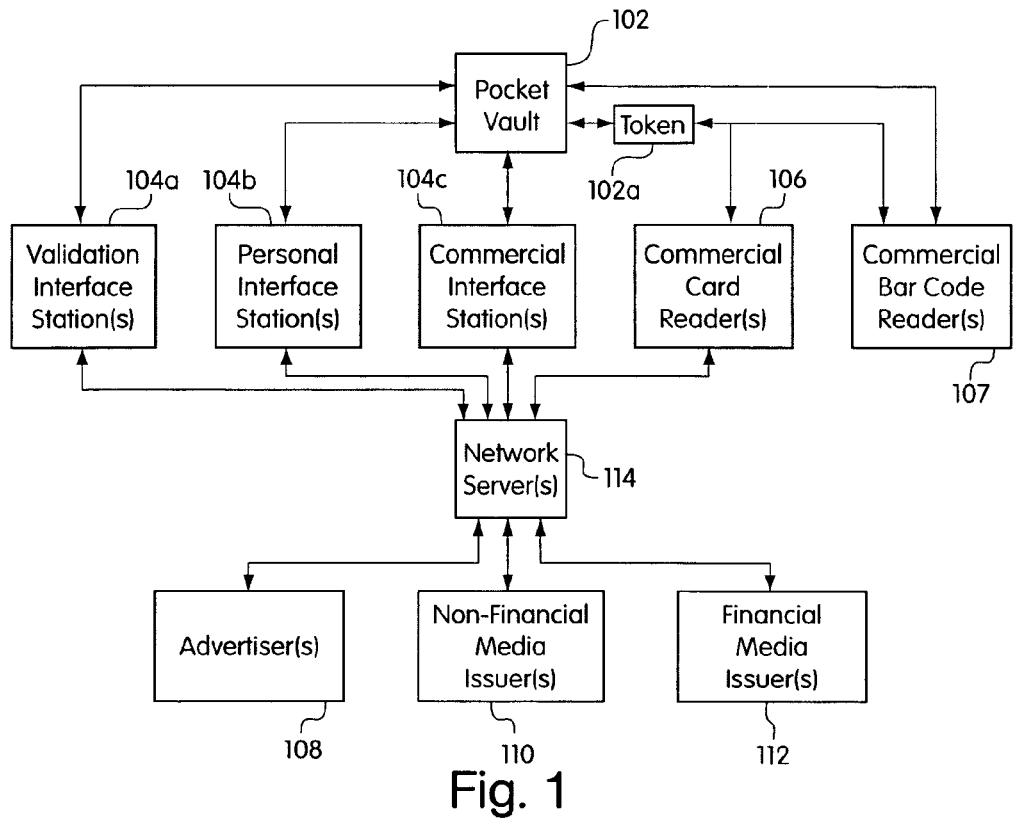
FIG. 1 is a block diagram illustrating an example of a network system in which a portable electronic authorization device (also referred to herein as a "Pocket Vault") may be employed according to one embodiment of the invention.

A network system 100 configured according to one illustrative embodiment of the invention is shown in FIG. 1. As shown, the network system 100 may include a portable electronic authorization device 102 (alternatively referred to herein as a "Pocket Vault") and an associated token 102a (alternatively referred to herein as a "Chameleon Card"). Each person desiring to use the network system 100 may possess his or her own Pocket Vault 102 and associated token 102a. Some individuals may choose to own multiple Pocket Vaults or Chameleon Cards. The system and software therefore may accommodate the use of multiple Pocket Vaults and multiple Chameleon Cards by one individual.

Referring to FIG. 1, in addition to the Pocket Vault 102, the network system 100 may include one or more network servers 114 to which various other network components are coupled. Although multiple, load-sharing network servers 114 may be employed in a typical application, the network server(s) 114 will hereinafter, for convenience, be referred to as a single network server 114. Coupled to the network server 114 are: several different types of interface stations 104 (i.e., a validation interface station 104a, a personal interface station 104b, and a commercial interface station 104c), one or more commercial card readers 106, one or more commercial bar code readers 107, and several computers 108, 110, and 112 operated by one or more advertisers, non-financial media issuers, and financial media issuers, respectively. The structure and functionality of each of the components of the network system 100 in accordance with one illustrative embodiment of the invention are described below.

As shown in FIG. 1, the network server 114 may form the hub of the network system 100, with each of the interface stations 104, the commercial card reader 106, the commercial bar code reader 107, and the computers 108, 110, and 112 being coupled thereto. As discussed in more detail below, the network server 114 may therefore serve as: (1) a repository of information for the network, (2) the entity that controls access to the stored information by the other network devices, and (3) a service provider for financial and non-financial media issuers, advertisers, as well as Pocket Vault holders.

Any of a number of techniques may be used to interconnect the various elements of the network system 100, and the invention is not limited to any particular networking technique. In one illustrative embodiment, for example, the network server 114 is coupled to the other elements in the network system 100 via the Internet or similar packet-switched communication system. Alternatively, dedicated or selectively established (e.g., using a dial-up modem) communication channels or time slots thereof may be employed between the respective devices. The connections between the network devices may be either hardwired (including fiber optic connections) or wireless (e.g., infrared (IR) or radio frequency (RF) links).

As shown in FIG. 1, the Pocket Vault 102 may be interfaced with any of the interface stations 104a–c so as to permit information to be uploaded from the network server 114 to the Pocket Vault 102, or to be downloaded from the Pocket Vault 102 to the network server 114. In one illustrative embodiment, each of the interface stations 104 includes a docking mechanism that permits a Pocket Vault 102 to by physically, as well as electronically, interfaced therewith. In such an embodiment, once the Pocket Vault 102 is physically "docked" with an interface station 104, the Pocket Vault 102 may communicate with the interface station 104 using any now known or later discovered technique. For example, physical contact may be made between respective electrodes or plugs, a line of sight (e.g., infrared) wireless link may be established, or any other interfacing technique may be employed.

The Pocket Vault 102 may additionally or alternatively be configured such that it need not be physically docked with or even in the same room as the interface station 104, as a wireless network such as Bluetooth may be employed to permit communication between devices on the network system 100. In fact, in some embodiments wherein appropriate networking capabilities are provided, each Pocket Vault 102 may communicate directly with the network server 114, without the interface stations 104a–c facilitating communication therebetween. In addition, in some embodiments, Pocket Vaults 102 may communicate directly with one another. In such embodiments, such inter-device communication may permit value to be exchanged directly between Pocket Vaults 102.

The personal docking station 104b may allow setting or changing of user preferences, recording of miscellaneous information by the Pocket Vault holder, replenishment or deletion of information regarding particular media, and may also permit additional media (e.g., a library card) to be added to the device. The Pocket Vault holder may, for example, directly add non-value-based media (e.g., a membership number for the local Historical Society) and notes. In one embodiment, value-based and certain identification media (a driver's license, passport, building security ID, etc.) may be added or reinstated only through a secure connection to the network server 114 (as described below), in response to an update request from the Pocket Vault holder. In addition, the personal interface station may provide a mechanism to download transaction activity involving the Pocket Vault 102 into an individual's home computer. There are many users of home finance software. These applications can be relatively "data hungry," and commonly require users to download checking and debit card data from their banks (or key it in manually) and to key in the details of credit card and cash purchases. All of this keying and internet file downloading from third parties may be replaced by a simple docking procedure, i.e., when the Pocket Vault 102 is interfaced with the personal docking station 102b.

As shown in FIG. 1, and as described below in more detail, the Pocket Vault 102 may be equipped to generate the token 102a such that the token 102a has transactional information regarding a media (e.g., a simulated magnetic strip or a bar code) produced thereon. In such an embodiment, after the token 102a has been generated, the token 102a may be used by the Pocket Vault holder to engage in a transaction wherein an entity swipes the simulated magnetic stripe of the token 102a through a card reader 106 or scans the bar code on the token 102a using a bar code reader 107. Additionally or alternatively, the token 102a may include a suitable Smartcard interface so that the Chameleon Card 102 may be used with Smartcard compatible devices.

Because the token 102a may be caused to take on a different personality each time it is released from the Pocket Vault 102, a plurality of media may be stored electronically in memory of the Pocket Vault 102, and the token 102a may, upon request, be generated to take on the personality selected by the Pocket Vault holder. The respective media stored on the Pocket Vault may be issued by different and unrelated media issuers. As used herein, two media issuers are "unrelated" if there exists no legal relationship between them. The token 102a may also have display capacity, sufficient to indicate the media personality that it has taken on. This may or may not include display of the specific identity that is temporarily encoded on the token 102a. In some embodiments, value may be exchanged between two Pocket Vaults 102 when one Pocket Vault 102 generates a token 102a having a value-based or value-linked media stored thereon, and the token 102a so generated is passed to the other Pocket Vault 102, which then may then access the media and extract value therefrom or add value thereto. As mentioned above, this sort of value exchange may also be accomplished directly between two Pocket Vaults 102 over a wireless network, such as Bluetooth.

As discussed in more detail below, in addition to or in lieu of the token 102a, the Pocket Vault 102 may also generate a bar code for a selected media on the Pocket Vault's display (not shown in FIG. 1), and the bar code reader 107 may be used to scan the displayed bar code to process a transaction. Further, a transaction may be processes via a commercial interface station 104c either by use of a docking terminal or via a wireless network scheme such a Bluetooth. In one embodiment, some commercial interface stations 104c may comprise an interface station linked to a standard commercial card reader 106 or commercial bar code reader 107, with the card reader 106 or bar code reader 107 being modified to accept input from the station.

To permit the Pocket Vault holder to select from among the various media stored in memory of the Pocket Vault 102, the Pocket Vault 102 may comprise a display (not shown in FIG. 1). By employing either a display having a user-manipulable touch screen or a separate user input device (not shown in FIG. 1), a Pocket Vault holder can effectively flip through the contents of the Pocket Vault 102 to locate and select a desired media (e.g., a credit card, driver's license, library card, frequent flier card, etc.) much like a person can flip through the contents of his or her wallet to do the same.

The use of a display on the Pocket Vault 102 also creates an opportunity for media providers to go from a static presentation of their brand (logo, etc.) to having the option of dynamic branding and messaging. In addition, using the display, the presentment of active marketing at the "moment of buying decision" is possible. Specifically, the logo and message displayed to the Pocket Vault holder may incorporate motion, moving images and messages. To conserve power, moving images may be presented only at certain times, e.g. response to internal or external events or communications.

In the embodiment of FIG. 1, the computers 108, 110, and 1112, together with the network server 114, may represent a secure infrastructure of server databases capable of storing information for purposes of delivering personalized services to holders of Pocket Vaults 102. The network server 114 may also track activity of Pocket Vault holders and compile marketing information based thereupon that may prove useful to media issuers and/or advertisers. The Pocket Vault holder may have control over the ability of the network server 114 to track activity. The information maintained on the network system 100 may originate with the holders of Pocket Vaults 102 and/or may originate with the other entities having access to the network system 100 (e.g., advertisers and media issuers).

As discussed below in more detail, in some embodiments of the invention, certain uses of the Pocket Vault 102, as well as each of the interface stations 104a–c, may be permitted only by pre-authorized individuals. To this end, a suitable user authentication technique may be employed in connection each attempted use of any of these devices. One suitable user authentication technique that may be employed is the analysis of a bio-metric feature of the individual attempting use of the device (e.g., a fingerprint scan, retina scan, a speech pattern analysis, keystroke rhythm, etc.), and validating the identity of the individual on that basis. Alternatively, a personal identification (PIN) code may be entered by the holder to verify the holder's identity. In one illustrative embodiment, authentication information used to validate the holder's identity (e.g., the stored fingerprint or PIN code) is stored within the to-be-accessed device, and the validation is performed in its entirety on-board the same device, such that the user-specific authentication information never leaves the device in which it is stored. Thus, using this technique, the likelihood that such information will be intercepted by unauthorized third parties may be reduced significantly.

As discussed below, great care may be taken to ensure that only authorized individuals are permitted to validate Pocket Vaults 102 by having their authentication information (e.g., their fingerprint data or PIN codes) stored therein. Therefore, after it has been confirmed that the holder's authentication information has been properly stored in the Pocket Vault 102, a trust relationship may be established between the network server 114 and the Pocket Vault 102. This relationship may involve, for example, the registration of a unique encrypted chip ID of the Pocket Vault 102 with the network server 114 through a secure Internet connection, the distribution of a digital certificate to the Pocket Vault 102, and the grant of authority to the Pocket Vault 102 to permanently store the Pocket Vault holder's authentication information.

A similar level of care may also be taken to ensure that only authorized individuals are permitted to validate interface stations 104a–c by having their authentication information (e.g., their fingerprint data or PIN codes) stored therein. Therefore, as with the Pocket Vaults 102, after it has been confirmed that each interface station's authorization information has been properly stored in the interface station 104, a trust relationship may be set up between the network server 114 and the interface station 104. This relationship may also involve, for example, the registration of a unique encrypted chip ID of the interface station 104 with the network server 114 through a secure Internet connection, the distribution of a digital certificate to the interface station 104, and the grant authority to the interface station 104 to permanently store the interface station operator's authentication information. While, in some embodiments, the Pocket Vault 102 and/or the interface stations 104 are each permitted to store authentication information for only one individual, it should be appreciated that, in alternative embodiments, the Pocket Vault 102 and/or the interface stations 104 may each store authentication information for more than one individual, thereby permitting multiple people to use them.

Because of the creation of the above-described trust relationships, each Pocket Vault 102 and each interface station 104 may communicate securely with the network server 114, as well as with any other networked devices or sites that require a high level of trust. Also, the existence of these trust relationships enable individual Pocket Vaults 102 to accept other services provided by the network servers 114, such as the backup and recovery of information stored within the Pocket Vaults 102. That is, the network servers 114 can serve as a repository for all of the information stored on every validated Pocket Vault 102 (except the holder's authentication information—which is stored only in the Pocket Vault 102). To ensure the network server 114 stores an accurate version of the contents of each Pocket Vault 102, information may, for example, be uploaded to from the network server 114 to a Pocket Vault 102 or downloaded from the Pocket Vault 102 to the network server 114 each time the Pocket Vault 102 is interfaced with any of the interface stations 104a–c. Therefore, if a Pocket Vault 102 is lost or stolen, the Pocket Vault holder need only obtain a new Pocket Vault 102, and the entire contents of the lost Pocket Vault 102 can be uploaded thereto, in a single communication, in a matter of seconds. In addition, in the event that a validated Pocket Vault 102 is lost or stolen, the network server 114 may void the chip ID of that Pocket Vault 102, so that the Pocket Vault 102 can not be used by a third party, even if the holder validation security (e.g., the bio-metric scanning or PIN entry requirement) is somehow breached. Voiding the chip ID of the Pocket Vault 102 may prevent the Pocket Vault 102 from assigning any media information to the associated Chameleon Card.

In addition to serving as a repository for Pocket Vault information, the network server 114 may also serve as a repository for information regarding media issuers or advertisers, and may further provide various services to these entities. For example, the network server 114 may facilitate transactions involving media issued by the media issuers, and may permit new media to be issued or lost media to be replaced at a fraction of the cost of generating new physical tokens or replacing lost ones. Additionally, the network server 114 may serve as a conduit for advertisers to target particular classes of Pocket Vault holders, and channel information to them. The network server 114 may also function as an advocate for Pocket Vault holders, advertisers, and/or media issuers when it utilizes its portfolio of Pocket Vault holders, media issuers, and/or Pocket Vault holders to secure privileges. Examples of such advocacy include the ability to secure buying power for Pocket Vault holders as a group or to provide media issuers and advertisers with a highly efficient tool for generating awareness for affinities or causes that fit appropriate holder markets. In sum, the services provided by the network server 114 enable Pocket Vault holders to combine and manage their media data using a single, hand-held device, and enables advertisers and media issuers to understand more about, and more readily reach more of, their customers than ever before.

Figure 2:
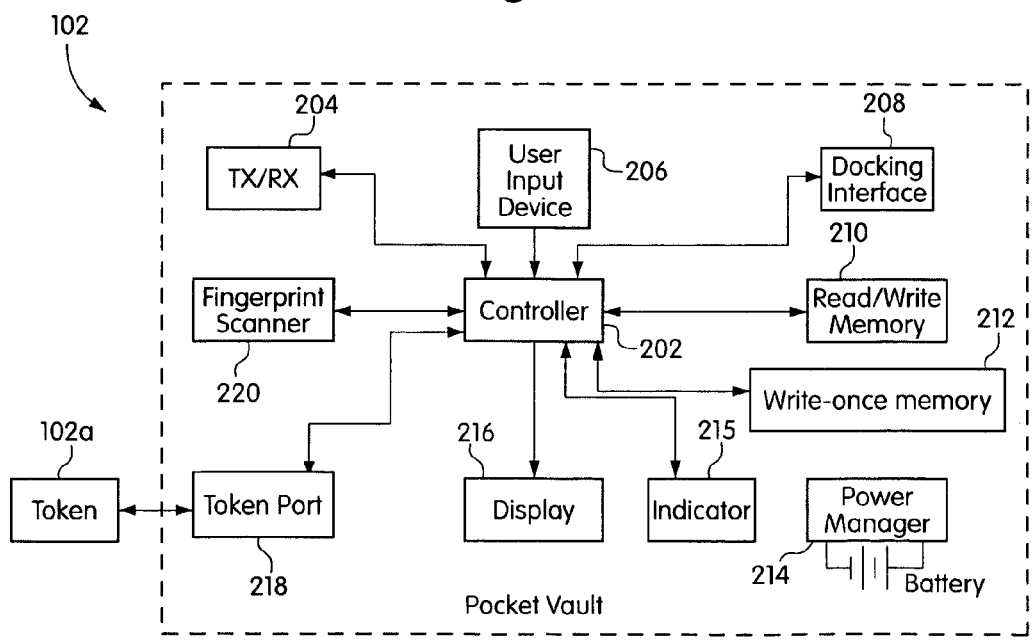
FIG. 2 is a block diagram showing an illustrative embodiment of the Pocket Vault shown in FIG. 1.

FIG. 2 shows an example embodiment of the Pocket Vault 102 of FIG. 1. The pocket vault 102 may employ components similar to those used in modern personal digital assistants (PDAs) and palm top computers. Examples of such products include PDAs such as the "Palm Pilot" from Palm, Inc. (www.palm.com), and the "Casiopedia" from Casio, Inc. of Dover, N.J. (www.casio.com). As shown, the Pocket Vault 102 may include a controller 202, as well as a transceiver 204, a user input device 206, a docking interface 208, a read/write memory 210, a write-once memory 212, a power manager 214, an indicator 215, a display 216, a token port 218, and a fingerprint scanner 220, all coupled to the controller 202. In addition, the Pocket Vault 102 may include a hard-wired memory (not shown) to store device serial numbers and key operating system and encryption software components.

Figure 26A:
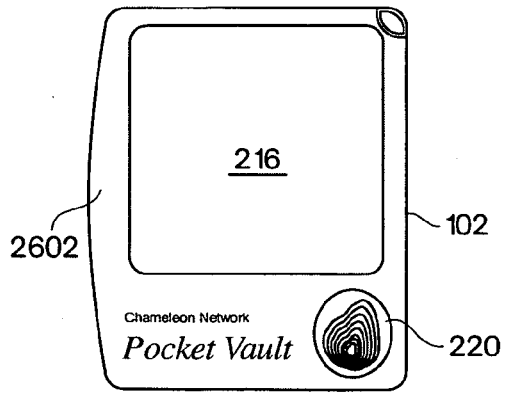
FIGS. 26a–26p are illustrations of the portable electronic authorization device, as well as the token associated therewith, as these items may appear when in use.
Figure 26B:
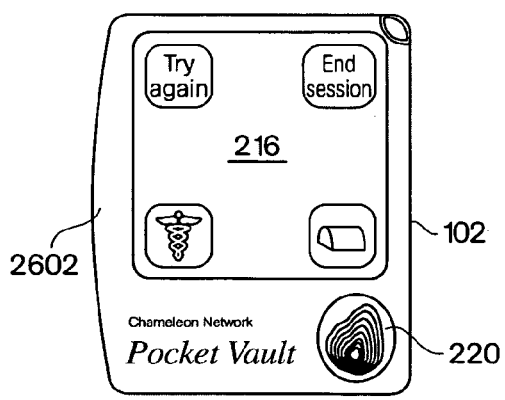
Figure 26C:
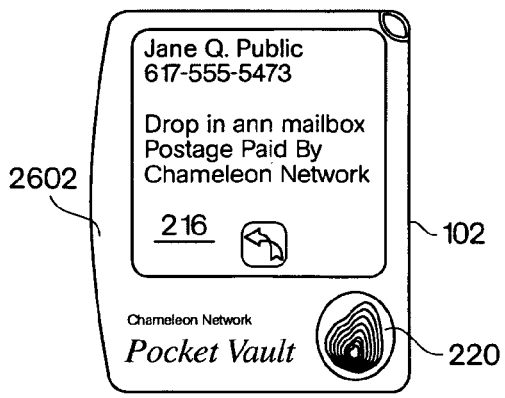
Figure 26D:
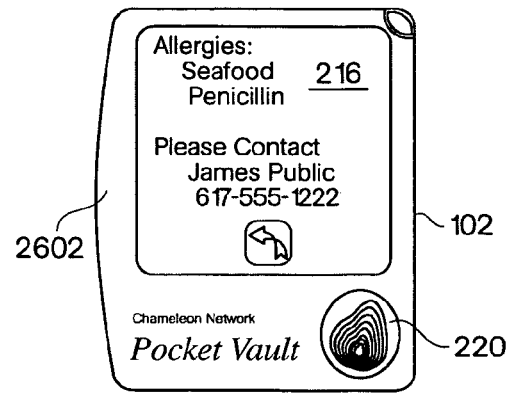
Figure 26E:
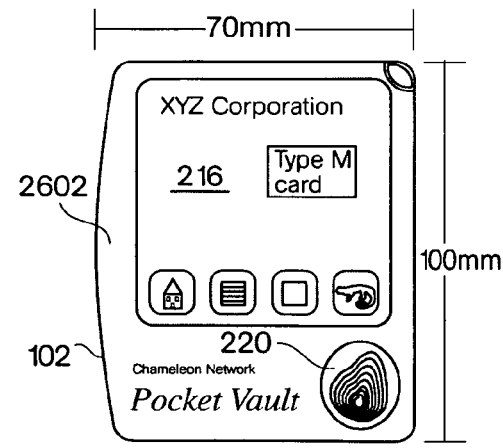
Figure 26F:
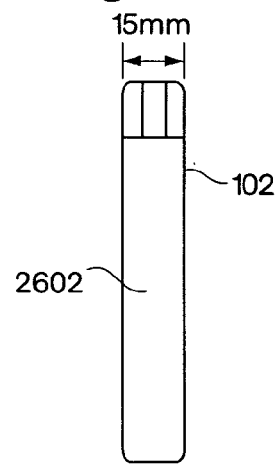
Figure 26G:
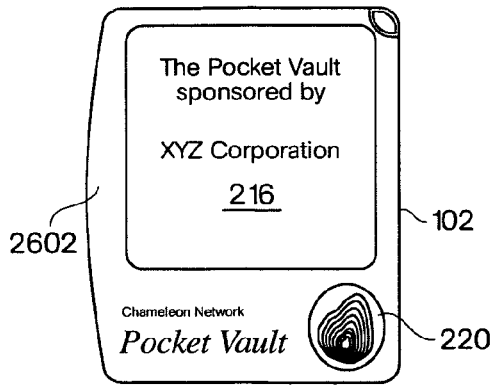
Figure 26J:
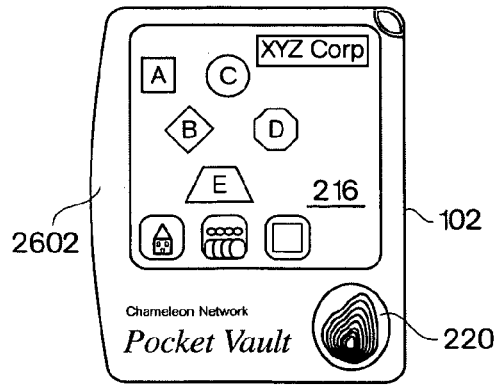
Figure 26H:
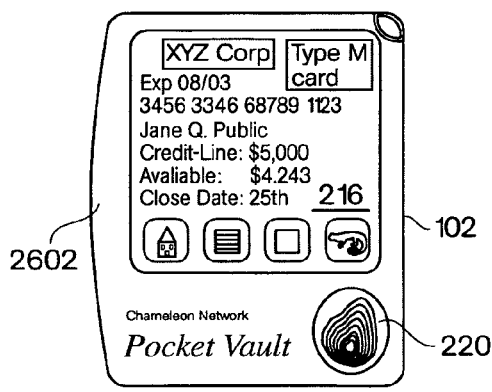
Figure 26K:
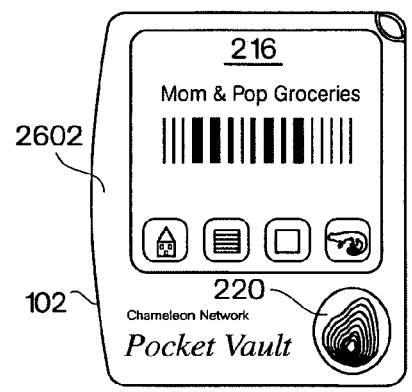
Figure 26I:
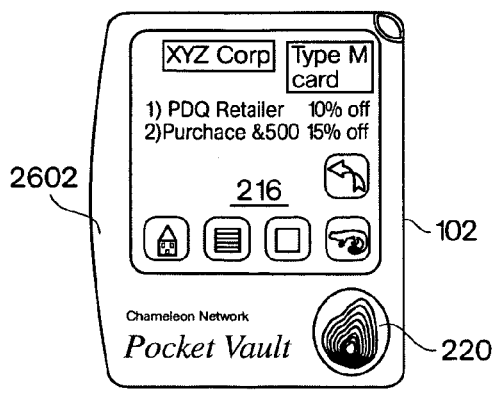
Figure 26L:
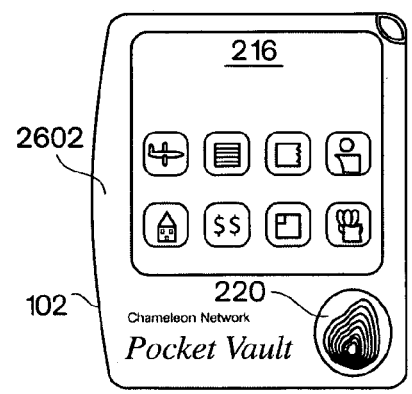
Figure 26M:
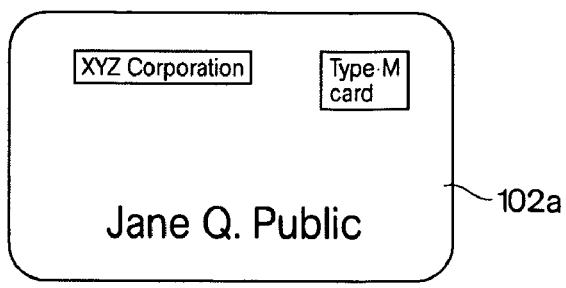
Figure 26N:
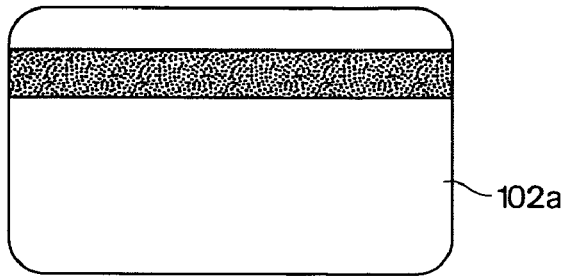
Figure 26O:
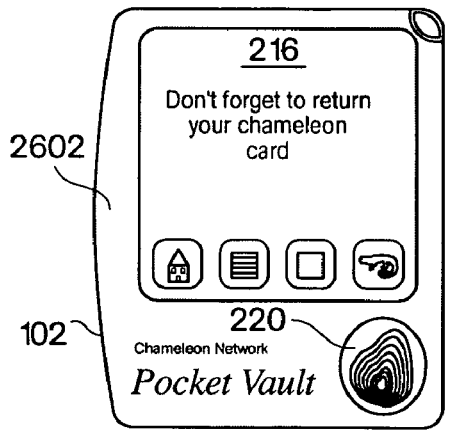
Figure 26P:
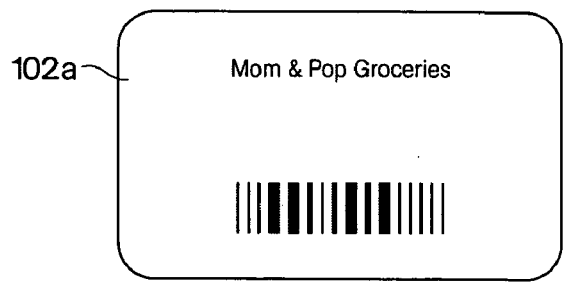

Actual views of an example embodiment of the Pocket Vault 102, as well as the token 102a associated therewith, are shown in FIGS. 26A–26P. The views of FIGS. 26A–P, including the items displayed on the display 216, are discussed in more detail below in connection with the flow diagrams of FIGS. 7–12. At this point, however, with reference to FIGS. 26A–L and 26-O, it may be noted that the Pocket Vault 102 may comprise a housing 2602 in which the components shown in FIG. 2 may be disposed. As illustrated in FIGS. 26E and 26F, the housing 2602 may be approximately seventy millimeters wide, approximately one hundred millimeters long, and approximately fifteen millimeters deep. Thus, in the embodiment shown, the housing 2602 has an internal volume of less than 105 cubic centimeters. Of course, in alternative embodiments, the housing 2602 may be slightly larger or smaller than that shown. For example, in different embodiments, the housing 2602 may have an internal volume less than five hundred cubic centimeters, or less than four hundred cubic centimeters, or less than three hundred cubic centimeters, or less than two hundred cubic centimeters, or less than one hundred cubic centimeters, or less than any other volume value that falls between one hundred and five hundred centimeters. In one embodiment, the housing 2602 is sized so that the Pocket Vault 102 may readily fit into the rear pocket of a pair of pants. One feature of the illustrative embodiment of the Pocket Vault 102 shown in FIG. 2 which may permit its size to be reduced below that of a standard personal computer is the fact that the embodiment shown lacks a disk drive (either hard or floppy) or any similar memory storage device (e.g., a tape drive) that consumes a significant volume within the housing 2602. It should be appreciated, of course, that alternative embodiments may include such memory devices, and that the invention is not necessarily limited to embodiments that exclude them. In addition to the lack of a disk drive or the like, in some embodiments, the power manager 214 may reduce the power consumption of the active components of the Pocket Vault 102 well below that of a standard personal computer, thereby enabling a very small and light weight battery to be employed, as opposed to the relatively large and heavy batteries typically employed in personal computers.

The housing 2602 may provide a water-resistant or waterproof environment for the components housed thereby. The housing materials of Pocket Vaults 102 may be brightly colored, in addition to traditional black or brown, thereby helping their holders to make a fashion statement and/or permitting them to be readily spotted if misplaced. Deluxe versions may be clad in leather, Kevlar™, Gortex™, aluminum and/or stainless steel. In some embodiments, the housing 2602 may even be woven into garments.

Referring again to FIG. 2, any of a number of devices may be used to implement the controller 202, and the invention is not limited to any particular type of controller. In one illustrative embodiment, for example, the controller 202 comprises a low-power multiprocessor or microcomputer having an on-board SRAM and/or flash memory and a real time clock calendar. One example of a suitable controller is the "Motorola Dragonball" Processor from Motorola, Inc. (www.motorola.com). The controller 202 may include a software-programmable and encryption-protected or hardwired unique chip ID. In one embodiment, this chip ID is released from the Pocket Vault 102 only after the fingerprint scanner 220 (discussed below) has successfully authenticated the identity of the holder. A signal processor for Bluetooth or another wireless connection may also be employed within or along with the controller 202.

The transceiver 204 may be any type of transceiver (or separate transmitter and receiver) capable of communicating with the other devices in the network 100 to enable the functionality described herein. For example, either an RF or an IR transceiver may be employed. Some embodiments may, in fact, include both an IR and an RF transceiver to be used in different applications. For example, an IR transceiver may be employed to interface the Pocket Vault with a "docking station" type interface unit, and a separate RF transceiver may be employed to communicate over a wireless network such as Bluetooth.

In one illustrative embodiment, the user input device 206 is implemented as part of a touch-screen display used as the display 216 (described below). Additionally or alternatively, the user input device 206 may include dedicated buttons, a keypad, a touch pad, a microphone and speech recognition software, a wand or joystick, or any other suitable implement that permits a person to provide input to the controller 202. The user input device 206 may also be integrated into the fingerprint scanner 220 or into an alternative bio-metric input device. By manipulating the user input device 206, a Pocket Vault holder may select one of a number of media stored in memory of the Pocket Vault 102 for display and/or use in connection with a transaction, and may otherwise control or provide input to software executing on the controller 202. In one embodiment, a keypad is employed as the user input device 206, thereby permitting the holder to input a PIN code as a means of authenticating the holder's identity.

The docking interface 208 may take on any of numerous forms, and the invention is not limited to any particular type of interface device. The docking interface 208 may, for example, include a multi-pin plug adapted to mate with a receptacle disposed on the interface units 104a–c, or vice versa. The docking interface 208 may also comprise one or more implements (e.g., grooves or keys) to ensure that the plug or other docking interface 208 mates correctly with the reciprocal device on an interface unit 104 when the two are physically mated together.

The read/write memory 210 may take on any of a number of forms, and the invention is not limited to any particular type of memory. The memory 210 may, for example, comprise a suitable non-volatile SRAM. Similarly, any suitable memory device that permits a only single write operation to take place may be employed as the write-once memory 212. The memory 210 may have instructions stored therein which, when executed by the controller 202, cause the controller 202 to implement the routine described below in connection with FIGS. 7–12. Of course, the memory 210 may also contain a suitable operating system (e.g., Palm OS, Microsoft's Windows CE, Microsoft's Windows for Smartcards, or some similar offering), appropriate device drivers, and other software employed in connection with the controller 202 and/or the peripherals thereof. The memory 210 may also be used to store the various media and personal information retained by the Pocket Vault 102. In one illustrative embodiment, the memory 210 stores a plurality of different media issued by different and unrelated media issuers, including both financial (e.g., a credit or debit card) and non-financial media (e.g., a drivers license or a library card). Other examples of media or information that may be stored in the memory 210 include: a social security card, identification cards, membership cards, discount cards, commuter passes, toll passes, transit cards, access tools such as hotel keys, business cards, coupons, concert and theatre tickets, transportation tickets, frequent customer cards (e.g., a frequent flier card), medical information cards, receipt information, photographs, etc.

As used herein, "financial media" refers to any media which can, as a matter of course, be used to purchase goods or services, whereas "non-financial media" refers to any media which, while possibly having some value to the Pocket Vault holder, cannot, as a matter of course, be used to purchase goods or services. Examples of financial media include value-linked and value-based media such as debit or credit cards issued by a bank or other financial institution, telephone calling cards, etc. Examples of non-financial media include: library cards, driver's licenses, building access cards, etc. In one embodiment, the memory 210 is large enough to store as many as one hundred compressed graphic image files, and full data sets for as many as one hundred types of media.

In addition, the memory 210 may store status information, where useful, for each type of media. Examples of this sort of status information include: information regarding the value remaining on a pre-paid phone card, information regarding an accumulated number of frequent flier miles, information regarding a total number of cups of coffee that have been purchased at a particular coffee shop (e.g., in connection with a buy-ten-get-one-free special), etc. The portion of the memory 210 devoted to memory storage may be divided into three sections: (1) a high-security section, (2) a medium security section, and (3) a non-secure section. The high security section may be used to store value-based or value-linked media such as debit and credit cards and certain ID information such as driver's licenses, passports, building security passes, etc. The medium security section may be used to store low-value, limited use media that may be accessed, for example, by retailers to keep track of frequent purchase credits or the like. The non-secure section may, for example, be used to store notes, membership ID records, emergency contact information, etc. Access to the information included in the various sections may require security or user authentication procedures commensurate with the indicated security level. For example, an accurate fingerprint scan and an accurate pin code entry may be required to access the high-security section, only an accurate PIN code entry (even by the retailer) may be required to access the medium-security section, and anyone may be permitted to access the non-secure section.

The power manager 214 may comprise any of numerous devices, and the invention is not limited to any particular type of power supply/management device. The power manager may, for example, employ a flat, rechargeable, lithium battery, and associated regulator and power management software. Alternatively, the battery used may be non-rechargeable and/or coin cell-shaped. Solar powered cells may also be a viable option as at least a supplement to battery power, if not a primary source of power for the Pocket Vault 102. This may be made possible because of the typically modest on-time requirements for a Pocket Vault 102. Power management software may also assist in minimizing the power consumption of the Pocket Vault 102. Such software may, for example, invoke an auto-shutdown feature after a preference-set number of seconds, may control the level of screen back-lighting in response to feedback received from a photo-sensor that registers ambient light, and/or may provide battery charge level warnings to Pocket Vault holders.

The indicator 215 may be any device capable of generating a perceptible indication to the holder such as a bell, chime, buzzer, light, vibration, etc., and the invention is not limited to any particular type of device for accomplishing such a result. In one embodiment, for example, the indicator is a chime generator that generates a "chime" sound that can be heard by the Pocket Vault holder.

Any of a number of devices may also be used for the display 216, and the invention is not limited to any particular type of display. As mentioned above, in one embodiment, a touch-screen display may be employed such that at least a portion of the functionality of the user input device 206 may be incorporated therein. Suitable displays may, for example, include any of a black & white, gray-scaled, or color LCD display, or an LCD bi-stable display.

As mentioned above, the use of the display 216, together with the user input device 206 (which may constitute the touch-screen functionality of the display 216) permits the Pocket Vault holder to flip or scroll through the various media stored in the memory 210 in much the same way as a person flips through the contents of his or her wallet. As mentioned above in connection with the description of the indicator 215, in addition to or in lieu of the display 216, other user output devices may also be employed to provide information to the Pocket Vault holder. For example, light emitting diodes (LEDs), a beeper or buzzer, a speech synthesizer, a vibrator, etc., may be employed in some embodiments of the Pocket Vault 102.

The token port 218 of the Pocket Vault 102 may comprise a cavity or slot in which the token 102a is retained until it is released to be used to engage in a transaction, as well as the hardware employed to secure the token 102a in place when the token 102a has not been authorized to be released. In one embodiment, the token 102a stores a unique (possibly encrypted) embedded unique (and possibly encrypted) chip ID stored which is accessible to another device only when the token 102a is successfully released form the token port 218. In addition to the elements described above, the card port 218 may include additional hardware employed in connection with properly generating or configuring the token 102a prior to its release. This hardware is discussed in more detail below in connection with FIG. 6.

The fingerprint scanner 220 may comprise any device capable of accurately scanning a fingerprint of an individual for comparison with a fingerprint image stored in memory. The fingerprint scanner 220 may, for example, be a solid-state (non-optical) device. Devices that may be suitable for use as the fingerprint scanner 220 are available, for example, from Veridicom, Inc., of Santa Clara, Calif. (www.veridicom.com), from Polaroid Corporation of Cambridge, Mass. (www.polaroid.com), and from Identix Incorporated of Sunnyvale, Calif. (www.identix.com). The fingerprint scanner 220 may incorporate a temperature sensor that enables it to ensure that a live finger is contacting the scanning surface when the scanning function is employed. In addition to or in lieu of a fingerprint scanner, other bio-metric scanning devices may also be employed to verify the identity of the holder. For example, some embodiments may employ a charge coupled device (CCD) to serve as an iris or retina scanner, an optical sensor, and/or a voiceprint. Alternatively or additionally, a keystroke rhythm may be measured, either alone or in combination with another user authentication technique (e.g., a successful PIN code entry requirement), to validate the identity of the holder. The fingerprint scanner 220 and/or other bio-metric scanners may have touch pad capabilities built into them, thereby permitting them to constitute at least a part of the user input device 206 shown in FIG. 2.

Figure 3:
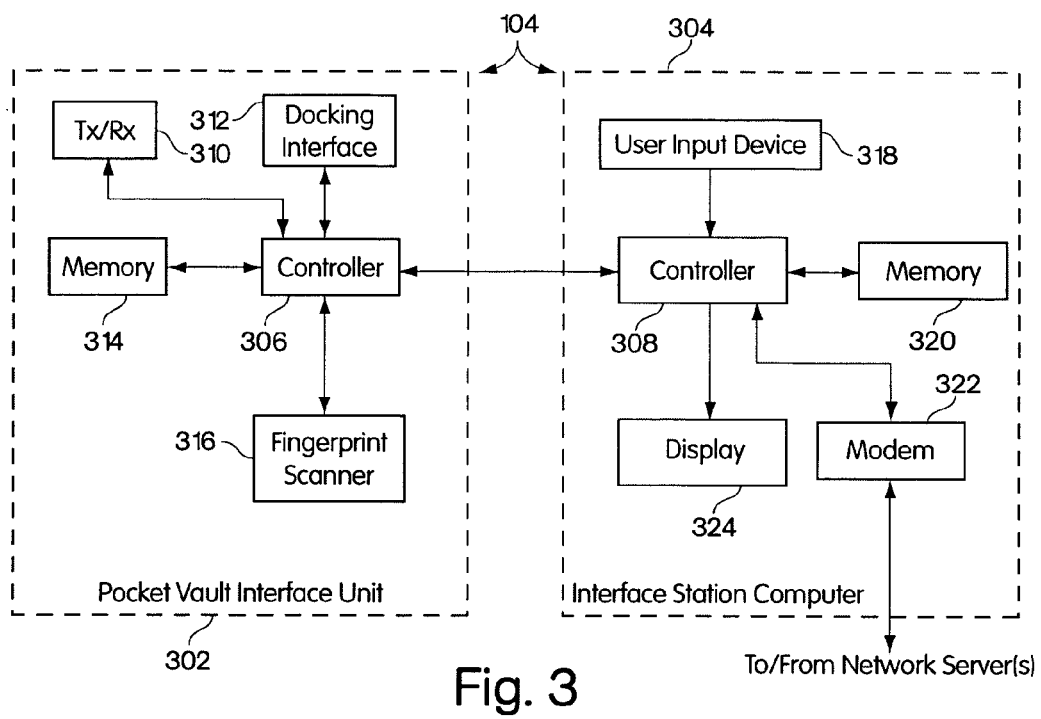
FIG. 3 is a block diagram showing an illustrative embodiment of one of the interface stations shown in FIG. 1.

FIG. 3 is a block diagram showing an example embodiment of one of the interface stations 104a–c shown in FIG. 1. The hardware employed to implement each of the stations 104a–c may be identical to the others or may be substantially different, depending on the environment in which the station 104 is to be used, as well as the functional requirements of the particular station. Therefore, while the example embodiment described herein may be suitable for use as any of the stations, it should be appreciated that each of the stations may, in fact, be configured quite differently than the others.

As shown in FIG. 3, each interface station 104 may include both an interface station computer 304 and a pocket vault interface unit 302. The interface station computer 304, for example, may be a standard desktop personal computer (PC), and may, as shown, comprise a controller 308, a user input device 318, a memory 320, a modem 322, and a display 324. These components are well known in the art and therefore will not be described in detail herein. The memory 320 of the interface station computer 304 may have instructions stored therein which, when executed by the controller 308, cause the controller to implement the routine described below in connection with FIGS. 14–18.

The pocket vault interface unit 302 is coupled to the interface station computer 304 such that a controller 306 of the pocket vault interface unit 302 can communicate with the controller 308 of the interface station computer 304. The communications interface between these devices may, for example, comprise a Smartcard, Bluetooth or USB interface. As shown, in addition to the controller 306, the pocket vault interface unit 302 may comprise a transceiver 310, a docking interface 312, a finger print scanner 316, and a memory 314. Further, although not shown in FIG. 3, the pocket vault interface unit 302 may also comprise a display and/or another device used to provide feedback to the operator, e.g., an audio indicator or LED.

The memory 314 may be any conventional memory suitable to store the software executed by the controller 306, as well as any data, e.g., stored fingerprint data, used in connection therewith. For example, the memory 314 of the pocket vault interface unit 302 may have instructions stored therein which, when executed by the controller 306, cause the controller 306 to implement the routine described below in connection with FIG. 13.

As with the transceiver 204 of the Pocket Vault 102, the transceiver 310 of the pocket vault interface unit 302 may be any type of transceiver (or separate transmitter and receiver) capable of communicating with the other devices in the network 100 to enable the functionality described herein. For example, either an RF or an IR transceiver may be employed. Some embodiments may even include both an IR and an RF transceiver to be used in different applications. For example, an IR transceiver may be employed to interface the pocket vault interface unit 302 with a Pocket Vault 102, and a separate RF transceiver may be employed to communicate over a wireless network such as Bluetooth.

As with the docking interface 208 of the Pocket Vault 102, the docking interface 312 of the pocket vault interface unit 302 may take on any of numerous forms, and the invention is not limited to any particular type of interface device. The docking interface 312 may, for example, include a multi-pin plug adapted to mate with a receptacle used as the docking interface 208 of a Pocket Vault or vice versa. The docking interface 312 may also comprise one or more implements (e.g., keys or grooves) to ensure that the plug or the like of the docking interface 208 of the Pocket Vault 102 mates correctly with the corresponding implementation I the docking interface 312 when the Pocket Vault 102 and pocket vault interface unit 302 are physically mated together.

Finally, as with the fingerprint scanner 220 of the Pocket Vault 102, the fingerprint scanner 316 of the pocket vault interface unit 302 may comprise any device capable of accurately scanning a fingerprint of an individual for comparison with a fingerprint image stored in memory. The fingerprint scanner 316 may, for example, be a solid-state (non-optical) device. Devices that may be suitable for use as the fingerprint scanner 220 are available, for example, from Veridicom, Inc., of Santa Clara, Calif. (www.veridicom.com), from Polaroid Corporation of Cambridge, Mass. (www.polaroid.com), and by Identix Incorporated of Sunnyvale, Calif. (www.identix.com). The fingerprint scanner may incorporate a temperature sensor that enables it to ensure that a live finger is contacting the scanning surface when the scanning function is performed. In addition to or in lieu of a fingerprint scanner, other bio-metric scanning devices may also be employed to verify the identity of the interface station operator. For example, some embodiments may employ a charge coupled device (CCD) to serve as an iris or retina scanner, an optical sensor, and/or a voiceprint. Alternatively or additionally, a keystroke rhythm may be measured, either alone or in combination with another user authentication technique (e.g., a successful PIN code entry requirement), to validate the identity of the operator. Although not shown, the pocket vault interface unit 302 may additionally comprise one or more user input devices enabling the operator to control or provide input to the pocket vault interface unit 302 or the software executing thereon. The fingerprint scanner 316 and/or other bio-metric scanners may, for example, have touch pad capability capabilities built into them, thereby permitting them to constitute such a user input device. Separate user input devices may also be employed.

Figure 4:
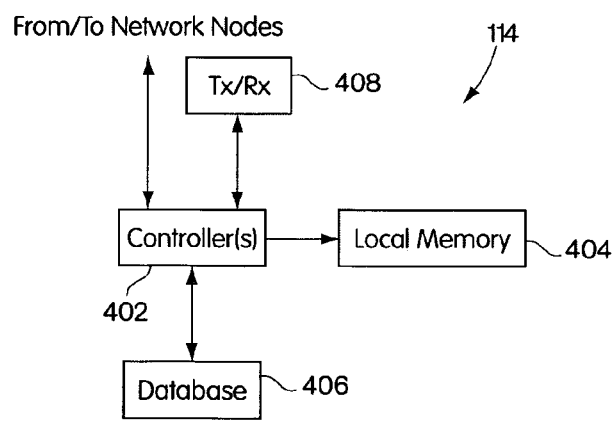
FIG. 4 is a block diagram showing an illustrative embodiment of the network server(s) shown in FIG. 1.

FIG. 4 shows an example embodiment of the network server 114 shown in FIG. 1. As shown, the network server 114 may comprise one or more controllers 402, as well as a local memory 404, a database 406, and a transceiver 408 coupled thereto. The illustrated components of the network server 114 are well known, and therefore will not be described in detail. The transceiver 408 may, for example, be used to communicate with other devices in the network system 100 (FIG. 1) using a wireless network such as Bluetooth. The controller 404 may also communicate with other network devices via the Internet or a direct connection such as the type established using a dial up modem.

The local memory 404 may have instructions stored therein which, when executed by the controller 402, cause the controller 402 to implement the routine described below in connection with FIGS. 19–25. The database 406 may, for example, comprise a relational database, and may be used to store the majority, if not all, of the data maintained by the network server 114. The database 406 may, for example, keep a real-time record of critical reference data along with transaction histories, back-up files, and security audit trail information for key events. Examples of specific items that may be stored in the database 406 include: a list of current Pocket Vault holders and appropriate contact information for each; records regarding the versions of software loaded onto each Pocket Vault 102, each pocket vault interface unit 302, and each interface station computer 304; a list of currently authorized or registered Pocket Vaults 102, identified by chip ID and linked to the holder list; a list of currently authorized or registered tokens 102a, identified by chip ID and linked to the holder list; a list of currently authorized locations for interface stations 104 and telephone or other access lines therefor, including business information for each such location and an indication as to the type of interface station 104 it is (e.g., a validation interface station, a personal interface station, or a commercial interface station); a list of currently authorized or registered interface station operators and the interface stations 104 with which they are associated; a list of currently authorized or registered interface stations 104, identified by chip ID and linked to the list of authorized operators therefor, as well as encrypted cookie ID information (if any) for the respective interface stations 104; authorized media data received from media issuers that has not yet been downloaded to individual Pocket Vaults 102; backup data sets for individual Pocket Vault holders; detailed transaction histories for Pocket Vault registrations indicating where each Pocket Vault 102 was shipped from and to, where each Pocket Vault 102 was registered, which authorized interface station operator conducted the registration process, when that authorized operator was added to the list of authorized operators at a particular location, who submitted the key information to add the operator, which corporate representative associated with the network server 114 met with which representative associated with the interface station in establishing each new location for a validation interface station 104a, to whom and when each Pocket Vault 102 was issued; and communication encryption protocols. Each Pocket Vault account defined on the network server 114 may be defined to support multiple Pocket Vaults 102, as well as to identify other family members who may share certain contents of the Pocket Vaults 102 (e.g., family membership in a local museum).

The network server 114 may analyze data regarding consumer transactions, and thereby accumulate demographic information. Using this information, merchants, media issuers, and/or advertisers may, for example, define targeted marketing programs, which the network server 114 may then deliver to Pocket Vault holders that meet particular demographic profiles.

Figure 5:
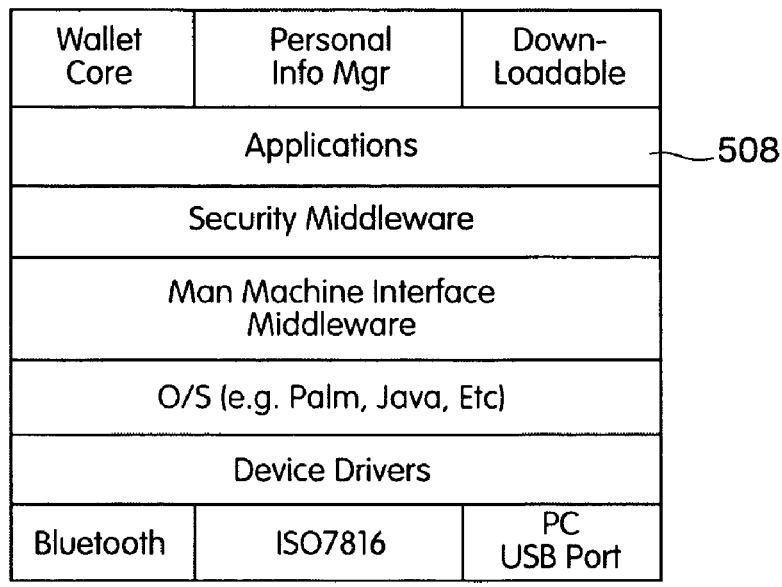
FIG. 5 is a diagram showing an example of how the memory of the Pocket Vault shown in FIG. 2 may be configured in accordance with one embodiment of the invention.

FIG. 5 shows how the memory 210 of the Pocket Vault 102 (FIG. 2) may be organized (conceptually) in accordance with one embodiment of the invention. The purpose of each of the illustrated memory components will be readily understood by those skilled in the art of the invention, and therefore will not be explained in detail.

Figure 6:
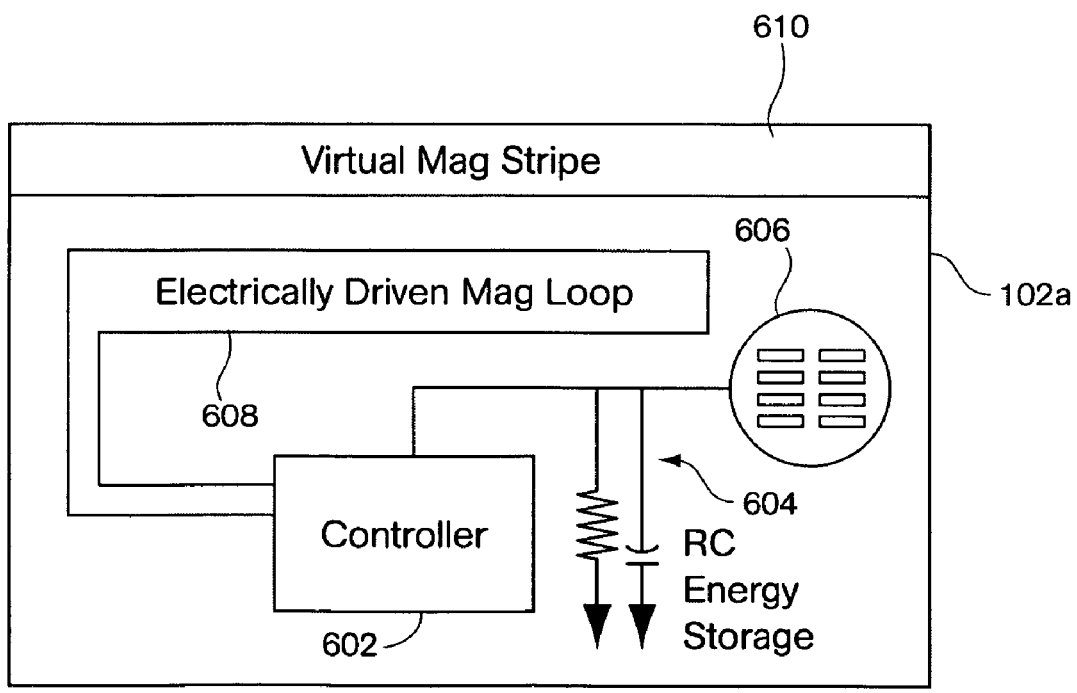
FIG. 6 is a block diagram showing an illustrative embodiment of the card associated with the Pocket Vault shown in FIG. 2.

FIG. 6 is a block diagram showing an example embodiment of the token 102a shown in FIGS. 1 and 2. AS shown, the token 102 may be equipped with a controller 602. In the embodiment shown, the controller 602 may be selectively programmed, for example, via interface terminals 606 to generate a current in a wire loop 608 so as to generate a magnetic field about the wire loop 608 that simulates a magnetic stripe of a standard credit card-like token. In other words, a magnetic field may be generated along the edge of the token 102a as if a magnetic stripe were present on that edge. The location of the simulated magnetic stripe on the token 102a is identified in FIG. 6 as a virtual magnetic stripe 610.

Appropriate software may be loaded onto the controller 602 (e.g., in an on-board memory of the controller 602) so as to enable the controller to generate the virtual magnetic stripe 610. When the token 102a is disposed in the token port 218, the terminals 606 of the token 102a may engage corresponding terminals of the token port 218, thereby enabling the controller 602 to be programmed appropriately. The programming of the controller 602 may be effected, for example, in response to commands from the controller 202 of the Pocket Vault 102, which commands may be generated in response to software executing on the controller 202.

As shown, the controller 602 may be powered by an appropriate resistor-capacitor (RC) circuit which stores a charge that decays over time. The RC circuit may be initially charged via the terminals 606 when the token 102a is disposed in the token port 218 and the controller 602 is being programmed. After the token 102a is removed from the token port 218, the controller 602 will remain powered only so long as sufficient charge remains stored by the RC circuit 604. Because the controller 602 can generate the virtual magnetic stripe 610 only when it is driven by an adequate power supply, the virtual magnetic stripe will disappear after the charge in the RC circuit 604 has decayed beyond a certain threshold level. Because the decay of an RC circuit is reasonably predictable, the virtual magnetic stripe 610 is disposed on the token 102a only for a finite, predetermined period of time after the token 102a is removed from the token port 218. In one embodiment, after the controller 602 loses power, the information with which it was programmed to enable it to generate the virtual magnetic stripe 610 is also lost. Therefore, the virtual magnetic stripe 610 of the token 102a cannot be used again until the controller 602 is again powered up and reprogrammed. Alternatively the controller 602 may cut off the power to the wire loop 608 after a preset amount of time or an amount of time determined by the Pocket Vault holder (possibly within preset limits). Additionally or alternatively, the token 102a may have its own embedded chip ID, which may be accessible only when the token 102a is successfully released form the token port 218.

As mentioned above, FIGS. 7–12 are flow diagrams illustrating an example implementation of software that may be executed by the controller 202 of the Pocket Vault 102. As described below, this proprietary software may enable menu structures, handle preference management, provide the data on and safeguard the programmability of the virtual magnetic stripe 610 (if so equipped), and ensure proper encryption data management. In one embodiment, local software for each Pocket Vault 102 and pocket vault interface station 104 may be upgraded from time to time by automatic download from the network server 114.

During execution of the routines of FIGS. 7–12, various items may be displayed on the display 216, including prompts or icons regarding user input options (when a touch-screen display is employed as the display 216 or a point and click mechanism is employed herewith), and various items may be also be displayed on the token 102a when the token 102a is ejected from the token port 218 of the Pocket Vault 102. FIGS. 26A–P show examples of how the display 216 and the token 102a may appear as the routines of FIGS. 7–12 are executed, and therefore will be discussed in connection with the description of these routines.

Figure 7:
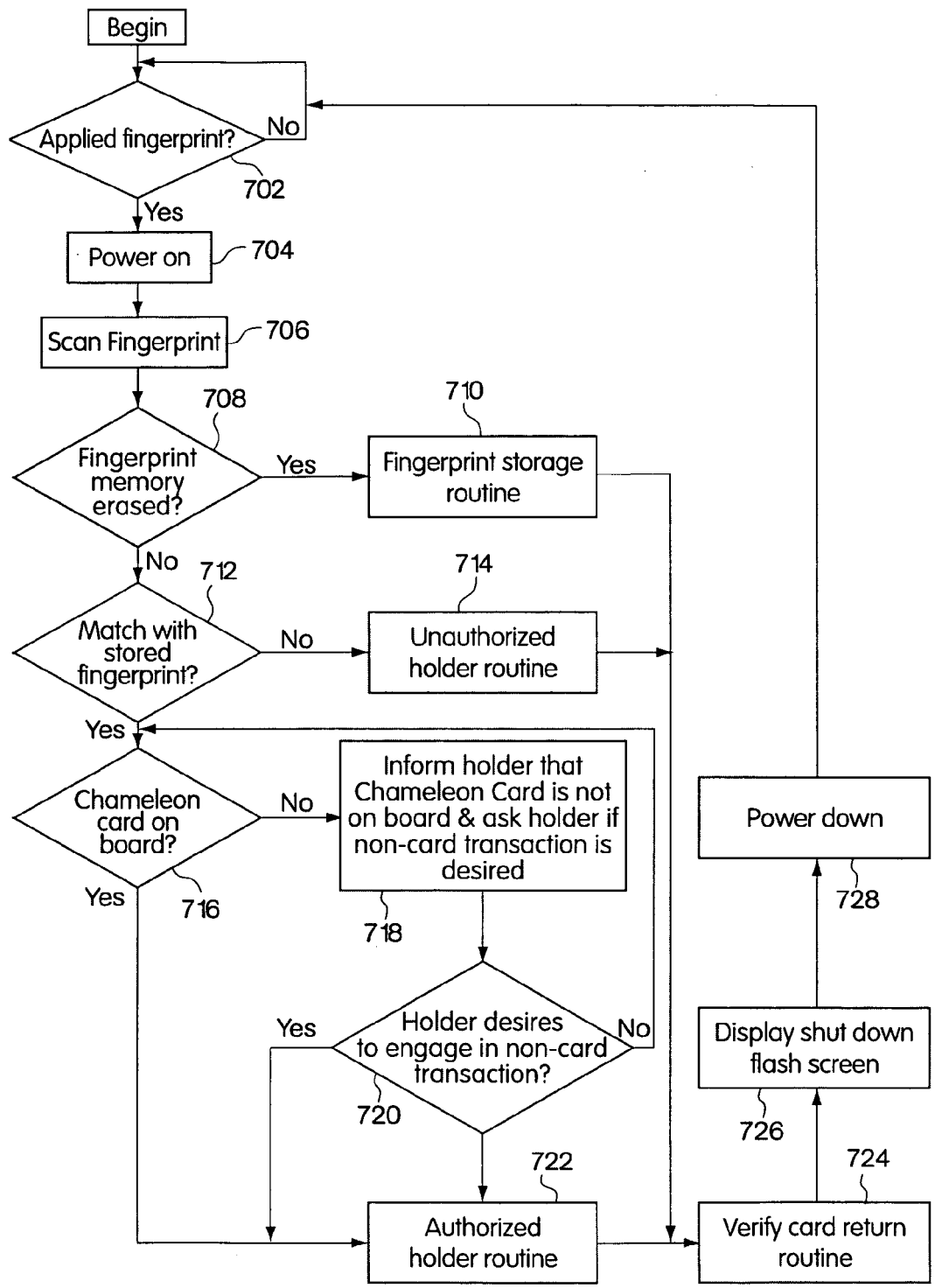
FIG. 7 is a flow diagram illustrating a primary routine that may be executed by the controller of the Pocket Vault shown in FIG. 2.

FIG. 7 is a flow diagram illustrating an example implementation of a primary routine 700 that may be executed by the controller 202 of the Pocket Vault 102. Instructions for the routine 700 may be stored, for example, in the "applications" section 508 of the memory 210 of the Pocket Vault 102.

As shown, the routine 700 begins at a step 702, wherein it is determined whether the Pocket Vault holder has applied his/her fingerprint to the fingerprint scanner 220 of the Pocket Vault 102. At the step 702, the display 216 of the Pocket Vault 102 may be appear as shown in FIG. 26A. That is, the display 216 may be blank at the step 702, as the Pocket Vault 102 is currently powered down.

When, at the step 702, it is determined that the holder has applied his/her fingerprint to the fingerprint scanner 220, the routine 700 proceeds to a step 704, wherein the power manager 214 powers on the Pocket Vault 102. The routine 700 otherwise waits at the step 702 until the Pocket Vault holder has applied a fingerprint to the fingerprint scanner 220. Is should be appreciated, however, that, in some embodiments, the step 702 may not represent an instruction set exceeded by processor 202. Instead, the step 702 may represent the detection of the occurrence of a physical action, e.g., the activation of a hardware switch, and the power manager 214 may be activated in response to the detector of such an action, without requiring intervention by the processor 202.

After the step 704, the routine 700 proceeds to a step 706, wherein the fingerprint scanner 220 scans the applied fingerprint of the Pocket Vault holder.

After the step 706, the routine 700 proceeds to a step 708, wherein it is determined whether the fingerprint memory (e.g., the write-once memory 212 of FIG. 2) is erased. When, at the step 708, it is determined that the fingerprint memory is erased, the routine 700 proceeds to a step 710, wherein the PROCESS FINGERPRINT STORAGE routine (described below in connection with FIG. 8) is executed. When, at the step 708, it is determined that the fingerprint memory is not erased, (i.e., a fingerprint is currently stored in the fingerprint memory), the routine 700 proceeds to a step 712, wherein it is determined whether the fingerprint scanned at the step 706 matches the fingerprint stored in the fingerprint memory 212.

When, at the step 712, it is determined that the scanned fingerprint does not match the stored fingerprint, the routine 700 proceeds to a step 714, wherein the UNAUTHORIZED HOLDER routine (discussed below in connection with FIG. 9) is executed. FIGS. 26B–D show how the display 216 of the Pocket Vault 102 may appear during the UNAUTHORIZED HOLDER routine, and therefore are also discussed below in connection with FIG. 9.

When, at the step 712, it is determined that the scanned fingerprint matches the stored fingerprint, the routine 700 proceeds to a step 716, wherein it is determined whether the Chameleon Card (i.e., the token 102a) is presently on-board the Pocket Vault 102 (i.e., whether the token 102a is disposed within the card port 218 of FIG. 2).

When, at the step 716, it is determined that the token 102a is not on-board the Pocket Vault 102, the routine 700 proceeds to a step 718, wherein the Pocket Vault holder is informed that the Chameleon Card is not on board, and is asked whether he/she wants to engage in a non-card transaction (i.e., a transaction involving the token 102a).

After the step 718, the routine 700 proceeds to a step 720, wherein it is determined whether the holder has selected to engage in a non-card transaction.

When, at the step 720, it is determined that the holder has selected not to engage in a non-card transaction, routine 700 returns to the step 716 (described above), wherein it is again determined whether the Chameleon Card is on board the Pocket Vault 102. Therefore, the holder is permitted to engage in a transaction involving the Chameleon Card only when it has been confirmed that the Chameleon Card is on board the Pocket Vault 102.

When, at the step 720, it is determined that the holder has selected to engage in a non-card transaction, the routine 700 proceeds to the step 722, wherein the AUTHORIZED HOLDER routine (discussed below in connection with FIGS. 10 and 11) is executed.

When, at the step 716, it is determined that the Chameleon Card is on-board the Pocket Vault 102, the routine 700 also proceeds to the step 722, wherein the AUTHORIZED HOLDER routine (discussed below in connection with FIGS. 10 and 11) is executed. FIGS. 26G–N and 26P show how the display 216 of the Pocket Vault 102 and the token 102a ejected therefrom may appear (when employed) during the AUTHORIZED HOLDER routine, and therefore are also discussed below in connection with FIGS. 10 and 11.

After each of the steps 710, 714, and 720 (only one of which is executed during each iteration of the routine 700), the routine 700 proceeds to a step 724, wherein the VERIFY CARD RETURN routine (discussed below in connection with FIG. 12) is executed. FIG. 26O shows how the display 216 of the Pocket Vault 102 may appear during the VERIFY CARD RETURN routine, and therefore is also discussed below in connection with FIG. 12.

After the step 724, the routine 700 proceeds to a step 726, wherein the screen of the display 216 is caused to flash to indicate that the Pocket Vault 102 is being shut down.

After the step 726, the routine 700 proceeds to a step 728, wherein the Pocket Vault 102 is powered down.

After the step 728, the routine 700 returns to the step 702, wherein the Pocket Vault 102 again waits for a fingerprint to be applied to the fingerprint scanner 220, and wherein the display 216 may again appear as shown in FIG. 26A.

Figure 8:
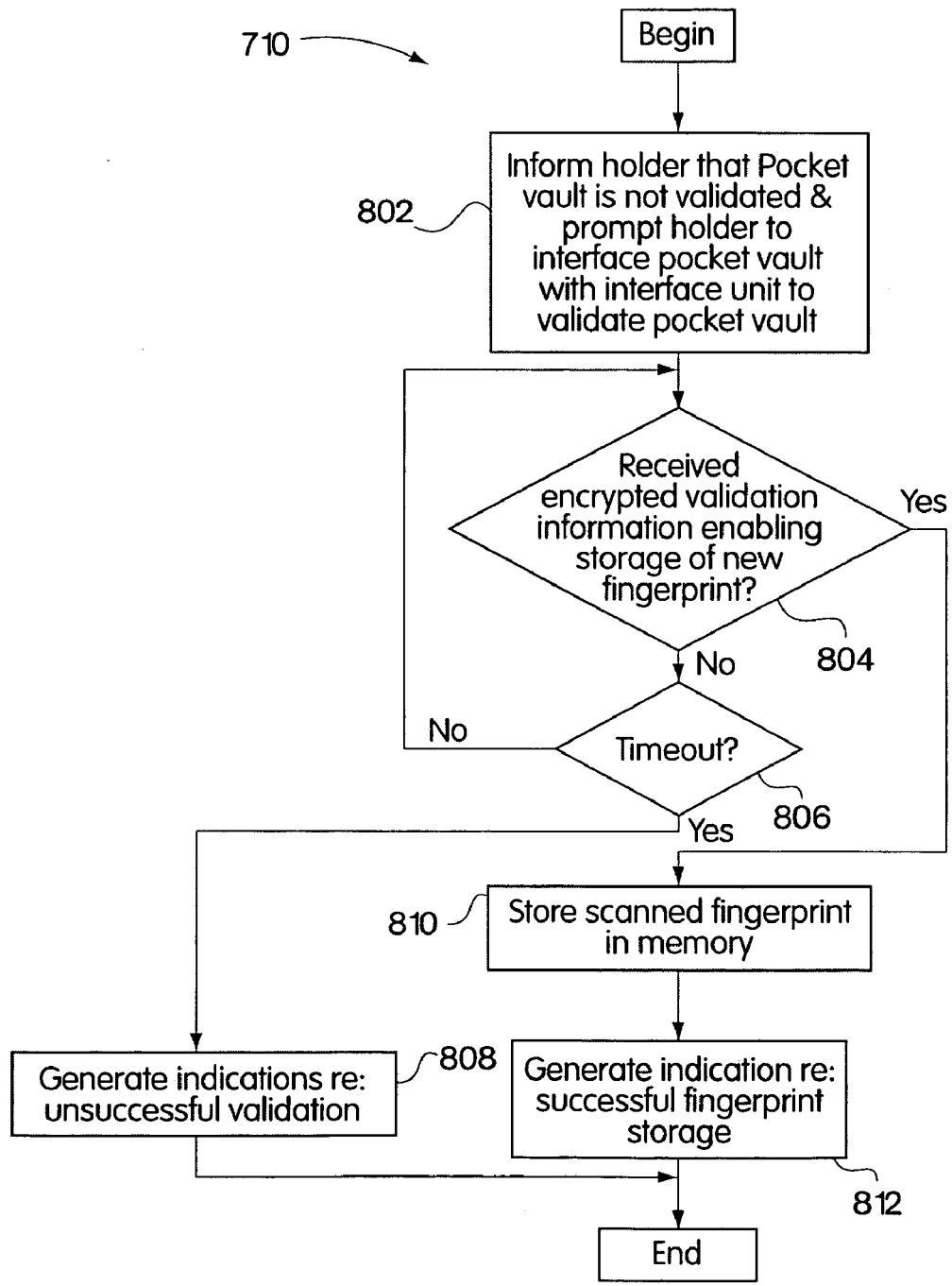
FIG. 8 is a flow diagram illustrating an example implementation of the PROCESS FINGERPRINT STORAGE routine shown in FIG. 7.

FIG. 8 is a flow diagram illustrating an example embodiment of the PROCESS FINGERPRINT STORAGE routine shown in FIG. 7 (step 710).

As shown, the routine 710 begins at a step 802, wherein the holder is informed (e.g., on the display 216) that the Pocket Vault is not currently validated, and that the holder must interface the Pocket Vault 102 with an appropriate interface station 104 (e.g., a validation interface station 104a) if the holder desires to validate the Pocket Vault 102.

After the step 802, the routine 710 proceeds to steps 804 and 806, wherein it is determined whether the Pocket Vault 102 has received encrypted validation information enabling the storage of a new fingerprint in the Pocket Vault's memory prior to the expiration of a timeout period measured by the step 806. This encrypted validation information may, for example, be received by the Pocket Vault 102 via either the docking interface 208 or the transceiver 204 of the pocket vault interface unit 302 of a validation interface station 104a. As discussed in more detail below, this encrypted validation information may, for example, be generated by the network server 114 and forwarded to the pocket vault interface unit 302 of a validation interface station 104a (via the interface station computer 304 of the validation interface station 104a) after certain conditions have been met. The network server 114 may therefore ultimately determine whether each Pocket Vault 102 is permitted to be authenticated by a new holder.

When, at the step 806, it is determined that the time-out period has elapsed, the routine 710 proceeds to a step 808, wherein an indication (e.g., an audio signal from the indicator 215) is generated to inform the holder that the holder's fingerprint has not been successfully stored in the Pocket Vault's memory, and that the validation attempt was therefore unsuccessful.

After the step 808, the routine 710 terminates.

When, at the step 804, it is determined that encrypted validation information has been received before the timeout period of the step 806 has elapsed, the routine 710 proceeds to a step 810, wherein the scanned fingerprint is stored in memory of the Pocket Vault 102 (e.g., in the write-once memory 212).

After the step 810, the routine 710 proceeds to a step 812, wherein an indication (e.g., an audio signal from the indicator 215 of the Pocket Vault 102) is generated to inform the holder that the holder's fingerprint has been successfully stored in the Pocket Vault's memory.

After the step 812, the routine 710 terminates.

Figure 9:
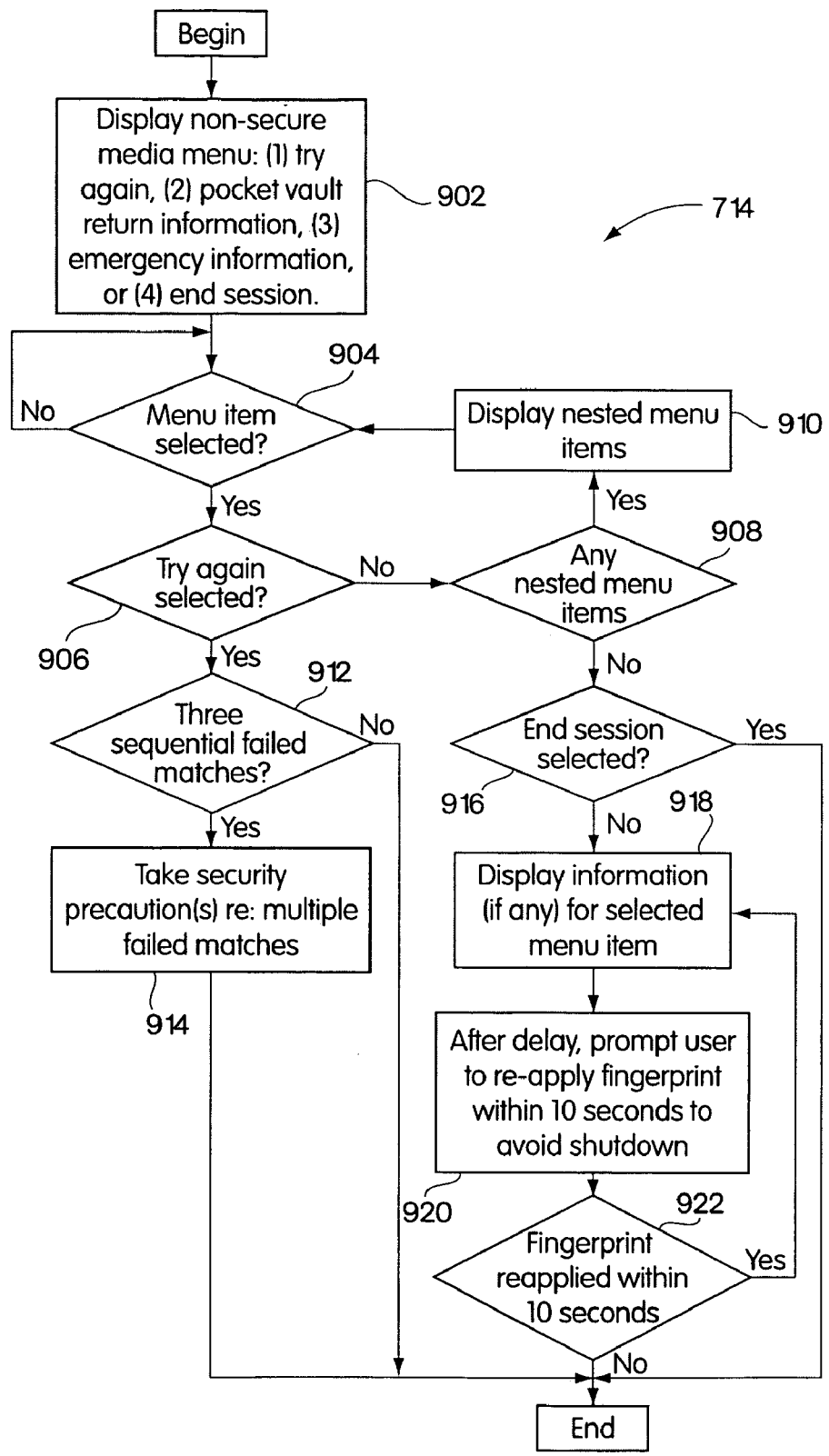
FIG. 9 is a flow diagram illustrating an example implementation of the UNAUTHORIZED HOLDER routine shown in FIG. 7.

FIG. 9 is a flow diagram illustrating an example implementation of the UNAUTHORIZED HOLDER routine shown in FIG. 7 (step 714).

As shown, the routine 714 begins at a step 902, wherein a menu is displayed on the display 216 that permits the holder to select one of several options: (1) TRY AGAIN, (2) POCKET VAULT RETURN INFORMATION, (3) EMERGENCY INFORMATION, or (4) END SESSION. FIG. 26B shows how the display 216 may appear when the step 902 is reached. As shown, textual information and/or icons representing the various menu options may be displayed to the holder.

After the step 902, the routine 714 proceeds to a step 904, wherein the routine 714 waits for one of the displayed menu items to be selected by the holder (e.g., when the holder touches the location on the screen of the display 216 at which the menu item is displayed).

After one of the menu items has been selected at the step 904, the routine 714 proceeds to a step 906, wherein it is determined whether the TRY AGAIN option was selected. By selecting TRY AGAIN, the holder may request that the holder again be permitted to attempt to access the secure contents of the Pocket Vault 102 by reapplying the holder's fingerprint to the fingerprint scanner 220.

When, at the step 906, it is determined that the user has selected the TRY AGAIN option, the routine 714 proceeds to a step 912, wherein it is determined whether this is the third sequential time that the scanned fingerprint has failed to match the fingerprint stored in memory.

When, at the step 912, it is determined that three sequential failed matches have occurred, the routine 714 proceeds to a step 914, wherein certain security precautions are taken in light of the multiple failed attempts to match the holder's fingerprint with that stored in the Pocket Vault 102. For example, when multiple failed matches have occurred, the Pocket Vault's secure memory may be erased, a security alert message may be broadcast by the transceiver 204 and/or any other prudent steps may be taken to ensure that an unauthorized user does not access the Pocket Vault's sensitive contents.

After the step 914, the routine 714 terminates.

When, at the step 912, it is determined that this is not the third consecutive time that the holder's fingerprint has failed to match that stored in the Pocket Vault's memory, the routine 714 terminates, and the holder may then again attempt (at the step 702) to access the Pocket Vault by reapplying his/her fingerprint to the fingerprint scanner 220.

When, at the step 906, it is determined that the TRY AGAIN option has not been selected, the routine 714 proceeds to a step 908, wherein it is determined whether there exist any nested menu items for the menu item selected at the step 904.

When, at the step 908, it is determined that nested menu items do exist for the selected menu item, the routine 714 proceeds to a step 910, wherein the nested menu items for the selected menu item are displayed to the holder on the display 216.

After the step 910, the routine 714 returns to the step 904, wherein the routine 714 again waits for the holder to select one of the displayed menu items.

When, at the step 908, it is determined that no nested menu items exist for the selected menu item, the routine 714 proceeds to a step 916, wherein it is determined whether the END SESSION option has been selected.

When, at the step 916, it is determined that the END SESSION option has been selected, the routine 714 terminates.

When, at the step 916, it is determined that the END SESSION option has not been selected, the routine 714 proceeds to a step 918, wherein the information, if any, for the selected menu item is displayed to the holder on the display 216. Because the step 918 is reached only after a failed attempt to match the holder's fingerprint with that stored in the memory of the Pocket Vault 102, the information displayed at the step 918 may, for example, include information as to where the Pocket Vault may be returned if it is found by someone other than the Pocket Vault holder (see FIG. 26C), or may be emergency information regarding the holder such as the holder's blood type, allergies, persons to contact in case of an emergency, etc. (see FIG. 26D). It should be appreciated that any of a number of non-secure media may be selected using the menu access routine discussed above in connection with steps 904–910, and may be displayed to the person accessing the Pocket Vault 102, regardless of the identity of that person. Of course, this non-secure information may be information that the holder would not mind falling into the hands of a stranger should the holder misplace or have his/her Pocket Vault 102 stolen.

After the step 918, the routine 714 proceeds to a step 920, wherein after a delay of a certain period of time (e.g., thirty seconds), the holder is prompted to reapply his/her fingerprint within a particular period of time (e.g., ten seconds) to avoid shut down of the Pocket Vault 102.

After the step 920, the routine 714 proceeds to a step 922, wherein it is determined whether a fingerprint has been reapplied to the fingerprint scanner 220 within ten seconds.

When, at the step 922, it is determined that a fingerprint has been reapplied to the fingerprint scanner 220 within ten seconds, the routine 714 returns to the step 918 (discussed above), wherein the selected information is again displayed to the user.

When, at the step 922, it is determined that a fingerprint has not been reapplied to the fingerprint scanner 220 within ten seconds, the routine 714 terminates.

Figure 10:
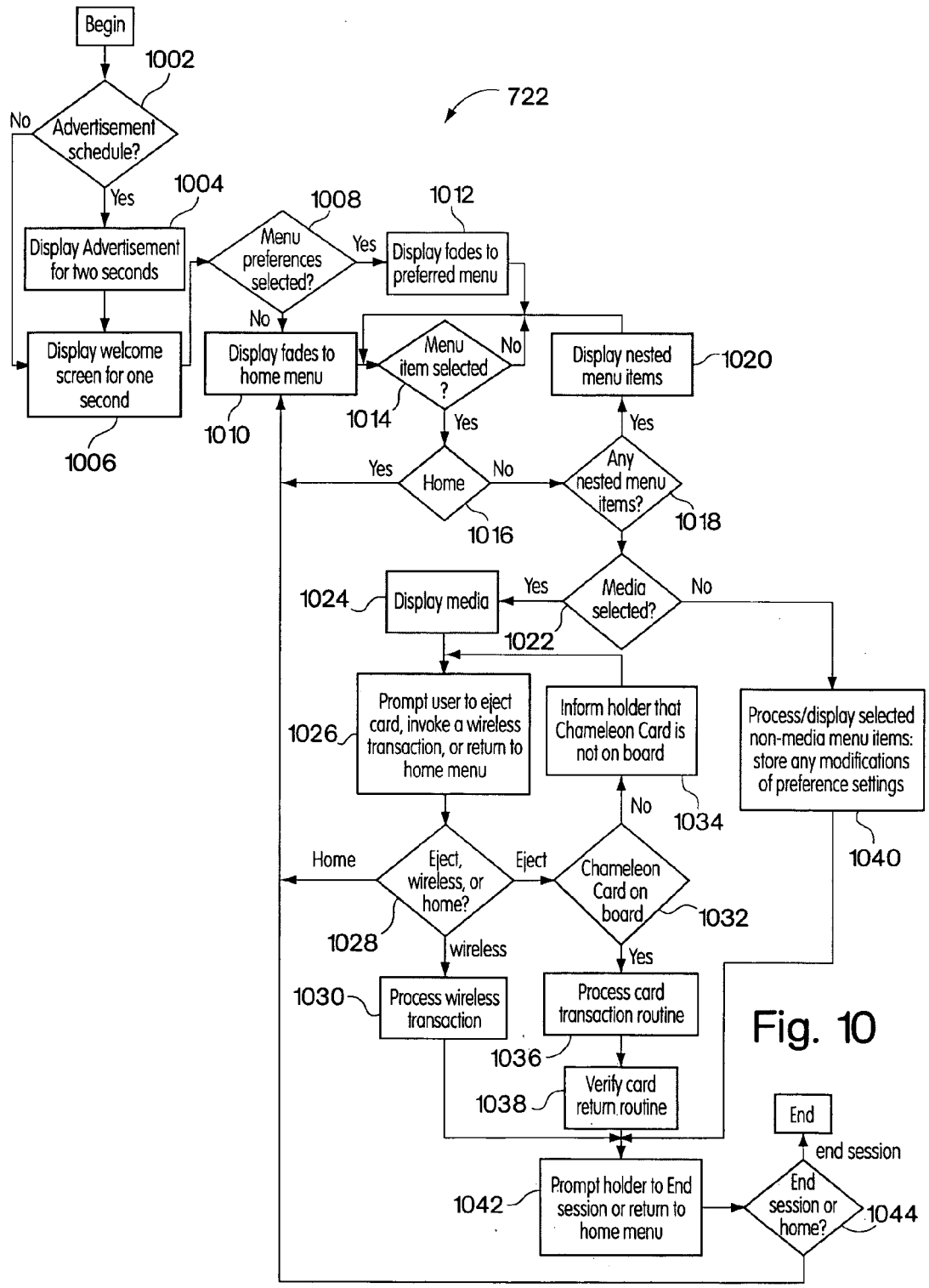
FIG. 10 is a flow diagram illustrating an example implementation of the AUTHORIZED HOLDER routine shown in FIG. 7.

FIG. 10 is a flow diagram illustrating an example implementation of the AUTHORIZED HOLDER routine of FIG. 7 (step 722).

As shown, the routine 722 begins at a step 1002, wherein it is determined whether an advertisement is scheduled for display on the Pocket Vault 102. Information regarding whether certain advertisements are to be displayed by the Pocket Vault 102 may have been uploaded, for example, from the personal interface station 104b in response to the holder previously interfacing the Pocket Vault 102 with the personal interface station 104b to synchronize the contents of the Pocket Vault 102 with information stored on the network server 114. The advertiser 108 (FIG. 1) may, for example, have made arrangements with the company operating the network server 114 to have certain advertising information uploaded to Pocket Vaults 102 when particular Pocket Vault holders interface their Pocket Vaults 102 with their personal interface stations 104b.

When, at the step 1002, it is determined that an advertisement has been scheduled, the routine 722 proceeds to a step 1004, wherein the scheduled advertisement is displayed, for example, for approximately two seconds. FIG. 261 shows an example of how the display 216 may appear when such an advertisement is displayed.

After the step 1004, the routine 722 proceeds to a step 1006, wherein a "welcome screen" is displayed for a brief period (e.g., one second). FIG. 26G shows an example of how the display 216 may appear when such a welcome screen is displayed.

When, at the step 1002, it is determined that an advertisement is not scheduled, the routine 722 proceeds immediately to the step 1006, and no advertisement is displayed to the Pocket Vault holder.

After the step 1006, the routine 722 proceeds to a step 1008, wherein it is determined whether a "preferred" menu has been selected or pre-set for initial display to the Pocket Vault holder.

When, at the step 1008, it is determined that a preferred menu has been selected or pre-set, the routine 722 proceeds to a step 1012, wherein the display 216 fades to the preferred menu. FIGS. 26H and 26J show examples of how the display 216 may appear when such a preferred menu is displayed. In the example of FIG. 26H, the preferred menu immediately shows the holder's preferred credit card as the selected menu item. Should the holder opt to use this media to engage in a transaction, the holder can simply choose the media directly. Alternatively, the holder may opt to access the HOME menu or other menu items by selecting appropriate icons displayed on the screen. In the example of FIG. 26J, the preferred menu immediately shows, perhaps, a selected group of the holder's most frequently used menu items.

When, at the step 1008, it is determined that a preferred menu has not been selected or pre-set, the routine 722 proceeds to a step 1010, wherein the display 216 fades to a standard HOME menu of secure items. FIG. 26L shows an example of how the display 216 may appear when the HOME menu is displayed.

After either one of the steps 1010 and 1012 has been executed, the routine 722 proceeds to a step 1014, wherein the routine 722 waits for the holder to select one of the displayed menu items.

When, at the step 1014, it is determined that the holder has selected a particular menu item, the routine 722 proceeds to a step 1016, wherein it is determined whether the holder has selected to enter or return to the HOME menu.

When, at the step 1016, it is determined that the holder has selected the HOME option, the routine 722 proceeds to the step 1010, wherein the HOME menu of secure items is displayed.

When, at the step 1016, it is determined that the holder has selected a menu item other than the HOME option, the routine 722 proceeds to a step 1018, wherein it is determined whether there exist any nested menu items for the selected menu item.

When, at the step 1018, it is determined that nested menu items do exist for the selected menu item, the routine 722 proceeds to a step 1020, wherein the nested menu items for the selected menu item are displayed. Thus, the holder may work his/her way through various layers of menu items until the desired menu item is reached. It should be appreciated that the menu items on the higher-level layers therefore may be categorized so as to enable the holder to quickly reach the desired media or other menu option.

When, at the step 1018, it is determined that no nested menu items exist for the selected menu item, the routine 722 proceeds to a step 1022, wherein it is determined whether the holder has selected a media from among the available menu items.

When, at the step 1022, it is determined that the holder has not selected a media, the routine 722 proceeds to a step 1040, wherein information relating to the selected non-media item may be displayed, or some other function may performed in accordance with the holder's selection. A non-media menu selection may involve, for example, preference settings for certain functional aspects of the Pocket Vault 102, e.g., whether the holder has a preferred secure menu (see step 1008). Preferences for the services or the device can be selected and, as appropriate, distributed to the Pocket Vault 102 either on the spot or the next time the Pocket Vault is interfaced with an appropriate interface station 104. Preferences may, for example, include definition of home pages, connection of secure and non-secure media, order of media presentment, sort orders, user interface options, synchronization defaults, etc. Preferences that determine which items are displayed on the home page or on other pages may be defined. For example, a Pocket Vault holder may set up three preference sets: one for "business," one for "personal," and one for "vacation." The "personal" and "business" preference sets may be set to be effective at different times of the day and/or different days of the week. The "vacation" preference set may be made effective for specific blocks of time determined by the Pocket Vault holder, possibly overriding the normal timing of the "personal" and "business" sets. The Pocket Vault holder may choose to establish the various preference settings based on his or her judgment or he or she may choose to allow the network server 114, supported by various databases, knowledge of the Pocket vault holder's various media and goals set by the Pocket Vault holder (e.g., minimize interest cost on credit cards or maximize frequent flyer miles, etc.), to determine optimal media use patterns and resulting media menu contents for a particular Pocket Vault holder. Preferences may also be defined between media that will link them for: (a) affiliate credits (like frequent flyer miles) that may be automatically presented to a merchant and tracked for a holder, (b) available discounts afforded by a membership (like senior citizen or AAA discounts), and/or (c) process improvement purposes (e.g., when information needs to be presented in a certain order to work properly). For example, a linkage preference may facilitate presentation of a discount card before presentation of a payment card when buying groceries.

After the step 1040, the routine 722 proceeds to a step 1042, wherein the holder is prompted either to END the session, or to return to the HOME menu.

After the step 1042, the routine 722 proceeds to a step 1044, wherein it is determined whether the holder has opted to END the session or to return to the HOME menu.

When, at the step 1044, it is determined that the holder has selected to return to the HOME menu, the routine 722 proceeds to the step 1010 (discussed above).

When, at the step 1044, it is determined that the holder has opted to END the session, the routine 722 terminates.

When, at the step 1022, it is determined that the holder has selected a media from the displayed menu items, the routine 722 proceeds to a step 1024, wherein the selected media is displayed to the holder on the display 216. The selected media may, for example, be a particular credit card, in which case the name of the credit card and/or the logo for the credit card and any preferred advertisement, specials, etc., for the selected media may be displayed to the holder as well.

After the step 1024, the routine 722 proceeds to a step 1026, wherein the holder is prompted to choose either to: (1) EJECT the card, (2) to invoke a WIRELESS transaction, or (3) to return to the HOME menu.

After the step 1026, the routine 722 proceeds to a step 1028, wherein it is determined which of these three options has been selected by the holder.

When, at the step 1028, it is determined that the holder has opted to return to the HOME menu, the routine 722 proceeds to the step 1010 (discussed above).

When, at the step 1028, it is determined that the holder has selected the EJECT card option, the routine 722 proceeds to a step 1032, wherein it is determined whether the Chameleon Card is on board the Pocket Vault 102 (i.e., whether the token 102a is disposed in the token port 218).

When, at the step 1032, it is determined that the Chameleon Card is not on board the Pocket Vault 102, the routine 722 proceeds to a step 1034, wherein the holder is informed that the Chameleon Card is not on board the Pocket Vault 102.

After the step 1034, the routine 722 proceeds to the step 1026 (discussed above).

When, at the step 1032, it is determined that the Chameleon Card is on board the Pocket Vault 102, the routine 722 proceeds to a step 1036, wherein the PROCESS CARD TRANSACTION routine (discussed below in connection with FIG. 11) is executed.

After the step 1036, the routine 722 proceeds to a step 1038, wherein the VERIFY CARD RETURN routine (discussed below in connection with FIG. 12) is executed.

After the step 1038, the routine 722 proceeds to the step 1042 (discussed above).

When, at the step 1028, it is determined that the holder has opted to invoke a wireless transaction, the routine 722 proceeds to a step 1030, wherein the wireless transaction involving the selected media is executed. This wireless transaction may be invoked, for example, using the transceiver 204 of the Pocket Vault 102 to communicate with the transceiver 310 (FIG. 3) of a commercial interface station 104c (FIG. 1) over a wireless network, such as Bluetooth.

After the step 1030, the routine 722 proceeds to the step 1042 (discussed above).

Figure 11:
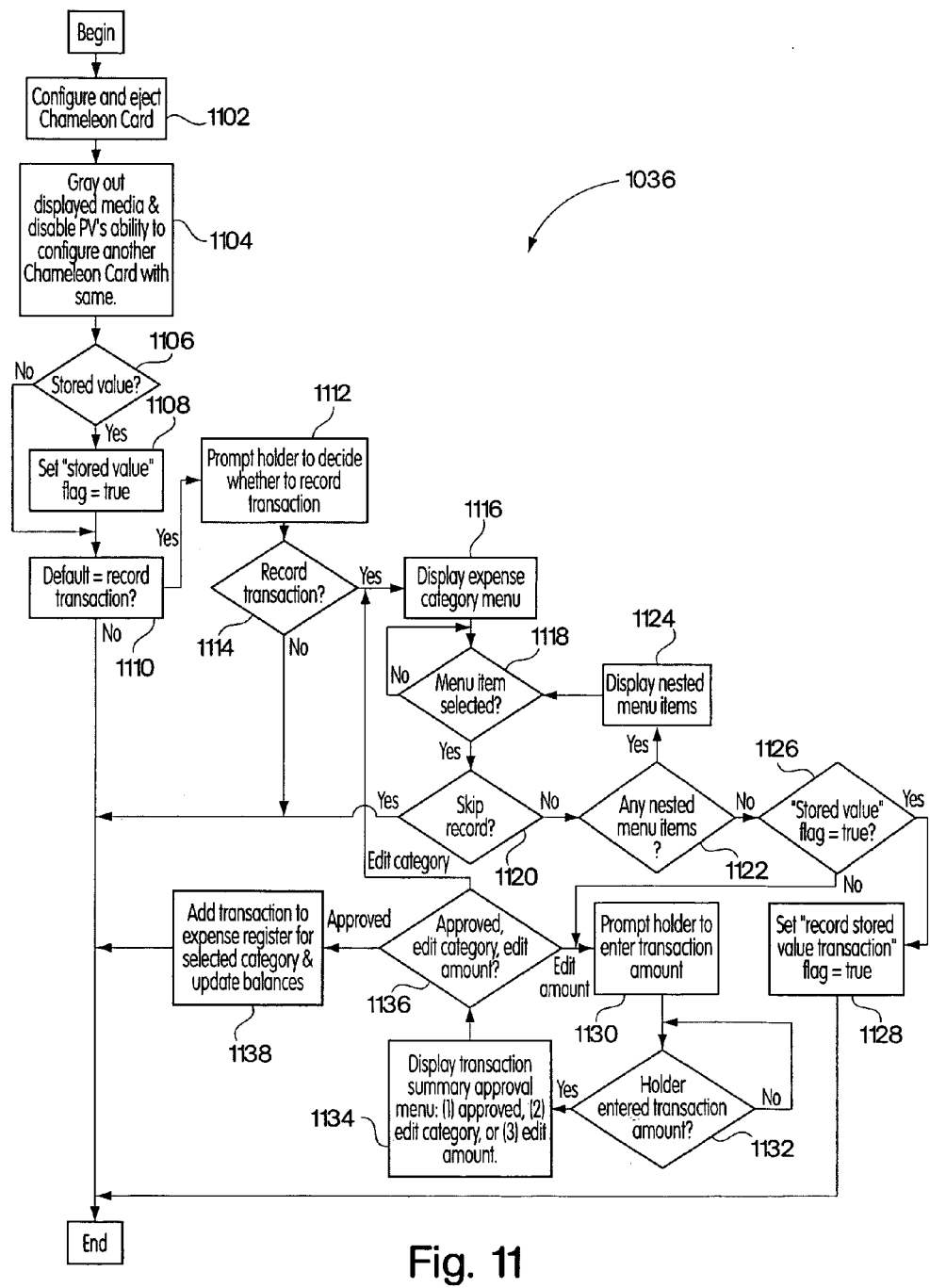
FIG. 11 is a flow diagram illustrating an example implementation of the PROCESS CARD TRANSACTION routine shown in FIG. 10.

FIG. 11 is a flow diagram illustrating an example implementation of the PROCESS CARD TRANSACTION routine of FIG. 10 (step 1036).

As shown, the routine 1036 begins at a step 1102, wherein the Chameleon Card is configured to carry the selected media, and is ejected from the card port 218 (FIG. 2). As discussed above, the token 102a may be configured to carry the selected media in any of a number of ways, and the invention is not limited to any particular type of configuration technique. The card may be configured, for example, by causing it to generate a simulated magnetic stripe for a limited period of time, by causing it to have a bar code disposed on it for a limited period of time, or simply by causing a card number to be visibly disposed on it for a limited period of time. One example of technology that may be employed to cause information to appear temporarily on the token 102a is available from E-ink (www.Eink.com). It should be appreciated, of course, that the card need not be temporarily configured in all embodiments, and may alternatively be configured in a more permanent manner in some embodiments.

After the step 1102, the routine 1036 proceeds to a step 1104, wherein the selected media is grayed out on the display 216 to indicate that the media is currently in use by the Chameleon Card. When the selected media is grayed out, the Pocket Vault's ability to configure another Chameleon Card with the grayed out media may also be disabled. Therefore, in such an embodiment, even if the Pocket Vault holder had an additional Chameleon Card available, the Pocket Vault 102 would be incapable of loading that media onto that Chameleon Card.

After the step 1104, the routine 1036 proceeds to a step 1106, wherein it is determined whether the selected media has stored value associated with it. The selected media may, for example, represent a pre-paid calling card from which value is deducted each time the media is used in a particular transaction, or a frequent flier card to which value (e.g., miles) is added in connection with each airline ticket purchased.

When, at the step 1106, it is determined that the selected media does have stored value associated with it, the routine 1036 proceeds to a step 1108, wherein a "stored value flag" (discussed below in connection with step 1126 of routine 1036 (FIG. 11) and step 1212 of routine 724 (FIG. 12)) is set to TRUE.

After the step 1108, the routine 1036 proceeds to a step 1110, wherein it is determined whether the holder has set a default option so as to permit the holder to maintain expense records by recording transactions into registers assigned to expense categories.

When, at the step 1106, it is determined that the selected media does not have stored value associated with it, the routine 1036 proceeds immediately to the step 1110.

When, at the step 1110, it is determined that the holder has not opted for the ability to maintain expense records, the routine 1036 terminates.

When, at the step 1110, it is determined that the holder has opted for the ability to maintain expense records, the routine 1036 proceeds to a step 1112, wherein the holder is prompted to decide whether to record the currently-pending transaction.

After the step 1112, the routine 1036 proceeds to a step 1114, wherein it is determined whether the holder has opted to record the pending transaction.

When, at the step 1114, it is determined that the holder has not opted to record the transaction, the routine 1036 terminates.

When, at the step 1114, it is determined that the holder has opted to record the transaction, the routine 1036 proceeds to a step 1116, wherein a menu including a number of options involving expense categories are displayed to the holder on the display 216.

After the step 1116, the routine 1036 proceeds to a step 1118, wherein the routine 1036 waits for the holder to select one of the displayed menu options.

When, at the step 1118, it is determined that the holder has selected a menu item, the routine 1036 proceeds to a step 1120, wherein it is determined whether the holder selected the SKIP RECORD option, e.g., when the holder has changed his or her mind and opted not to record a particular transaction.

When, at the step 1120, it is determined that the holder has selected the SKIP RECORD option, the routine 1036 terminates.

When, at the step 1120, it is determined that holder has not selected the SKIP RECORD option, the routine 1036 proceeds to a step 1122, wherein it is determined whether any nested menu items exist for the selected menu item.

When, at the step 1122, it is determined that nested menu items do exist for the selected menu item, the routine 1036 proceeds to a step 1124, wherein the nested menu items are displayed to the holder on the display 216.

After the step 1124, the routine 1036 returns to the step 1118 (discussed above).

When, at the step 1122, it is determined that no nested menu items exist for the selected menu item, the routine 1036 proceeds to a step 1126, wherein it is determined whether the stored value flag was set to TRUE at the step 1108 (discussed above).

When, at the step 1126, it is determined that the stored value flag is set to TRUE, the routine 1036 proceeds to a step 1128, wherein a "record stored value transaction" flag (discussed below in connection with step 1216 of routine 724 (FIG. 12)) is set to TRUE.

After the step 1128, the routine 1036 terminates.

When, at the step 1126, it is determined that the "stored value" flag is not TRUE, the routine 1036 proceeds to a step 1130, wherein the holder is prompted to enter a dollar amount to be recorded for the transaction.

After the step 1130, the routine 1036 proceeds to a step 1132, wherein the routine 1036 waits for the holder to enter a transaction amount. After the holder has entered a transaction amount, the routine 1036 proceeds to a step 1134, wherein a "transaction summary approval" menu is displayed to the holder on the display 216. In the example shown, this menu permits the holder to select (1) to APPROVE the recordation, (2) to change the expense CATEGORY for the transaction, or (3) to change the AMOUNT to be recorded.

After the step 1134, the routine 1036 proceeds to a step 1136, wherein it is determined which of the menu items displayed in step 1134 the holder has selected.

When, at the step 1136, it is determined that the holder has selected to change the transaction AMOUNT, the routine 1036 returns to the step 1130 (discussed above).

When, at the step 1136, it is determined that the holder has opted to change the expense CATEGORY, the routine 1036 returns to the step 1116 (discussed above).

When, at the step 1132, it is determined that the holder has opted to APPROVE the recordation, the routine 1036 proceeds to a step 1138, wherein the entered transaction amount is added to the expense register for the selected category, and the balances associated therewith are updated accordingly.

After the step 1138, the routine 1036 terminates.

Figure 12:
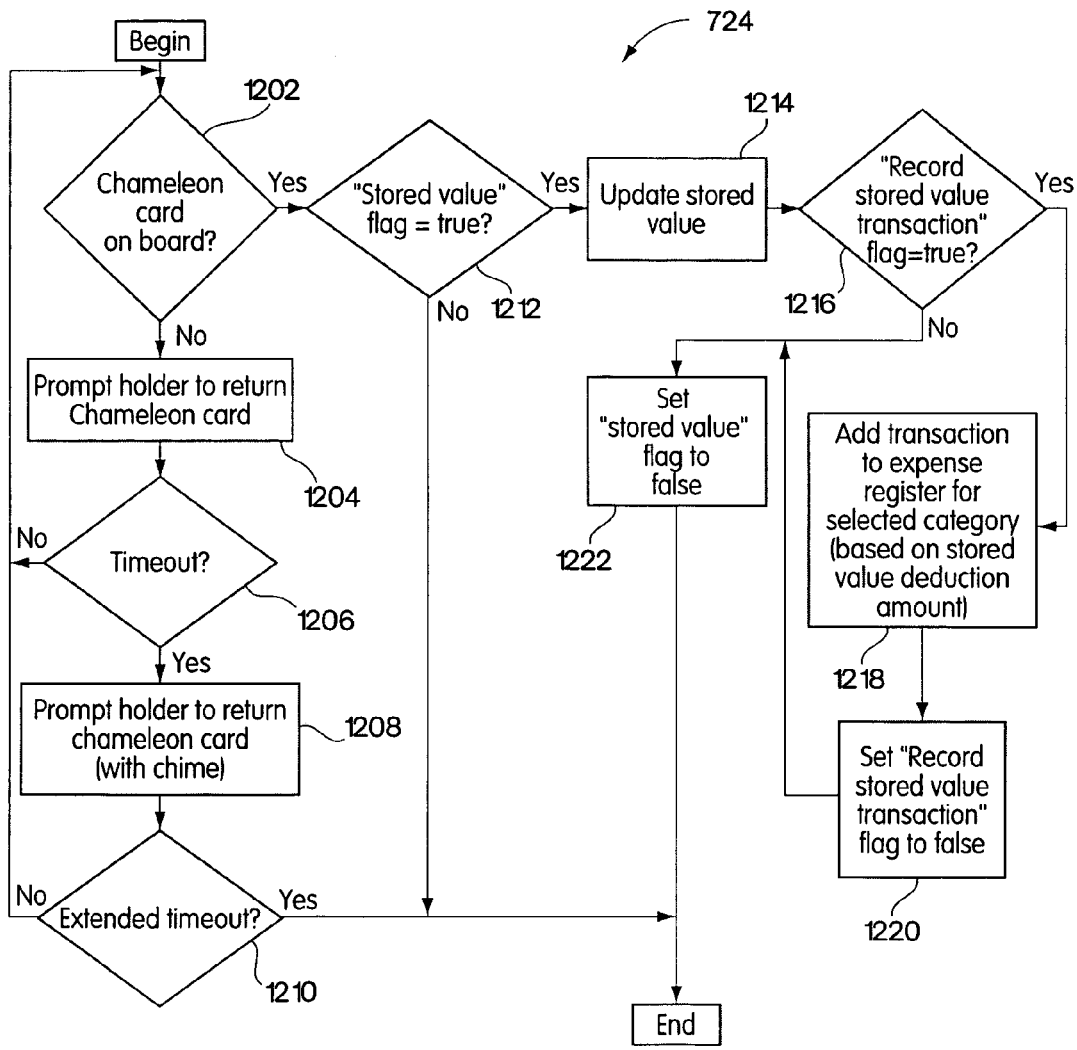
FIG. 12 is a flow diagram illustrating an example implementation of the VERIFY CARD RETURN routine shown in FIG. 7.

FIG. 12 is a flow diagram illustrating the VERIFY CARD RETURN routine of FIG. 7 (step 724).

As shown, the routine 724 begins at a step 1202, wherein it is determined whether the Chameleon Card is currently on board the Pocket Vault 102 (i.e., whether the token 102a is disposed within the token port 218).

When, at the step 1202, it is determined that the Chameleon Card is not on board the Pocket Vault 102, the routine 724 proceeds to a step 1204, wherein the holder is prompted to return the Chameleon Card to the token port 218 (see FIG. 26Q).

After the step 1204, the routine 724 proceeds to a step 1206, wherein it is determined whether a timeout period (e.g., ten seconds) has elapsed since the user was last prompted to return the Chameleon Card to the token port 218.

When, at the step 1206, it is determined that the timeout period has not yet elapsed, the routine 724 returns to the step 1202 (discussed above).

When, at the step 1206, it is determined that the timeout period has elapsed, the routine 724 proceeds to a step 1208, wherein the user is again prompted to return the Chameleon Card, this time with an audio indication (e.g., a "chime" sound generated by the indicator 215 of FIG. 2).

After the step 1208, the routine 724 proceeds to a step 1210, wherein it is determined whether an extended timeout period (e.g., 10 minutes) has elapsed since the user was first prompted to return the Chameleon Card to the token port 218.

When, at the step 1210, it is determined that the extended timeout period has not yet elapsed, the routine 724 returns to the step 1202 (discussed above).

When, at the step 1210, it is determined that the extended timeout period has elapsed, the routine 724 terminates.

When, at the step 1202, it is determined that the Chameleon Card is on board the Pocket Vault 102 (i.e., the token 102a is disposed within the token port 218), the routine 724 proceeds to a step 1212, wherein it is determined whether the "stored value" flag was set to TRUE in step 1108 of the routine 1036 (FIG. 11).

When, at the step 1212, it is determined that the "stored value" flag is not TRUE, the routine 724 terminates.

When, at the step 1212, it is determined that the "stored value" flag is TRUE, the routine 724 proceeds to a step 1214, wherein the stored value for the selected media is updated based on the amount deducted from the Chameleon Card during its use.

After the step 1214, the routine 724 proceeds to a step 1216, wherein it is determined whether the "record stored value transaction" flag was set to TRUE in the step 1128 of the routine 1036 (FIG. 11).

When, at the step 1216, it is determined that the "record stored value transaction" flag is FALSE, the routine 724 proceeds to a step 1222, wherein the "stored value" flag is set to FALSE.

When, at the step 1216, it is determined that the "record stored value transaction" flag is TRUE, the routine 724 proceeds to a step 1218, wherein the dollar amount of the transaction is added to the selected expense register (i.e., the expense register selected at the step 1118 of the routine 1036 (FIG. 11)). The dollar amount entered is determined based on the dollar amount that was deducted from the stored value on the Chameleon Card as a result of the transaction.

After the step 1218, the routine 724 proceeds to a step 1220, wherein the "record stored value transaction" flag is set to FALSE.

After the step 1220, the routine 724 proceeds to the step 1222 (discussed above).

After the step 1222, the routine 724 terminates.

In addition to a routine such as that discussed above in connection with FIGS. 7–12, certain software enhancements may also be disposed in the memory 210 of a Pocket Vault 102 for use with the controller 202. One such software enhancement involves the use of "system preference file" software. This software may establish certain preferences that cannot be altered on the Pocket Vault 102 by the holder, and which may be stored in encrypted form, along with certain information regarding value-based media. For example, Pocket Vaults 102 may be sold with a choice of two or three advertising profiles. During the Pocket Vault registration and validation process (described below), an encrypted system preference file may be created that indicates whether the device was, for example, subject to a "Premium," "Plus" or "Base" profile status. This status may have been selected, for example, on the Pocket Vault 102 itself, or using one of the interface stations 104a–c when the Pocket Vault 102 was interfaced therewith.

Under the "Premium" profile, the Pocket Vault 102 may be advertising-free, but cost a significant amount. Under the "Plus" profile, the Pocket Vault 102 may display only advertising related to shops or services you currently patronize, but cost significantly less than the "Premium" version. Under the "Base" profile, the Pocket Vault may have a variety of advertising on a regular basis, subject only to network "saturation effectiveness" limitations, and the Pocket Vault 102 may be free, or nearly so (e.g., a small purchase charge to generate in-store revenue for the retailer may be charged).

A holder's choice about participation in specific promotional campaigns linked to the holder's buying behavior may also be part of the registration process and affect retail pricing. Once chosen, the network server 114 may send a message to the Pocket Vault 102, e.g., via the validation interface station 104a, and direct the storage of necessary encrypted information on the Pocket Vault 102 (e.g., "Buyer Profile Participant").

The advertising and marketing choices may be changed at a date after purchase and result in a changed set of costs (either credits or debits) to the Pocket Vault holder. Other system preference data may include the "saturation effectiveness" limitations on the amount of advertising that can appear during any given single use window (a particular period during which the device is powered on), any given hour, any given day and/or any given month. The limitations may control both the number of advertisements permitted and the amounts of advertisement time permissible (e.g., seconds per advertisement), by category (e.g., such limitations may, for example, based on categories of advertisements be imposed general advertising, advertising from retailers that the Pocket Vault holder already patronizes and advisory notices from the network server 114. For example, these limits may be set to balance the need for advertising revenue with the need to not overwhelm or annoy Pocket Vault holders. This preference file may, for example, limit all advertising to one advertisement per "on-session," two advertisements per hour, four advertisements per day and/or twenty advertisements per month. General advertisements might get priority claim on this time up to a set limit (say 75% of all advertisement time), with targeted advertisements next, and advisory messages last.

Another software enhancement that may be employed is software used for preference file management. Such "preference file management" software may, for example, include a default file which is periodically updated from the network server 114, and a Pocket Vault holder custom file. Using this software, the holder may, for example, be able to modify: (1) the initial on-screen backdrop and message greeting; (2) the menu structure and media order within menu screens; (3) some (but not all) of the bio-metric input requirement parameters; (4) the amount of on-time after the bio-metric data is confirmed (within pre-set limits); (5) the ability to conceal all or part of the credit or debit account information on the Chameleon Card display area; (6) the normal restaurant tip percentage; (7) the links between certain media; and/or oversight preference restrictions.

For example, some of the menu tree structures for the Pocket Vault 102 may be set by the holder. This may include the sequence in which certain screens appear (e.g., debit screens before credit screens), among credit screens (e.g., Visa before MasterCard) and media order-of-appearance within a screen (e.g., FirstCard Visa before Chase Visa).

Generally, a retailer does not need to see a credit or debit account number, while the approving entity contacted on the dialup modem does. Today, credit and debit cards have this information embossed on the card and recorded in the magnetic stripe on the back of the card. If the magnetically encoded information is unreadable due to mechanical wear of the magnetic stripe or for other reasons, the embossed image can always be read by the clerk and manually keyed in. There is no way for this embossing to disappear when it is not needed and appear at just the right time, either with a standard card or a Smartcard. As a result, such numbers are generally in view and this visibility may lead to fraud. In one embodiment, the Pocket Vault 102 may be programmed to conceal this number, unless prompted to the contrary by the holder. A retailer may confirm the kind of credit or debit being presented and the full name on the card, without having to see or be told the account number. On the rare occasion when the number itself is needed, the holder may, for example, repeat the bio-metric input to the Pocket Vault 102 to reveal the card account number. If placed in the personal interface station 104c, such account numbers may be automatically revealed (e.g., through detection of an encrypted cookie on the interface station computer 304 of the personal interface station 104c).

If the holder establishes a preferred tip percentage, this preferred tip amount may be automatically applied to restaurant checks. This may eliminate a step in restaurant check close-out and reduce the hassle of calculating an appropriate tip and eliminate the need for waitstaff to return to pick up the credit receipt with the tip.

The holder may also choose to link certain media on the Pocket Vault 102 to reduce selection tasks at the point-of-transaction. For example, the holder may link certain credit or debit cards to certain frequent buyer ID cards, thereby enabling the holder to pick a grocery store frequent buyer card (which would be linked to a debit card and brought up automatically after the grocery store card).

At the point of registration or issuance, a Pocket Vault holder may be asked if there is to be any transaction oversight security. If the answer is yes, a second bio-metric input may be required from the individual endowed with that oversight role. For example, a parent may choose to get a Pocket Vault 102 for a child or other relative who may lack certain fiscal discipline. At issuance, and prior to any credit or debit media being added to the Pocket Vault 102, the oversight authority may need to be established. The person having such oversight authority may then have sole access to a profile of transaction preference data. The person having the oversight authority may therefore create and modify this profile any time after issuance. This data set may limit one or more of the following: (1) debit and credit transaction dollar volume per day, per week and/or per month; (2) certain purchase restrictions such as the types of retailers to whom payments are permitted, such as exclusion of gambling establishments or liquor stores; and (3) geographic restrictions such as payments within 10 miles of a son's or daughter's college campus, but not beyond).

Another software enhancement that may be employed is software for managing media image libraries. Every media image sent to the display 216 may actually be a composite of from two to five layers of graphics files. Layers one, two and four may, for example, be stored in media library files while layers three and five may include text and data files stored in memory on the Pocket Vault 102. For example, a credit card image may comprise separate layers for: (1) the standard credit card background and icon; (2) the issuing bank's overlay icons and text; (3) the individual's account number; and (4) customized advertising from the issuing bank and/or credit card company.

Layering the image in this fashion may minimize data transmission requirements, reduce memory storage requirements, and speed up screen display. For example, Pocket Vaults 102 may be preloaded at point of manufacture with background images of the top ten credit images, three passport images (e.g., EU, US, Japan), and a handful of other globally-relevant backgrounds. When, for example, a Pocket Vault holder living in Boston initially registers a device, it may trigger downloading of the top five additional background images prevalent in that area. When the individual applies for and is electronically issued a new credit card over the network system 100, the download from the network server 114 may include a second layer credit card company overlay for the credit card, along with the third layer of account and name information, and the fourth layer of the most recent customized advertisement from the credit card company related to a seasonal promotion of card usage.

The advertisement layer may be temporary in nature. This layer may, for example, remain on-screen for a given number of seconds, predetermined by the time period of the advertisement paid for by the advertiser. Underneath such an advertisement, a fifth layer of Pocket Vault holder-determined data may appear, also for a temporary period, in this case for privacy reasons and for a period set by the holder. This positioning of the holder's data below the advertising data increase the value of the advertisement time, since holders will be likely to view the display 216 awaiting the appearance of their data, which may also remain on-screen for only a set number of second. For example, such holder-specific data may include the last date of the next billing period, or the total charges since the last billing period on this particular card or on all of the holder's credit cards. Such balance information may be generated, for example, by the financial management software. The initial on-screen image may also be layered, for example, with a market-tailored backdrop and a sign-on message, both of which possibly being modifiable could be modified by the appropriate setting of user preferences.

Another software enhancement that may be employed is software to manage memos. Certain screen choices may, for example, result in the viewing of memos created by and for the Pocket Vault holder. These memos may be written on a home PC and transferred to a Pocket Vault 102 when the Pocket Vault 102 is interfaced with the personal interface station 104c for an update/download session. Alternatively, such memos may be created on the Pocket Vault 102 using a screen-based keyboard function similar to that of a Palm Pilot. The memo template software may provide certain standard backgrounds and layouts to support this feature. This feature may help to eliminate the need for scraps of various notes now found in most wallets.

Yet another software enhancement that may be employed is software to manage advertising messages. Such advertising message management software may, for example, perform several noteworthy functions: (1) limiting the appearance of advertising in accordance with the advertising profile (e.g., stored in the network server 114) of the particular Pocket Vault holder; (2) limiting the appearance of advertising to a certain number of times per on-session, per hour, per day, per week and/or per month; (3) tracking the number of times each advertisement appears since the last download/update session (since the number of on-sessions during any period will govern the number of opportunities certain advertisements have to run, this tracking may be necessary to enable billing of advertisers for actual advertisement exposure levels; (4) generating reminder advertisements for frequent buyer cards (e.g., a message such as "Ten weeks since your last car wash! One more and the next is free!"); and (5) tracking the effectiveness of advertising through linkage to the transaction files (e.g., the ability to build more accurate, comprehensive buying profiles since all of an individual's media are now "under one roof").

Another software enhancement that may be employed is software to process transaction data. Such transaction processing software may, for example, include the ability to track total outstanding transactions on particular media and compare those to media limits at the time of the next transaction, along with date validity of the media. If a particular piece of media is no longer valid, selection of this item from a menu may produce a message such as "expired," or "requires update to extend period of validity," or "payment of balance required before re-use."

Another software enhancement that may be employed is software to manage frequent buyer data. Such frequent buyer data management software may, for example, track purchases at stores with frequent buying programs that participate in the network system 100. This software may also indicate any frequent buyer credits that are about to expire or create advertisements that remind their Pocket Vault holders that they are about to qualify for a free item. For example, a tenth gasoline purchase at a service station/car wash may generate a message indicating that the holder is "now entitled to free car wash."

Yet another software enhancement that may be employed is software for managing financial information. This type of software may, for example, enable easy download advertisements into personal finance software used by some PC owners. It may also support certain on-board functionality in the Pocket Vault, such as charge card management, automatically shifting from the preferred credit card to another credit card, for example: (1) when a transaction would cause a credit limit to be exceeded, (2) when using a different card would lengthen the time after which actual payment would be due, (3) when using another card would garner desired contest eligibility, or maximize cash back points for a particular period, and/or (4) when use of another card would preclude having to pay annual dues.

Another software enhancement that may be employed is Global Positioning Software. Integration of this functionality with memo information and frequent buyer information may induce visits to nearby stores at convenient times to take advantage of sales, frequent buyer credits, etc.

Figure 13:
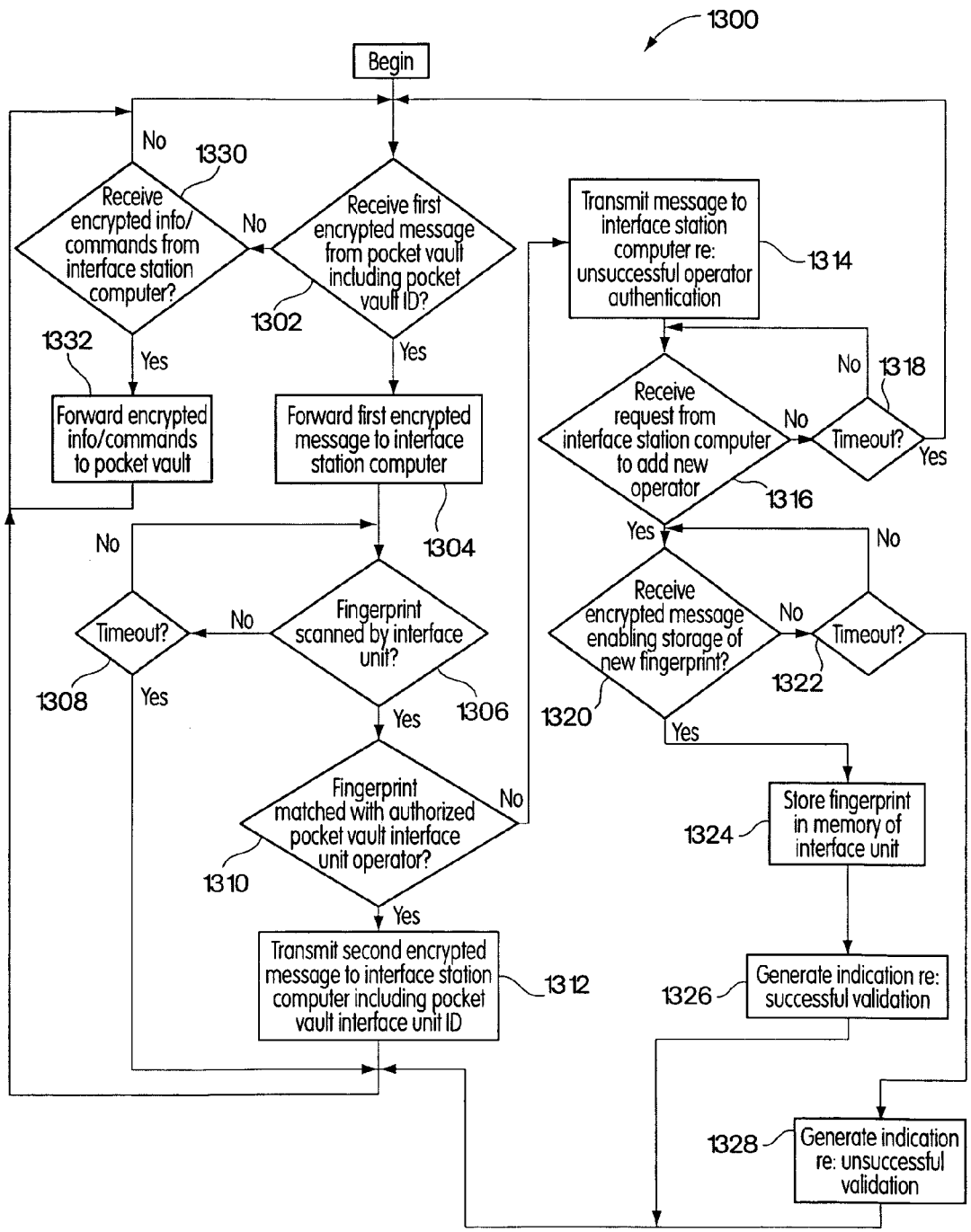
FIG. 13 is a flow diagram illustrating an example implementation of a primary routine that may be executed by the controller of the pocket vault interface unit shown in FIG. 3.

FIG. 13 is a flow diagram illustrating an example implementation of a primary routine 1300 that may be executed by the controller 306 of the pocket vault interface unit 302 (FIG. 3).

As shown, the routine 1300 begins at a step 1302, wherein it is determined whether a first encrypted message has been received from the Pocket Vault 102 including an ID code that is released from the Pocket Vault only upon proper user authentication (e.g., in response to a fingerprint match).

When, at the step 1302, it is determined that such a first encrypted message has not been received from the Pocket Vault 102, the routine 1300 proceeds to a step 1330, wherein it is determined whether any encrypted information and/or commands have been received from the interface station computer 304.

When, at the step 1330, it is determined that no information or commands have been received from the interface station computer 304, the routine 1300 returns to the step 1302 (discussed above).

When, at the step 1330, it is determined that information and/or commands have been received from the interface station computer 304, the routine 1300 proceeds to a step 1332, wherein the received information and/or commands are forwarded to the Pocket Vault 102.

After the step 1332, the routine 1300 returns to the step 1302 (discussed above).

When, at the step 1302, it is determined that a first encrypted message including a Pocket Vault ID has been received from the Pocket Vault 102, the routine 1300 proceeds to a step 1304, wherein the first encrypted message is forwarded to the interface station computer 304 (FIG. 3).

After the step 1304, the routine 1300 proceeds to steps 1306 and 1308, wherein it is determined whether a fingerprint has been scanned by the fingerprint scanner 316 of the pocket vault interface unit 302 before a timeout period measured by the step 1308 has elapsed.

When, at the steps 1306 and 1308, it is determined that a fingerprint has not been scanned within the timeout period of step 1308, the routine 1300 terminates.

When, at the steps 1306 and 1308, it is determined that a fingerprint has been scanned by the fingerprint scanner 316 in a timely manner, the routine 1300 proceeds to a step 1310, wherein it is determined whether the scanned fingerprint matches a fingerprint stored in the memory 314 of the pocket vault interface unit 302.

When, at the step 1310, it is determined that the scanned fingerprint does match that of an authorized operator of the interface unit 302, the routine 1300 proceeds to a step 1312, wherein a second encrypted message, including an ID of the pocket vault interface unit 302 that is released only after a successful fingerprint match, is transmitted to the interface station computer 304.

After the step 1312, the routine 1300 returns to the step 1302 (discussed above).

When, at the step 1310, it is determined that the scanned fingerprint does not match any fingerprint stored in the memory 314 of the pocket vault interface unit 302, the routine 1300 proceeds to a step 1314, wherein a message is transmitted to the interface station computer 304 indicating there has been an unsuccessful attempt to authenticate an operator of the pocket vault interface unit 302.

After the step 1314, the routine 1300 proceeds to steps 1316 and 1318, wherein it is determined whether, before the expiration of a timeout period measured by the step 1318, a request has been received from the interface station computer 304 to add a new operator to the pocket vault interface unit 302 (e.g., to add the fingerprint of another operator to the memory 314).

When, at the steps 1316 and 1318, it is determined that such a request has not been received from interface station computer 304 in a timely manner, the routine 1300 returns to the step 1302 (discussed above).

When, at the steps 1316 and 1318, it is determined that a request to add a new operator to the pocket vault interface unit 302 has been received from the interface station computer 304 in a timely manner, the routine 1300 proceeds to steps 1320 and 1322.

At the steps 1320 and 1322, it is determined whether encrypted validation information for enabling the pocket vault interface unit 302 to store the fingerprint of the new operator in the memory 314 has been received from the interface station computer 304 before the expiration of a timeout period measured by the step 1322.

When, at the steps 1320 and 1322, it is determined that the encrypted validation information has not been received from the interface station computer 304 in a timely manner, the routine 1300 proceeds to a step 1328, wherein an indication (e.g., an audio tone) regarding the unsuccessful validation attempt is generated.

After the step 1328, the routine 1300 terminates.

When, at the steps 1320 and 1322, it is determined that the encrypted validation information has been received from the interface station computer 304 in a timely manner, the routine 1300 proceeds to a step 1324, wherein the scanned fingerprint of the new user is stored in the memory 314.

After the step 1324, the routine 1300 proceeds to a step 1326, wherein an indication (e.g., an audio tone) regarding the successful validation of the new operator is generated.

After the step 1326, the routine 1300 terminates.

Figure 14:
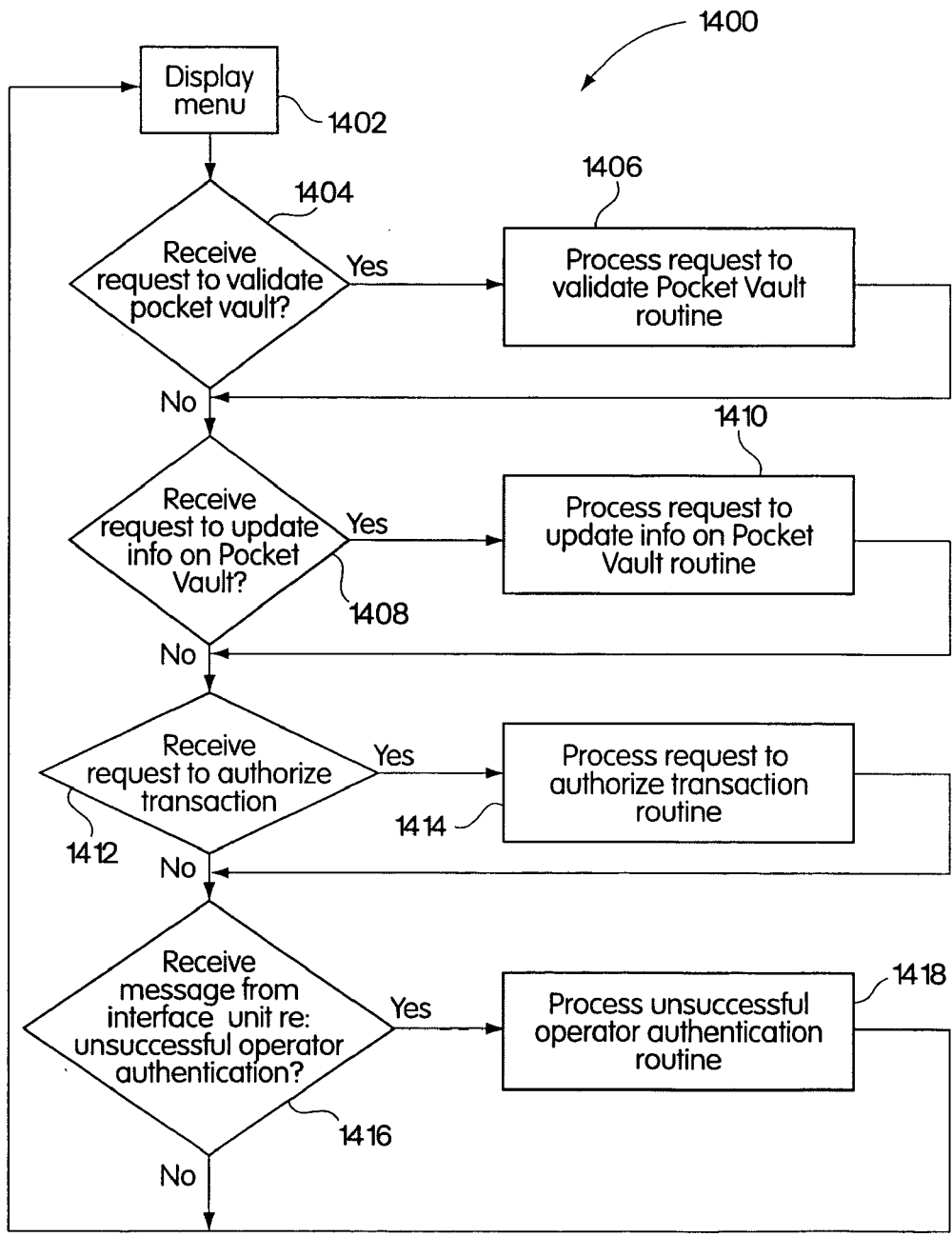
FIG. 14 is a flow diagram illustrating an example implementation of a primary routine that may be executed by the controller of the interface station computer shown in FIG. 3.

FIG. 14 is a flow diagram illustrating example implementation of a primary routine 1400 that may be executed by the controller 308 of the interface station computer 304 of FIG. 3.

As shown, the routine 1400 begins at a step 1402, wherein a menu is displayed on the display 324 of the interface station computer 304 that gives the operator of the interface station computer 304 several options to choose from. These options may, for example, include: (1) the option to request that a Pocket Vault 102 be validated (i.e., permitted to store a new finger print), (2) the option to request that the information currently stored on a Pocket Vault 102 be updated (e.g., information may be uploaded from the network server 114), and/or (3) the option to request that a transaction involving a Pocket Vault 102 be authorized. It should be appreciated that the foregoing are only examples of menu options that may be provided to the operator of the interface station computer 304, and that the invention is not limited to the particular examples described. It should also be appreciated that fewer than all of the options shown may be provided in connection with different types of interface stations. For example, a validation interface station 104*a* may be provided only with option (1), a personal interface station may be provided only with option (2), and a commercial interface station may be provided only with option (3).

After displaying the menu at the step 1402, the routine 1400 proceeds to a step 1404, wherein it is determined whether any requests to validate Pocket Vaults 102 have been received.

When, at the step 1404, it is determined that no request to validate a Pocket Vault 102 has been received, the routine 1400 proceeds to a step 1408, wherein it is determined whether any requests to update information on Pocket Vaults 102 have been received.

When, at the step 1408, it is determined that no request to update the information on a Pocket Vault 102 has been received, the routine 1400 proceeds to a step 1412, wherein it is determined whether any requests to authorize transactions involving Pocket Vaults 102 have been received.

When, at the step 1412, it is determined that no request to authorize a transaction involving a Pocket Vault 102 has been received, the routine 1400 proceeds to a step 1416, wherein it is determined whether the interface station computer has received any messages from Pocket Vault interface units 302 indicating that an unsuccessful operator authentication has occurred (i.e., the fingerprint of an operator scanned by the fingerprint scanner 316 has failed to match a fingerprint stored in the memory 314).

When, at the step 1416, it is determined that no such messages have been received, the routine 1400 returns to the step 1402, wherein the menu of the various options for the operator is again displayed. Thus, the menu 1402 is displayed until one of the various options is selected in accordance with any of the steps 1404, 1408, 1412, or 1416.

When, at the step 1404, it is determined that a request to validate a Pocket Vault 102 has been received, the routine 1400 proceeds to a step 1406, wherein the PROCESS REQUEST TO VALIDATE POCKET VAULT routine (discussed below in connection with FIG. 15) is executed.

After the step 1406, the routine 1400 proceeds to the step 1408 (discussed above).

When, at the step 1408, it is determined that a request to update the information on a Pocket Vault 102 has been received, the routine 1410 proceeds to a step 1410, wherein the PROCESS REQUEST TO UPDATE INFO ON POCKET VAULT routine (discussed below in connection with FIG. 16) is executed.

After the step 1410, the routine 1400 proceeds to the step 1412 (discussed above).

When, at the step 1412, it is determined that a request to authorize a transaction involving a Pocket Vault 102 has been received, the routine 1400 proceeds to a step 1414, wherein the PROCESS REQUEST TO AUTHORIZE TRANSACTION routine (discussed below in connection with FIG. 17) is executed.

After the routine 1414, the routine 1400 proceeds to the step 1416 (discussed above).

When, at the step 1416, it is determined that a message has been received from an interface station computer 304 indicating that an attempted fingerprint match of an operator has failed, the routine 1400 proceeds to a step 1418, wherein the PROCESS UNSUCCESSFUL OPERATOR AUTHENTICATION routine (discussed below in connection with FIG. 18) is executed.

After the step 1418, the routine 1400 returns to step 1402 (discussed above).

Figure 15:
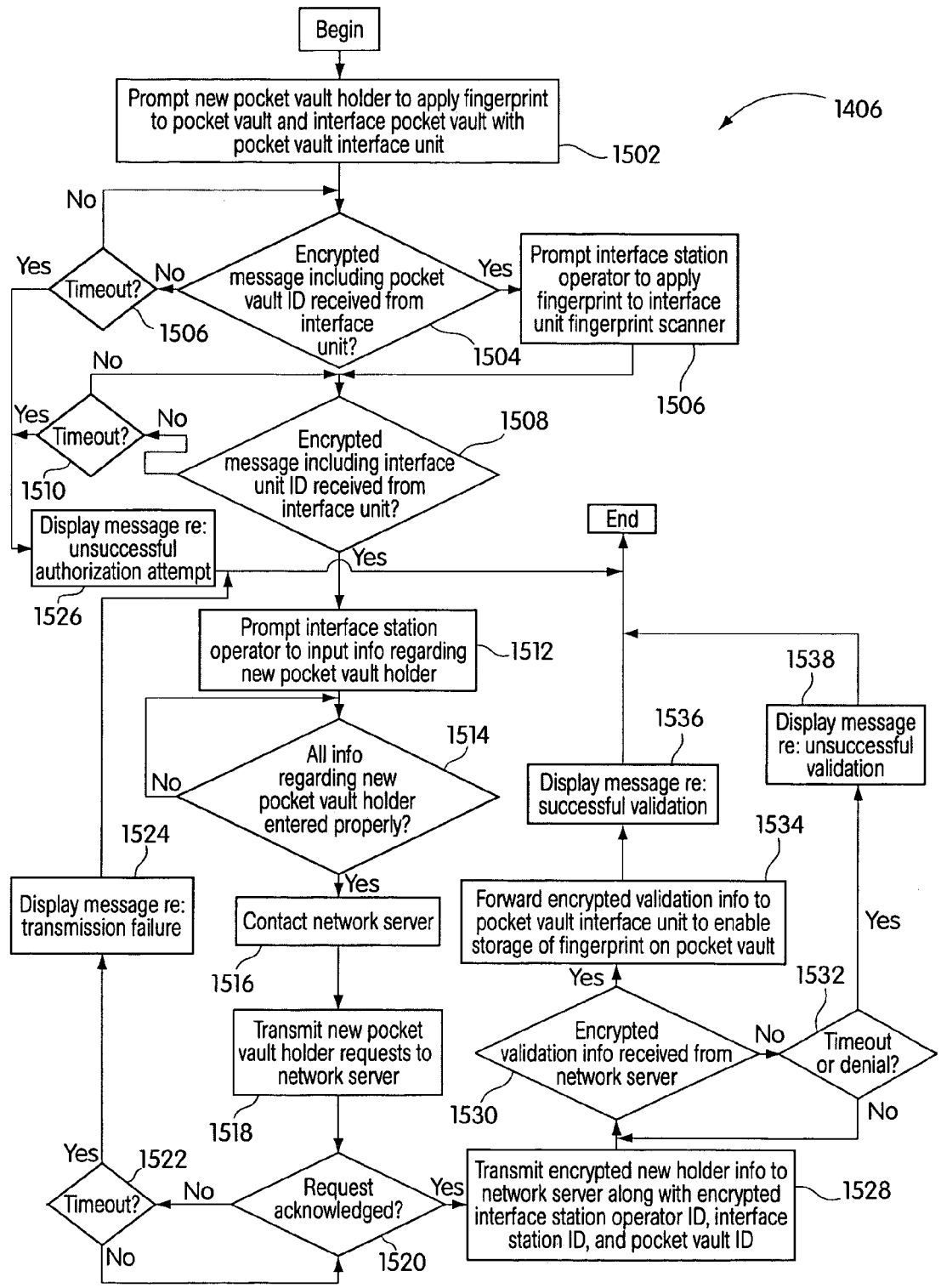
FIG. 15 is a flow diagram illustrating an example implementation of the PROCESS REQUEST TO VALIDATE POCKET VAULT routine shown in FIG. 14.

FIG. 15 is a flow diagram illustrating an example implementation of the PROCESS REQUEST TO VALIDATE POCKET VAULT routine of FIG. 14 (step 1406).

As shown, the routine 1406 begins at a step 1502, wherein the potential new Pocket Vault holder is prompted to apply his or her fingerprint to the fingerprint scanner 220 of the Pocket Vault 102, and to interface the Pocket Vault 102 with the pocket vault interface unit 302. This may be accomplished, for example, by interfacing the docking interface 208 of the Pocket Vault 102 with the docking interface 312 of the pocket vault interface unit 302.

After the step 1502, the routine 1406 proceeds to steps 1504 and 1506, wherein it is determined whether an encrypted message including the ID of the Pocket Vault 102 has been received from the pocket vault interface unit 302 prior to the expiration of a timeout period measured by the step 1506.

When, at the steps 1504 and 1506, it is determined that an encrypted message including the ID of the Pocket Vault 102 has not been received from the pocket vault interface unit 302 in a timely manner, the routine 1406 proceeds to a step 1526, wherein a message is displayed on the display 324 of the interface station computer 304 indicating that an error has occurred in the Pocket Vault 102 authorization process.

When, at the steps 1504 and 1506, it is determined that an encrypted message including the ID of the Pocket Vault 102 has been received from the pocket vault interface unit 302 in a timely manner, the routine 1406 proceeds to a step 1506, wherein the interface station operator is prompted to apply his or her fingerprint to the fingerprint scanner 316 of the pocket vault interface unit 302.

After the step 1506, the routine 1406 proceeds to steps 1508 and 1510, wherein it is determined whether an encrypted message including the ID of the pocket vault interface unit 302 has been received from the pocket vault interface unit 302 prior to the expiration of a timeout period measured by the step 1510.

When, at the steps 1508 and 1510, it is determined that an encrypted message including the ID of the pocket vault interface unit 302 has not been received from the pocket vault interface unit 302 in a timely manner, the routine 1406 proceeds to the step 1526, wherein a message is displayed on the display 324 of the interface station computer 304 indicating that the attempt to authorize the interface station operator was unsuccessful.

After the step 1526, the routine 1406 terminates.

When, at the steps 1508 and 1510, it is determined that an encrypted message including the ID of the pocket vault interface unit 302 has been received from the pocket vault interface unit 302 in a timely manner, the routine 1406 proceeds to a step 1512, wherein the interface station operator is prompted to input information regarding the new Pocket Vault holder into the interface station computer 304.

After the step 1512, the routine 1406 proceeds to a step 1514, whereat the routine 1406 waits until all of the requisite information regarding the new Pocket Vault holder has been entered properly (e.g., via the user input device 318 of the interface station computer 304).

After the step 1514, the routine 1406 proceeds to a step 1516, wherein the network server 114 (FIG. 1) is contacted.

After the step 1516, the routine 1406 proceeds to a step 1518, wherein the information regarding the new Pocket Vault holder is transmitted to the network server 114, along with a request that the new Pocket Vault holder be permitted to validate the Pocket Vault 102.

After the step 1518, the routine 1406 proceeds to steps 1520 and 1522, wherein it is determined whether the network server 114 has acknowledged the request by the interface station computer 304 prior to the expiration of a timeout period measured by the step 1522.

When, at the steps 1520 and 1522, it is determined that the network server 114 has not acknowledged the request by the interface station computer 304 in a timely manner, the routine 1406 proceeds to a step 1524, wherein a message is displayed on the display 324 indicating that a transmission failure has occurred.

When, at the steps 1520 and 1522, it is determined that the network server 114 has acknowledged the request by the interface station computer 304 in a timely manner, the routine 1406 proceeds to a step 1528, wherein, in an encrypted format, the information regarding the new Pocket Vault holder is transmitted to the network server 114, along with the interface station operator ID, the interface unit ID, and the Pocket Vault ID.

After the step 1528, the routine 1406 proceeds to steps 1530 and 1532, wherein it is determined whether encrypted validation information has been received from the network server 114 prior to the expiration of a timeout period measured by the step 1532, and prior to receiving a message from the network server 114 indicating that the request to validate the new Pocket Vault holder has been denied.

When, at the steps 1530 and 1532, it is determined that encrypted validation information has not been received from the network server 114 in a timely manner, or it is determined that a message has been received indicating that the request to validate the new Pocket Vault holder has been denied, the routine 1406 proceeds to a step 1538, wherein a message is displayed on the display 324 indicating that the attempt to validate the Pocket Vault 102 was unsuccessful.

When, at the steps 1530 and 1532, it is determined that encrypted validation information has been received from the network server 114 in a timely manner, the routine 1406 proceeds to a step 1534, wherein the encrypted validation information from the network server 114 is forwarded to the pocket vault interface unit 302 for forwarding on to the Pocket Vault 102 so as to enable storage of the fingerprint of the new holder on the Pocket Vault 102.

After the step 1534, the routine 1406 proceeds to a step 1536, wherein a message is displayed on the display 324 indicating that the attempt to validate the Pocket Vault 102 was successful. In addition to this message, when the pocket vault interface unit 302 forwards this message on to the Pocket Vault 102, the Pocket Vault 102 itself may provide, for example, an audio indication such as a chime, indicating that the new holder's fingerprint has been successfully stored in the memory of the Pocket Vault 102.

Figure 16:
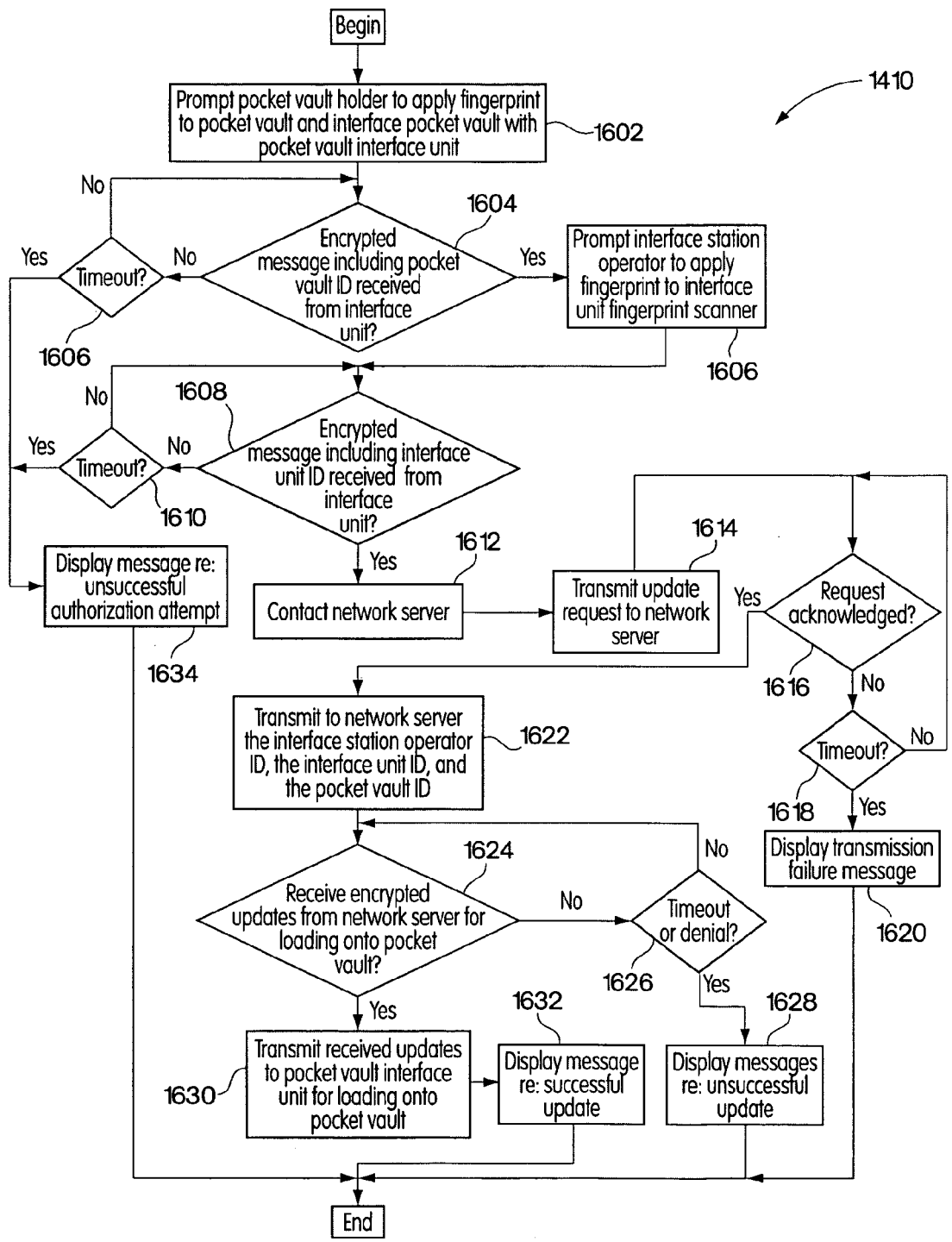
FIG. 16 is a flow diagram illustrating an example implementation of the PROCESS REQUEST TO UPDATE INFO ON POCKET VAULT routine shown in FIG. 14.

FIG. 16 is a flow diagram illustrating an example implementation of the PROCESS REQUEST TO UPDATE INFO ON POCKET VAULT routine of FIG. 14 (step 1410).

As shown, the routine 1410 begins at a step 1602, wherein the Pocket Vault holder is prompted to apply his or her fingerprint to the fingerprint scanner 220 of the Pocket Vault 102, and to interface the Pocket Vault with the pocket vault interface unit 302.

After the step 1602, the routine 1410 proceeds to steps 1604 and 1606, wherein it is determined whether an encrypted message including the ID of the Pocket Vault 102 has been received from the pocket vault interface unit 302 prior to the expiration of a timeout period measured by the step 1606.

When, at the steps 1604 and 1606, it is determined that an encrypted message including the ID of the Pocket Vault 102 has not been received from the pocket vault interface unit 302 in a timely manner, the routine 1410 proceeds to a step 1634, wherein a message is displayed on the display 324 of the interface station computer 304 indicating that the attempt to authorize the Pocket Vault holder was unsuccessful.

When, at the steps 1604 and 1606, it is determined that an encrypted message including the ID of the Pocket Vault 102 has been received from the pocket vault interface unit 302 in a timely manner, the routine 1410 proceeds to a step 1606, wherein the interface station operator is prompted to apply his or her fingerprint to the fingerprint scanner 316 of the pocket vault interface unit 302.

After the step 1606, the routine 1410 proceeds to steps 1608 and 1610, wherein it is determined whether an encrypted message including the ID of the pocket vault interface unit 302 has been received from the pocket vault interface unit 302 prior to the expiration of a timeout period measured by the step 1610.

When, at the steps 1608 and 1610, it is determined that an encrypted message including the ID of the pocket vault interface unit 302 has not been received from the pocket vault interface unit 302 in a timely manner, the routine 1410 proceeds to the step 1634, wherein a message is displayed on the display 324 of the interface station computer 304 indicating that the attempt to authorize the interface station operator was unsuccessful.

After the step 1634, the routine 1410 terminates.

When, at the steps 1608 and 1610, it is determined that an encrypted message including the ID of the pocket vault interface unit 302 has been received from the pocket vault interface unit 302 in a timely manner, the routine 1410 proceeds to a step 1612, wherein the network server 114 is contacted.

After the step 1612, the routine 1410 proceeds to a step 1614, wherein a request to update the information on the Pocket Vault 102 is transmitted to the network server 114.

After the step 1614, the routine 1410 proceeds to steps 1616 and 1618, wherein it is determined whether the network server 114 has acknowledged the request by the interface station computer 304 prior to the expiration of a timeout period measured by the step 1618.

When, at the steps 1616 and 1618, it is determined that the network server 114 has not acknowledged the request by the interface station computer 304 in a timely manner, the routine 1410 proceeds to a step 1620, wherein a message is displayed on the display 324 indicating that a transmission failure has occurred.

When, at the steps 1616 and 1618, it is determined that the network server 114 has acknowledged the request by the interface station computer 304 in a timely manner, the routine 1410 proceeds to a step 1622, wherein, in an encrypted manner, the interface station operator ID, the interface unit ID, and the Pocket Vault ID are transmitted to the network server 114.

After the step 1622, the routine 1410 proceeds to steps 1624 and 1626, wherein it is determined whether encrypted updates have been received from the network server 114 for loading onto the Pocket Vault 102 prior to the expiration of a timeout period measured by the step 1620, and prior to the network server 114 denying the requested attempt to upload information.

When, at the steps 1624 and 1626, it is determined that the encrypted updates have been received in a timely manner, the routine 1410 proceed to a step 1630, wherein the received updates are transmitted to the pocket vault interface unit 302 so that they may be subsequently forwarded to the Pocket Vault 102 for uploading thereto.

After the step 1630, the routine 1410 proceeds to a step 1632, wherein a message is displayed to the holder indicating that the requested updates have been successfully uploaded to the Pocket Vault 102.

After the step 1632, the routine 1410 terminates.

When, at the steps 1624 and 1626, it is determined that the encrypted updates have not been received from the network server 114 in a timely manner, or that the network server 114 has denied the request to upload information onto the Pocket Vault 102, the routine 1410 proceeds to a step 1628, wherein a message is displayed on the display 324 indicating that the attempt to update the information on the Pocket Vault 102 was unsuccessful.

After the step 1628, the routine 1410 terminates.

Figure 17:
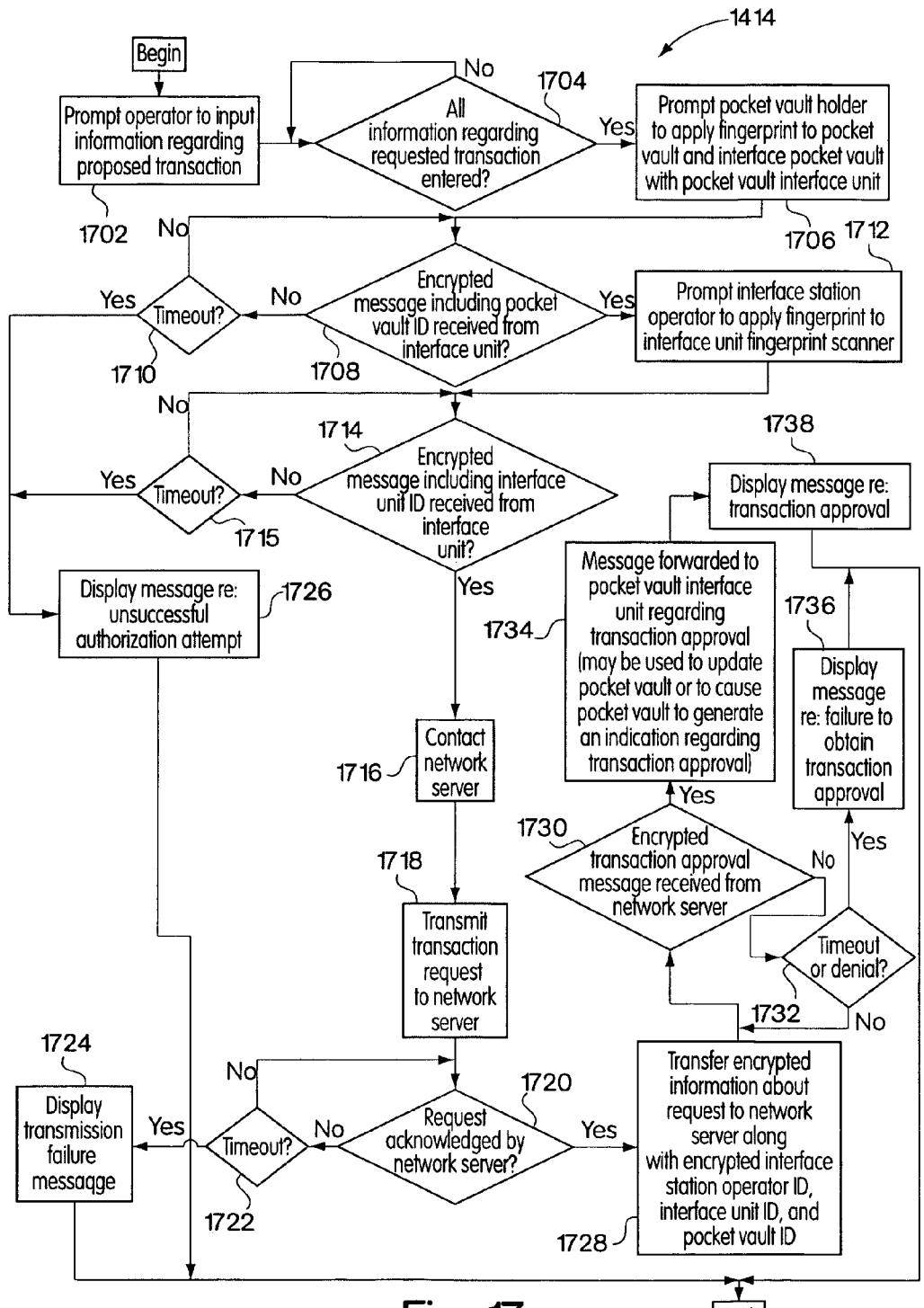
FIG. 17 is a flow diagram illustrating an example implementation of the PROCESS REQUEST TO AUTHORIZE TRANSACTION routine in FIG. 14.

FIG. 17 is a flow diagram illustrating an example implementation of the PROCESS REQUEST TO AUTHORIZE TRANSACTION routine of FIG. 14 (step 1414).

As shown, the routine 1414 begins at a step 1702, wherein the operator of the interface station computer 304 is prompted to input information regarding the proposed transaction involving the Pocket Vault 102.

After the step 1702, the routine 1414 waits at a step 1704 until all of the information regarding the requested transaction has been entered.

After, at the step 1704, it is determined that all of information regarding the requested transaction has been entered, the routine 1414 proceeds to a step 1706, wherein the Pocket Vault holder is prompted to apply his or her fingerprint to the fingerprint scanner 220 of the Pocket Vault 102, and to interface the Pocket Vault with the pocket vault interface unit 302.

After the step 1706, the routine 1414 proceeds to steps 1708 and 1710, wherein it is determined whether an encrypted message including the ID of the Pocket Vault 102 has been received from the pocket vault interface unit 302 prior to the expiration of a timeout period measured by the step 1710.

When, at the steps 1708 and 1710, it is determined that an encrypted message including the ID of the Pocket Vault 102 has not been received from the pocket vault interface unit 302 in a timely manner, the routine 1414 proceeds to a step 1726, wherein a message is displayed on the display 324 of the interface station computer 304 indicating that the attempt to authorize the Pocket Vault holder was unsuccessful.

When, at the steps 1708 and 1710, it is determined that an encrypted message including the ID of the Pocket Vault 102 has been received from the pocket vault interface unit 302 in a timely manner, the routine 1414 proceeds to a step 1712, wherein the interface station operator is prompted to apply his or her fingerprint to the fingerprint scanner 316 of the pocket vault interface unit 302.

After the step 1712, the routine 1414 proceeds to steps 1714 and 1715, wherein it is determined whether an encrypted message including the ID of the pocket vault interface unit 302 has been received from the pocket vault interface unit 302 prior to the expiration of a timeout period measured by the step 1715.

When, at the steps 1714 and 1715, it is determined that an encrypted message including the ID of the pocket vault interface unit 302 has not been received from the pocket vault interface unit 302 in a timely manner, the routine 1414 proceeds to the step 1726, wherein a message is displayed on the display 324 of the interface station computer 304 indicating that the attempt to authorize the interface station operator was unsuccessful.

After the step 1726, the routine 1414 terminates.

When, at the steps 1714 and 1715, it is determined that an encrypted message including the ID of the pocket vault interface unit 302 has been received from the pocket vault interface unit 302 in a timely manner, the routine 1414 proceeds to a step 1716, wherein the network server 114 is contacted.

After the step 1716, the routine 1414 proceeds to a step 1718, wherein the request regarding the proposed transaction involving the Pocket Vault 102 is transmitted to the network server 114.

After the step 1718, the routine 1414 proceeds to step 1720 and 1722, wherein it is determined whether the transaction request has been acknowledged by the network server 114 before the expiration of a timeout period measured by the step 1722.

When, at the steps 1720 and 1722, it is determined that the request has not been acknowledged in a timely manner, the routine 1414 proceeds to a step 1724, wherein a message is displayed on the display 324 indicating that a transmission failure has occurred.

After the steps 1724, the routine 1414 terminates.

When, at the steps 1722 and 1724, it is determined that the request has been acknowledged in a timely manner, the routine 1414 proceeds to a step 1728, wherein encrypted information about the requested transaction is transmitted to the network server 114, along with the interface station operator ID, the interface unit ID, and the Pocket Vault ID.

After the step 1728, the routine 1414 proceeds to steps 1730 and 1732, wherein it is determined whether an encrypted transaction approval message has been received from the network server 114 prior to the expiration of a timeout period measured by the step 1732.

When, at the steps 1730 and 1732, it is determined that an encrypted transaction approval message has not been received in a timely manner, or that approval for the requested transaction has been denied by the network server 114, the routine 1414 proceeds to a step 1736, wherein a message is displayed on the display 324 indicating that the attempt to authorize the requested transaction has failed.

When, at the steps 1730 and 1732, it is determined that an encrypted transaction approval message has been received in a timely manner, the routine 1414 proceeds to a step 1734, wherein a message is forwarded to the pocket vault interface unit 302 indicating that the requested transaction has been approved. This message may also be used to update information on the Pocket Vault 102, and/or to cause the Pocket Vault 102 to generate an indication (e.g., an audio tone) that the transaction has been approved.

After the step 1734, the routine proceeds to a step 1738, wherein a message is displayed on the display 324 indicating that the requested transaction has been approved.

After the step 1738, the routine 1414 terminates.

Figure 18:
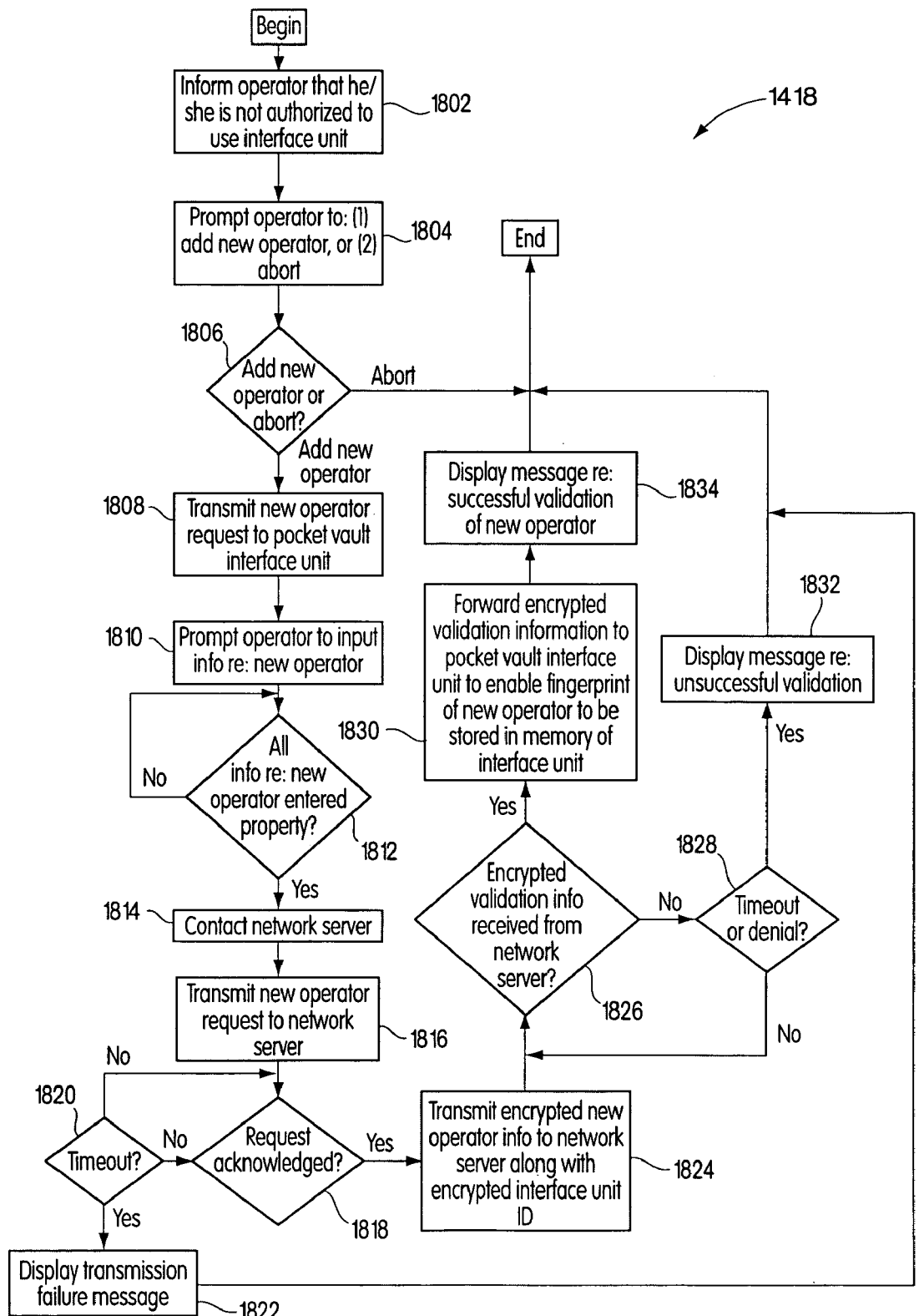
FIG. 18 is a flow diagram illustrating an example implementation of the PROCESS UNSUCCESSFUL OPERATOR AUTHENTICATION routine shown in FIG. 14.

FIG. 18 is a flow diagram illustrating an example implementation of the PROCESS UNSUCCESSFUL OPERATOR AUTHENTICATION routine of FIG. 14 (step 1418).

As shown, the routine 1418 begins at a step 1802, wherein the operator of the interface station computer 304 is informed that attempted use the pocket vault interface unit 302 (when the operator applied his or her finger print to the fingerprint scanner 316) was not authorized.

After the step 1802, the routine 1418 proceeds to a step 1804, wherein the operator is prompted to either: (1) add a NEW OPERATOR to the interface unit 302, or (2) ABORT the attempt to use of the interface unit 302.

When, at the step 1806, it is determined that the operator has chosen to ABORT the attempt to access interface unit 302, the routine 1418 terminates.

When, at the step 1806, it is determined that the operator has chosen to add a NEW OPERATOR, the routine 1418 proceeds to a step 1808, wherein a message is transmitted to the pocket vault interface unit 302 indicating the operator's desire to add a new operator to the pocket vault interface unit 302.

After the step 1808, the routine 1418 proceeds to a step 1810, wherein the operator is prompted to input information regarding the proposed new operator into the interface station computer 304 (e.g., using the user input device 318).

After the step 1810, the routine 1418 proceeds to a step 1812 wherein the routine 1418 waits until all of the requisite information regarding the proposed new interface station operator has been entered properly.

When, at the step 1812, it is determined that all of the requisite information regarding the proposed new operator has been entered properly, the routine 1418 proceeds to a step 1814, wherein the network server 114 is contacted.

After the step 1814, the routine 1418 proceeds to a step 1816, wherein the request to add the new operator to the pocket vault interface unit 302 is transmitted to the network server 114.

After the step 1816, the routine 1418 proceeds to steps 1818 and 1820, wherein it is determined whether the request by the interface station computer has been acknowledged by the network server 114 prior to the expiration of a timeout period measured by the step 1820.

When, at the steps 1818 and 1820, it is determined that the request has not been acknowledged in a timely manner, the routine 1418 proceeds to the step 1822, wherein a transmission failure message is displayed.

After the step 1822, routine 1418 terminates.

When, at the steps 1818 and 1820, it is determined that the request has been acknowledged in a timely manner, the routine 1418 proceeds to the step 1824, wherein a message, including the information regarding the proposed new operator and the interface unit ID, is transmitted to the network server 114 in an encrypted manner.

After the step 1824, the routine 1418 proceeds to steps 1826 and 1828, wherein it is determined whether encrypted validation information has been received from the network server 114 prior to the expiration of a timeout period measured by the step 1828, and prior to the network server 114 denying the addition of the new interface station operator.

When, at the steps 1826 and 1828, it is determined that encrypted validation information has been received from the network server 114 in a timely manner, the routine 1418 proceeds to a step 1830, wherein the encrypted validation information is forwarded from the interface station computer 304 to the pocket vault interface unit 302, such that the pocket vault interface unit 302 is enabled to store the fingerprint of the new operator in its memory.

After the step 1830, the routine 1418 proceeds to a step 1834, wherein a message is generated indicating that the attempt to add the new operator to the pocket vault interface unit 302 was successful.

After the step 1834, the routine 1418 terminates.

When, at the steps 1826 and 1828, it is determined that encrypted validation information has not been received from the network server 114 in a timely manner, the routine 1418 proceeds to a step 1832, wherein a message is generated indicating that the attempt to add the new operator to the pocket vault interface unit 302 was unsuccessful.

After the step 1832, routine 1418 terminates.

Figure 19:
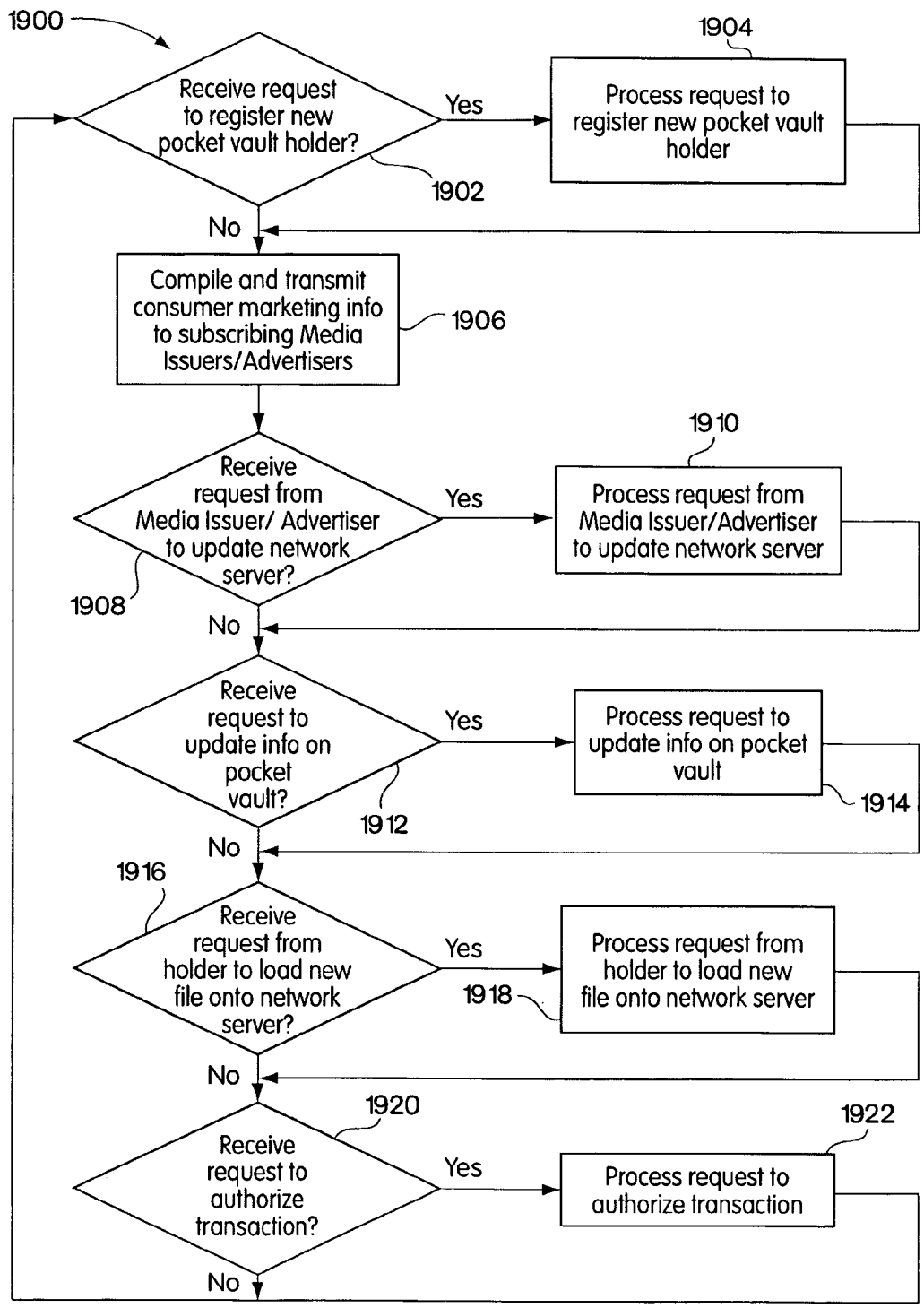
FIG. 19 is a flow diagram illustrating an example implementation of a primary routine that may be executed by the controller(s) of the network server(s) shown in FIG. 4.

FIG. 19 is a flow diagram illustrating an example implementation of a primary routine 1900 that may be executed by the network server 114 of FIG. 1.

As shown, the routine 1900 may begin at a step 1902, wherein it is determined whether any requests have been received to register new Pocket Vault holders.

When, at the step 1902, it is determined that a request has been received to register a new Pocket Vault holder, the routine 1900 proceeds to a step 1904, wherein the request to register the new Pocket Vault holder is processed. An example of a routine that may be employed to implement the step 1904 is discussed in more detail below in connection with FIG. 20.

When, at the step 1902, it is determined that no request to register a new Pocket Vault holder has been received, the routine 1900 proceeds to a step 1906, wherein consumer marketing information is compiled and transmitted to subscribing media issuers and advertisers.

After the step 1906, the routine 1900 proceeds to a step 1908, wherein it is determined whether any requests from media issuers or advertisers have been received to update the network server 114.

According to one aspect of the invention, media issuers and advertisers may have the option to utilize the functionality of the network server 114 to update the account characteristics of authenticated Pocket Vault holders. These updates may, for example, be delivered from the computers 108, 110, and 112 to a secure location within the database 406. When each selected holder next synchronizes with network server 114 (e.g., as described below in connection with routine 1914 of FIG. 22), any media characteristics updated by the media issuers or advertisers may be uploaded to that holder's Pocket Vault 102. The database of account updates may be revised periodically based on the media issuer's systems (e.g., pursuant to the routine 1910 of FIG. 21—described below). Confirmation of the update process may be provided to the issuer after a synchronization session is complete for a particular Pocket Vault holder (see step 2206 of routine 1914 (FIG. 22) below).

When, at the step 1908, it is determined that a request to update the network server 114 has been received from a media issuer or advertiser, the routine 1900 proceeds to a step 1910, wherein the request from the media issuer or advertiser is processed. An example of a routine that may be employed to implement the step 1910 is discussed in more detail below in connection with FIG. 21.

When, at the step 1908, it is determined that no request from a media issuer or advertiser to update the network server 114 has been received, the routine 1900 proceeds to a step 1912, wherein it is determined whether any requests have been received from holders to update information on their Pocket Vaults.

When, at the step 1912, it is determined that such a request has been received, the routine 1900 proceeds to a step 1914, wherein the request to update the Pocket Vault information is processed. An example of a routine that may be employed to implement the step 1914 is described in more detail below in connection with FIG. 22.

When, at the step 1912, it is determined that no request from a holder to update information on a Pocket Vault 102 has been received, the routine 1900 proceeds to a step 1916, wherein it is determined whether any holders have requested that new files be loaded onto the network server 114.

When, at the step 1916, it is determined that a holder has requested that a new file be loaded onto the network server 114, the routine 1900 proceeds to a step 1918, wherein the holder's request to load the new file onto the network server 114 is processed. An example of a routine that may be employed to implement the step 1918 is described in more detail below in connection with FIG. 23.

When, at the step 1916, it is determined that no request by a holder to load a file onto the network server 114 has been received, the routine 1900 proceeds to a step 1920, wherein it is determined whether any requests have been made to authorize transactions. Such a request may be made, for example, by a merchant operating a commercial interface station 104c. In this regard, it should be appreciated that, when a token 102a is employed to engage in a transaction with a commercial card reader 106 or a commercial bar code reader 107, a request for transaction approval may not be made to the network server 114. Instead such a transaction approval request may be made through conventional, existing communication and approval channels for such devices. Therefore, it should be understood that the step 1922 is generally reached only when it is possible for the network server 114 to check the identity of the Pocket Vault holder, the identity of the Pocket Vault 102, and possibly identity of the operator of a commercial interface station, based on communications with the Pocket Vault 102 (e.g., via a commercial interface station 104c or via a wireless network such as Bluetooth).

When, at the step 1920, it is determined that a request to authorize a transaction has been made, routine 1900 proceeds to a step 1922, wherein the request to authorize the transaction is processed. An example of a routine that may be employed to implement the step 1922 is discussed in more detail below in connection with FIG. 24.

When, at the step 1920, it is determined no request to authorize a transaction has been made, the routine 1900 returns to the step 1902 (discussed above). With regard to the routine 1900 of FIG. 19, it should be appreciated that all of the requests to accomplish the various tasks may be placed in a queue so that they are serviced on a first-come, first-served or any other basis, rather than servicing them in the particular order shown in FIG. 19.

Figure 20:
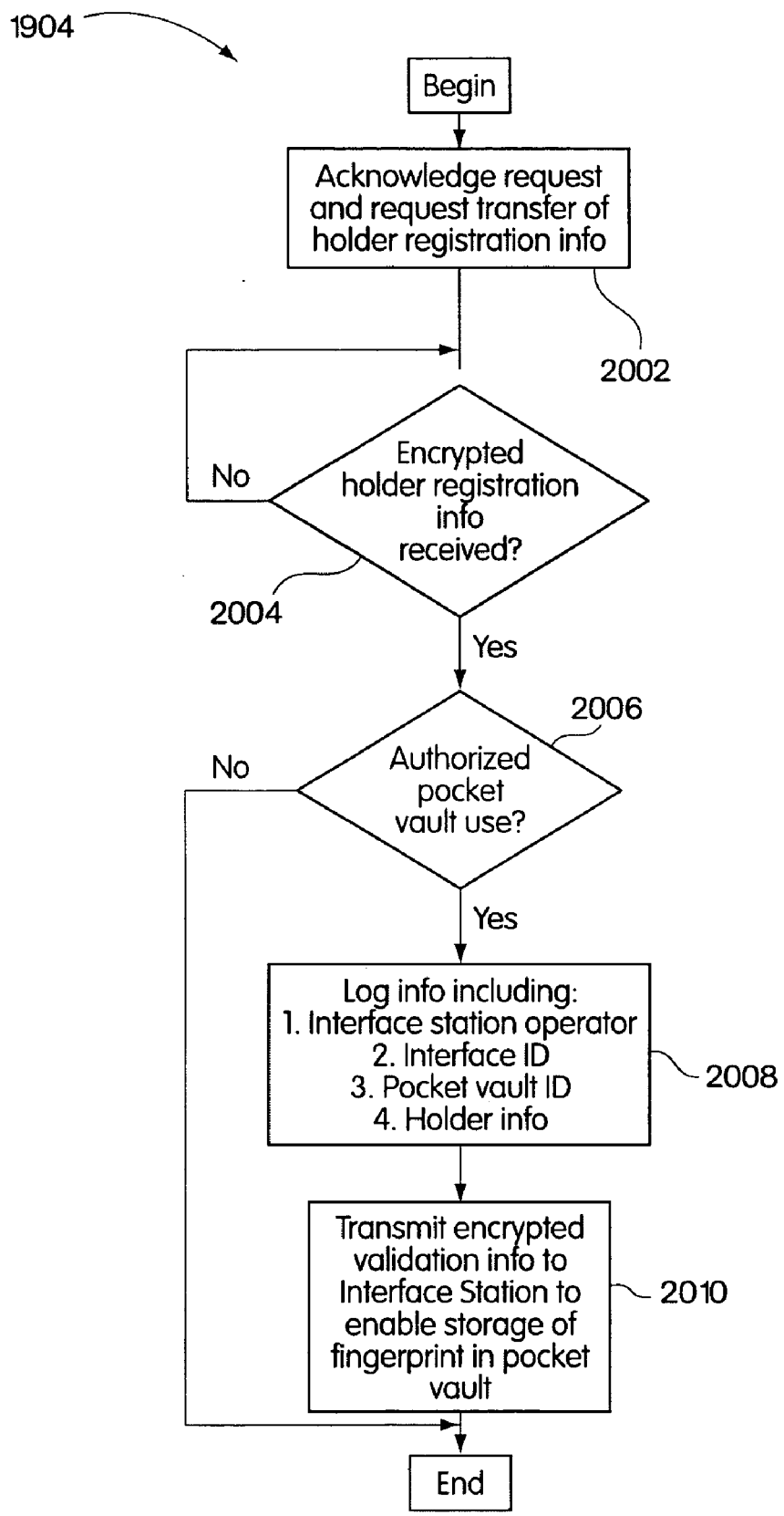
FIG. 20 is a flow diagram illustrating an example implementation of the PROCESS REQUEST TO REGISTER NEW POCKET VAULT HOLDER routine shown in FIG. 19.

FIG. 20 is a flow-diagram illustrating an example of a routine that may be employed to implement the step 1904 of the routine 1900 (FIG. 1).

As shown, the routine 1904 begins at a step 2002, wherein a request received from the interface station computer 304 to register a new Pocket Vault holder is acknowledged, and the network server 114 requests the interface station computer 304 to transfer the relevant information regarding the proposed new holder to the network server 114.

After the step 2002, the routine 1904 proceeds to a step 2004, wherein the routine 1904 waits for all of the requisite holder registration information to be received from the interface station computer 304.

When, at the step 2004, it is determined that all of the requisite holder registration information has been received from the interface station computer 304, the routine 1904 proceeds to a step 2006, wherein it is determined whether the proposed Pocket Vault use is authorized. An example of a routine that may be employed to implement the step 2006 is discussed below in connection with FIG. 25. In determining whether a particular Pocket Vault use is authorized, there are numerous parameters which may be checked. For example, the port to which the interface station computer is connected (e.g., the telephone number or IP address of the computer) may be checked to ensure that it is authorized. Additionally, information from the interface station computer 304 (e.g., a "cookie") may be checked to ensure that the computer itself has been registered with the system. Further, it can be checked whether the current operator of the interface station computer 304 is registered as being associated with the interface station computer 304 being used, and that the proposed new Pocket Vault holder is authorized to use that particular Pocket Vault 102. In sum, the identity of (1) each piece of equipment, (2) each operator of each piece of equipment, and (3) each location of each piece of equipment may be checked to ensure that the particular use of the Pocket Vault is authorized. It should be appreciated fewer than all of these parameters, different parameters, and/or additional parameters can be checked in alternative embodiments of the invention, and that the invention is not limited to embodiments wherein all of the aforementioned parameters are checked to verify that a particular Pocket Vault use is authorized.

When, at the step 2006, it is determined that the Pocket Vault use is not authorized, the routine 1904 terminates. In such a situation, it is also possible to generate some sort of security alert message to put someone or some entity on notice that an unauthorized use of a Pocket Vault has occurred.

When, the routine 2006 has determined that the proposed Pocket Vault use is authorized, the routine 1904 proceeds to a step 2008, wherein all of the relevant information regarding the new Pocket Vault registration is logged into the database 406 of the network server 114 (FIG. 4). As shown in FIG. 20, this information may include, for example, the interface station operator ID, the interface unit ID, the Pocket Vault ID, and all of the relevant information relating to the new Pocket Vault holder.

After the step 2008, the routine 1904 proceeds to a step 2010, wherein the network server 114 transmits encrypted validation information to the interface station computer 304, which then may be passed on to the pocket vault interface unit 302, and then to the Pocket Vault 102, so as to enable the new holder's fingerprint to be stored in the memory of the Pocket Vault 102.

After the step 2010, the routine 1904 terminates.

Figure 21:
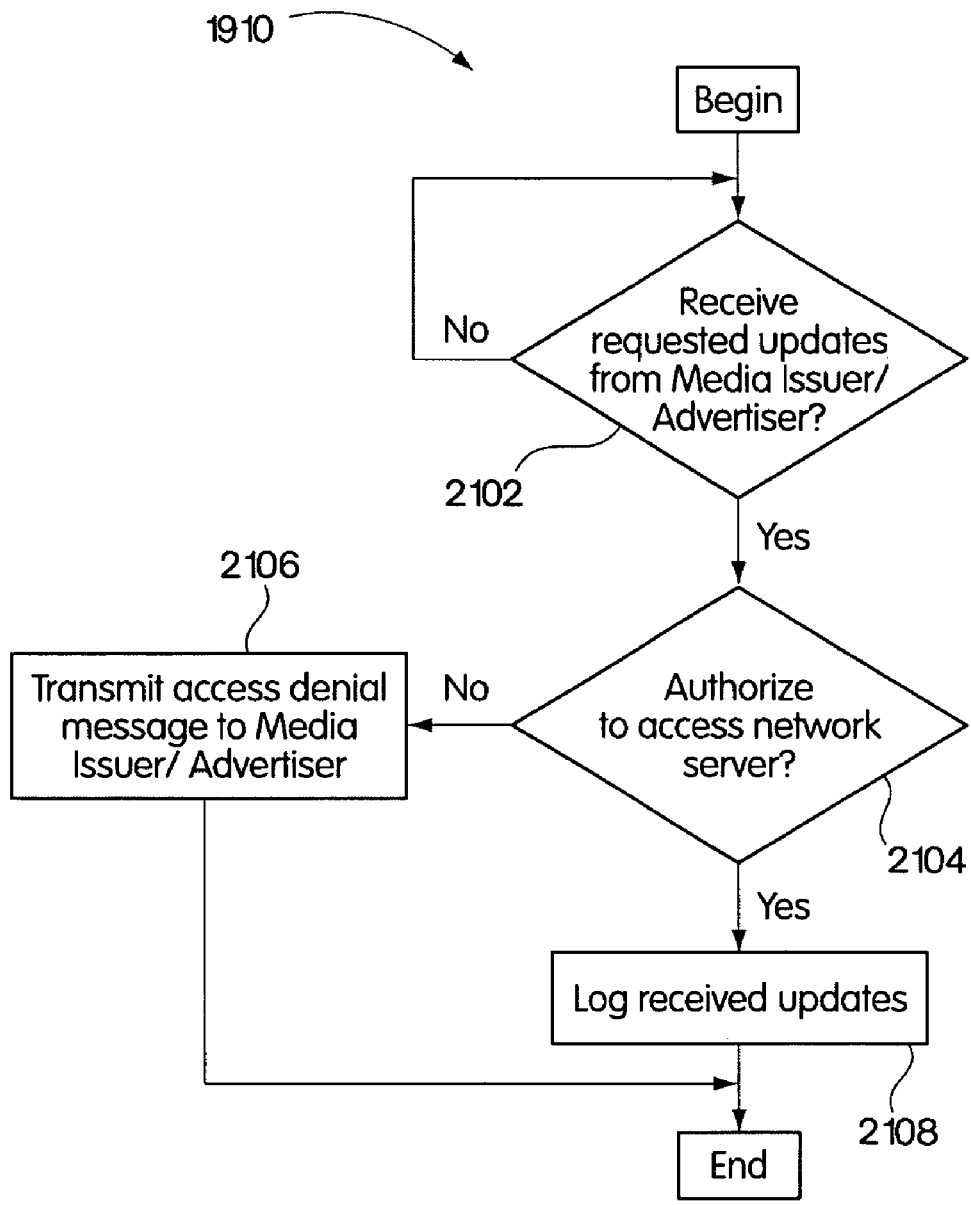
FIG. 21 is a flow diagram illustrating an example implementation of the PROCESS REQUEST BY MEDIA ISSUER/ADVERTISER TO UPDATE NETWORK SERVER routine shown in FIG. 19.

FIG. 21 is a flow diagram illustrating example of a routine that may be employed to implement the step 1910 of the primary routine 1900 (FIG. 19).

As shown, the routine 1910 begins at a step 2102, wherein it is determined whether all of the requested updates have been received from the media issuer or advertiser.

When, at the step 2102, it has been determined that all of the requested updates have been received, the routine 1910 proceeds to a step 2104, wherein it is determined whether the media issuer or advertiser is authorized access to the network server 114. This authorization process may require some sort of authentication of the identity of the computer used by the media issuer or advertiser requesting the update, the operator of the computer, and/or the location of the computer, in a manner similar to that in which the interface stations 104 and their operators are authorized.

When, at the step 2104, it is determined that the media issuer or advertiser is not authorized access to the network server 114, the routine 1900 proceeds to a step 2106, wherein a message is transmitted to the media issuer or advertiser informing the media issuer or advertiser that access to the network server 114 has been denied.

After the step 2106, the routine 1910 terminates.

When, at the step 2104, it is determined that the media issuer or advertiser is authorized access to the network server 114, the routine 1910 proceeds to a step 2108, wherein the updates received from the media issuer or advertiser are logged onto the network server 114.

After the step 2108, the routine 1910 terminates.

Figure 22:
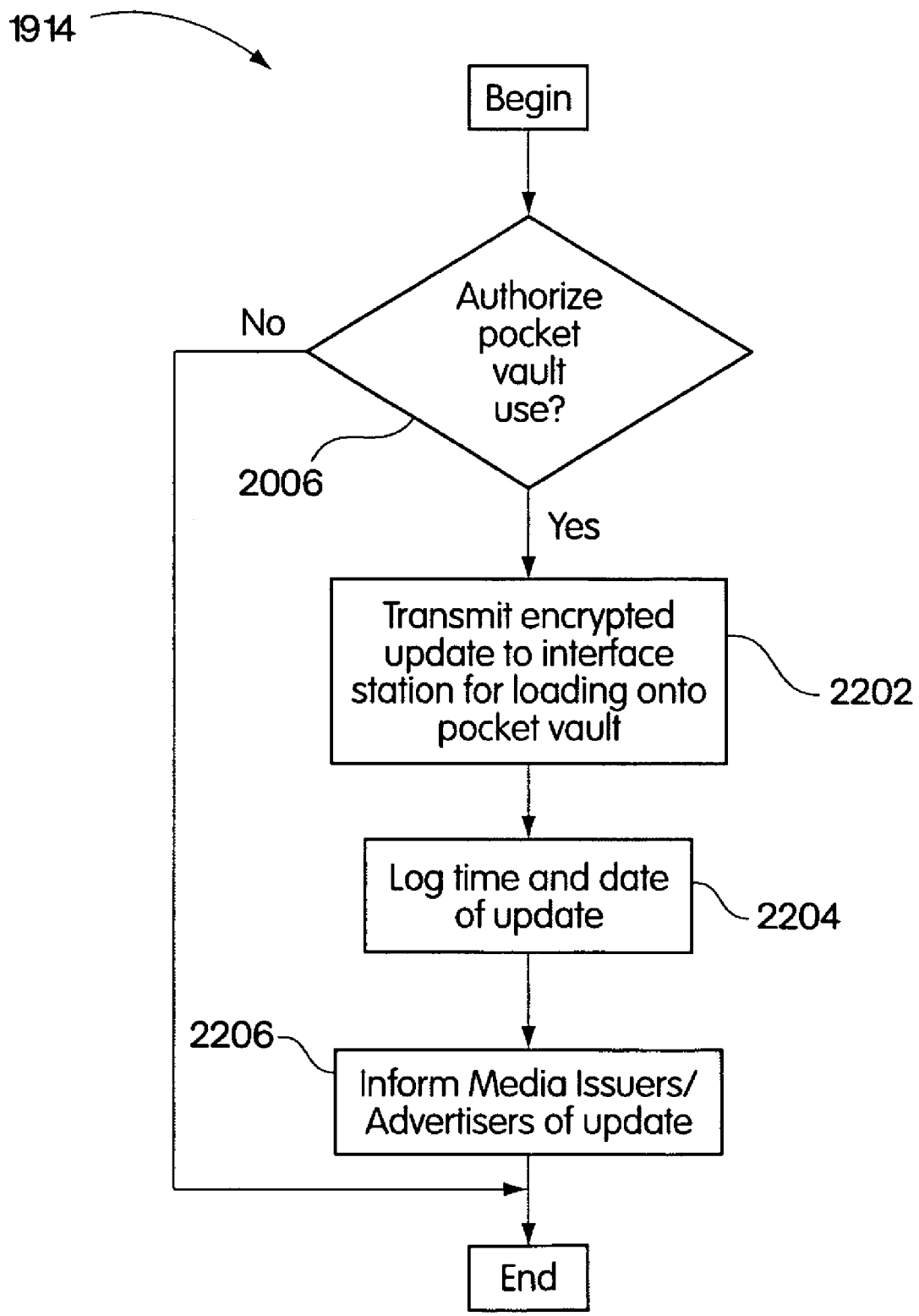
FIG. 22 is a flow diagram illustrating an example implementation of the PROCESS REQUEST TO UPDATE INFO ON POCKET VAULT routine shown in FIG. 19.

FIG. 22 is a flow diagram illustrating an example a routine that may be employed to implement the step 1914 of the primary routine 1900 (FIG. 19).

As shown, the routine 1914 begins at the step 2006 (discussed below in connection with FIG. 25), wherein it is determined whether the attempted Pocket Vault use is authorized.

When, at the step 2006, it is determined that the Pocket Vault use is not authorized, the routine 1914 terminates.

When, at the step 2006, it is determined that the Pocket Vault use is authorized, the routine 1914 proceeds to a step 2202, wherein encrypted updates are transmitted to the interface station computer 304 for loading onto the Pocket Vault 102.

After the step 2202, the routine 1914 proceeds to steps 2204 and 2206, wherein the time and date of the updates are logged (step 2204), and the media issuers or advertisers are informed that the updates have been made (step 2206).

Figure 23:
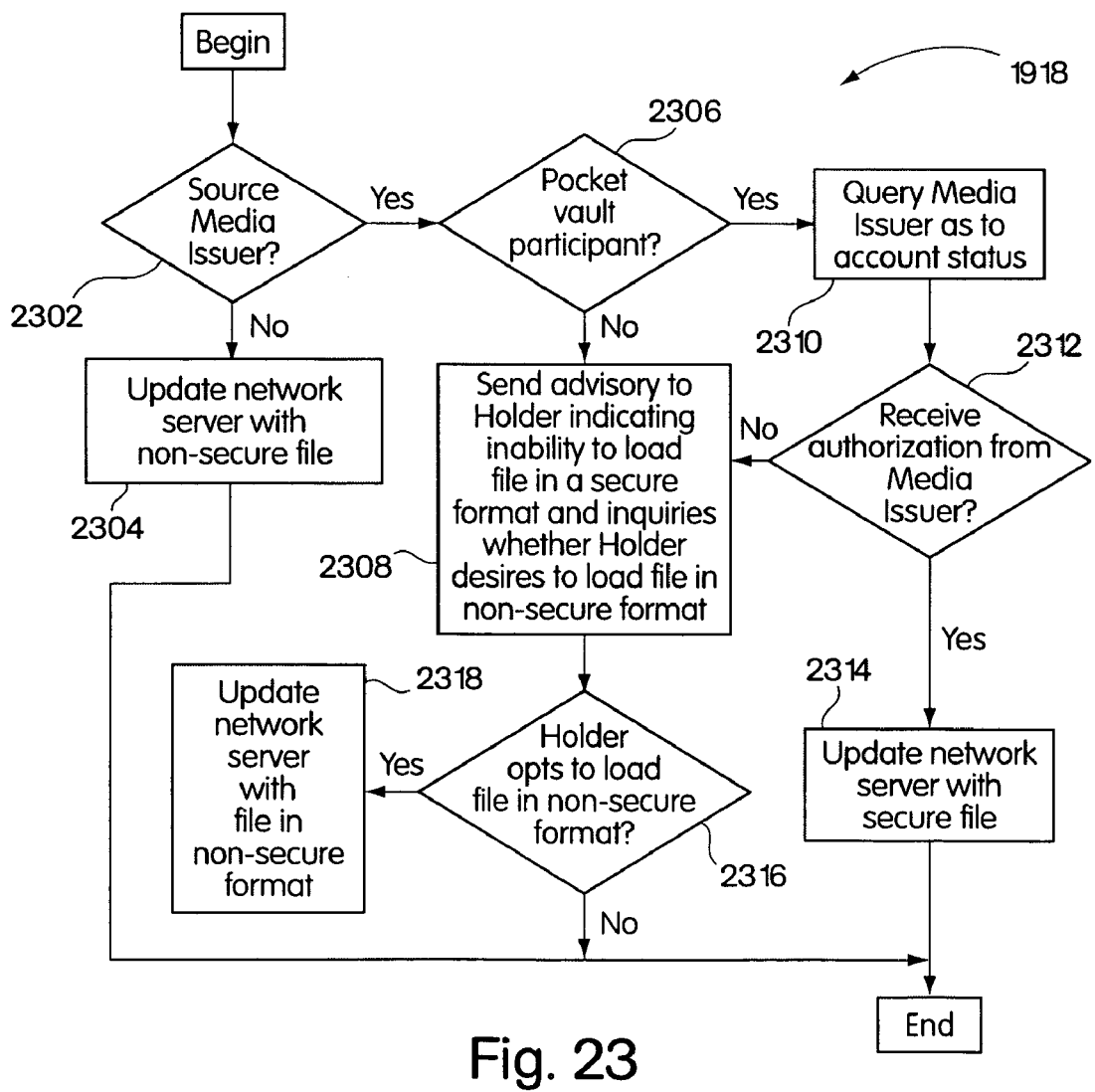
FIG. 23 is a flow diagram illustrating an example implementation of the PROCESS REQUEST FROM HOLDER TO LOAD NEW FILE ONTO NETWORK SERVER routine shown in FIG. 19.

FIG. 23 is a flow diagram illustrating an example of a routine that may be employed to implement the step 1918 of the primary routine 1900 (FIG. 9).

As shown, the routine 1918 begins at a step 2302, wherein it is determined whether the file to be loaded onto the network server 114 relates to a secure media issuer.

When, at the step 2302, it is determined that the file does not relate to a secure media issuer, the routine 1918 proceeds to a step 2304, wherein the network server 114 is updated with the non-secure file.

After the step 2304, the routine 1918 terminates.

When, at the step 2302, it is determined that the to-be-loaded file does relate to a secure media issuer, the routine 1918 proceeds to a step 2306, wherein it is determined whether the secure media issuer is a Pocket Vault participant (i.e., a media issuer having access to the network server 114).

When, at the step 2306, it is determined that the secure media issuer is not a Pocket Vault participant, the routine 1918 proceeds to a step 2308, wherein an advisory is sent to the holder indicating an inability to load the file, and inquiring as to whether the holder desires to load the file in a non-secure format. The holder may, for example, opt to load the file to the network server 114 in such a way that the content of the file is not encodable to the Chameleon Card, but can be displayed and shown to a POS operator and manually keyed in at POS by the POS operator.

After the step 2308, the routine 1918 proceeds to a step 2316, wherein it is determine whether the holder has elected to load the file in a non-secure format.

When, at the step 2316, it is determined that the holder has elected not to load the file in a non-secure format, the routine 1918 terminates.

When, at the step 2316, it is determined that the holder has elected to load the file in a non-secure format, the routine 1918 proceeds to a step 2318, wherein the file is loaded onto the network server 114 in a non-secure format.

After the step 2318, the routine 1918 terminates.

When, at the step 2306, it is determined that the secure media issuer is a Pocket Vault participant, the routine 1918 proceeds to a step 2310, wherein the media issuer is queried as to the account status of the holder.

After the step 2310, the routine 1918 proceeds to a step 2312, wherein it is determined whether authorization has been received from the media issuer to load the file.

When, at the step 2312, it is determined that authorization has not been received from the media issuer, the routine 1918 proceeds to the step 2308 (discussed above).

When, at the step 2312, it is determined that authorization has been received from the media issuer, the routine 1918 proceeds to a step 2314, wherein the network server 114 is updated with the secure file.

After the step 2314, the routine 1918 terminates.

Figure 24:
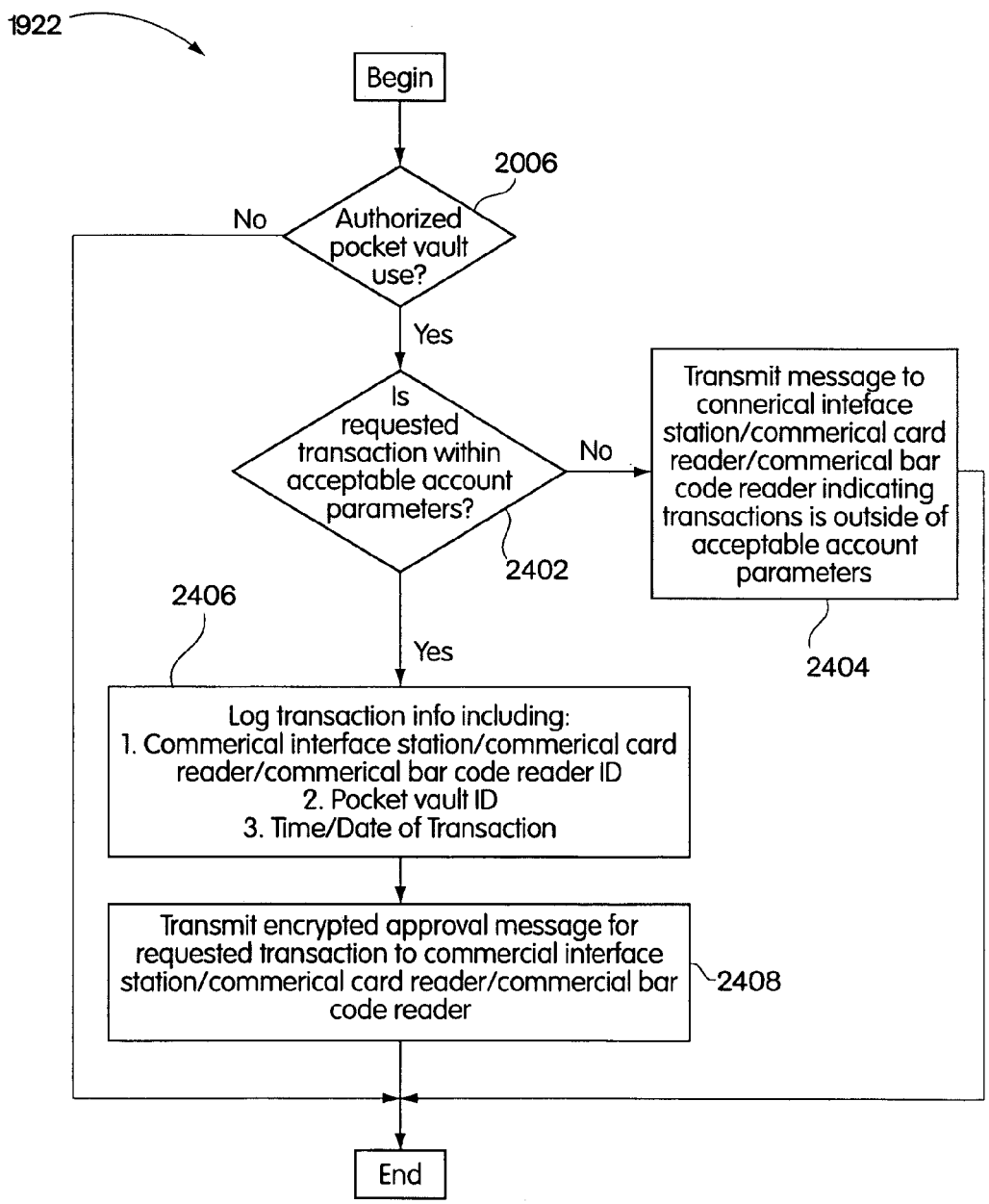
FIG. 24 is a flow diagram illustrating an example implementation of the PROCESS REQUEST TO AUTHORIZE TRANSACTION routine shown in FIG. 19.

FIG. 24 is a flow diagram illustrating an example of a routine that may be employed to implement the step 1922 of the primary routine 1900 (FIG. 19).

As shown, the routine 1922 begins at the step 2006 (discussed below in connection with FIG. 25), wherein it is determined whether the attempted use of the Pocket Vault 102 is authorized.

When, at the step 2006, it is determined that the attempted Pocket Vault use is not authorized, the routine 1922 terminates.

When, at the step 2006, it is determined that the attempted Pocket Vault used is authorized, the routine 1922 proceeds to a step 2402, wherein it is determined whether the requested transaction is within acceptable account parameters (e.g., as set by the media issuer).

When, at the step 2402, it is determined that the requested transaction is not within acceptable account parameters, the routine 1922 proceeds to a step 2404, wherein a message is transmitted to the entity that requested the transaction (e.g., a commercial interface station 104C, a card reader 106, or a barcode reader 107) indicating that the transaction is outside of acceptable account parameters.

After the step 2404, the routine 1922 terminates.

When, at the step 2402, it is determined that the requested transaction is within acceptable account parameters, information regarding the transaction is logged into the database 406 of the network server 114 (FIG. 4). As shown, the logged information may include the identification of the entity with which the transaction took place, the Pocket Vault ID (if available), and the time and date of the transaction.

After the step 2406, the routine 1922 proceeds to a step 2408, wherein an encrypted approval message is transmitted to the entity with which the transaction is being attempted (e.g., a commercial interface station 104C, a card reader 106, or a barcode reader 107).

After the step 2408, the routine 1922 terminates.

Figure 25:
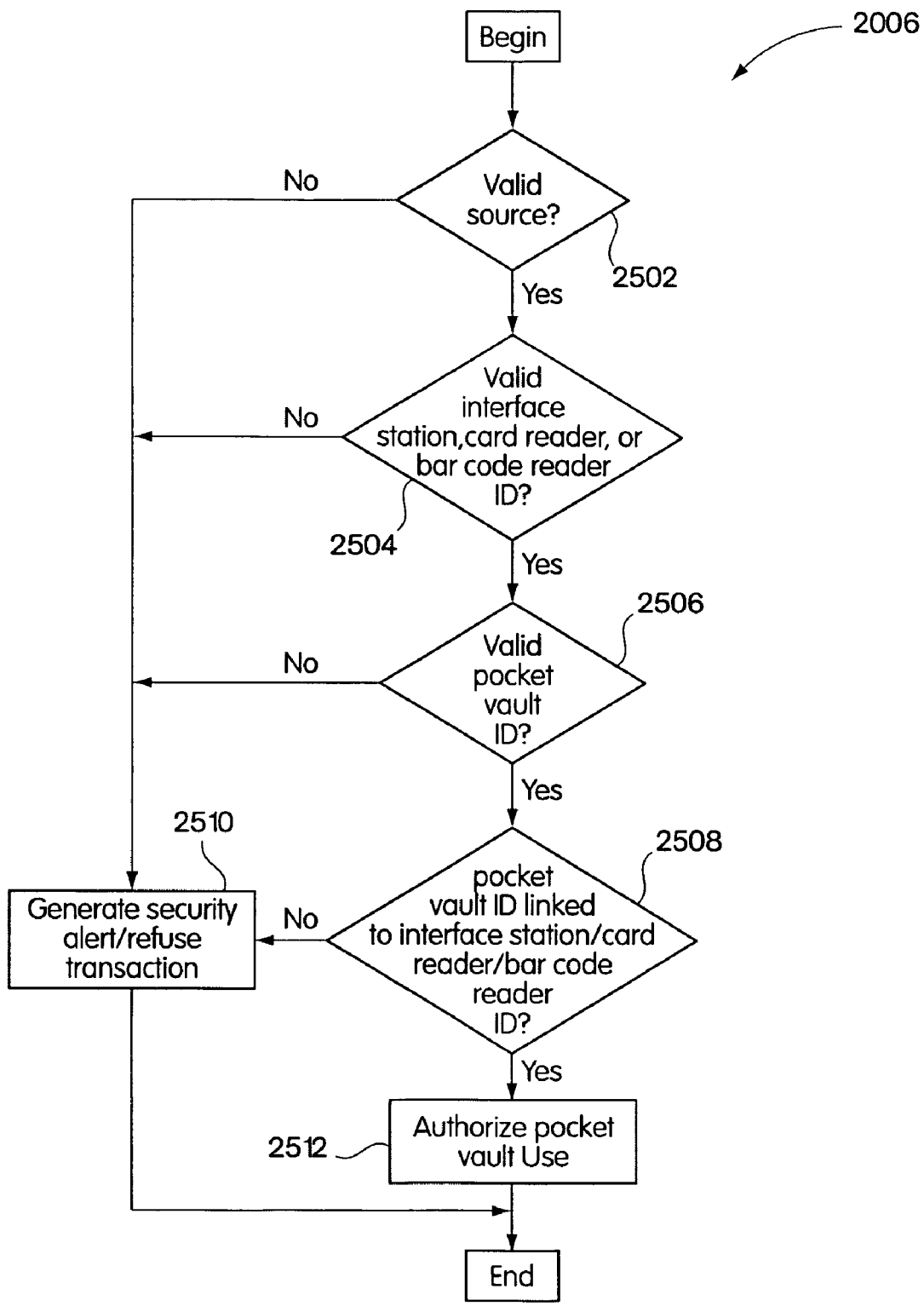
FIG. 25 is a flow diagram illustrating an example implementation of the AUTHORIZED POCKET VAULT USE? routine shown in each of FIGS. 20, 22, and 24.

FIG. 25 is a flow diagram illustrating an example of a routine that may employed to implement the step 2006 of the routines 1904 (FIG. 20), 1914 (FIG. 22), and 1922 (FIG. 24).

As shown, the routine 2006 begins at a step 2502, wherein it is determined whether the point of sale terminal or other entity with which a transaction is being attempted is connected to a valid source (e.g., an authorized telephone line or an authorized internet protocol (IP) address).

When, at the step 2502, it is determined that the entity proposing the transaction is not connected to a valid source, the routine 2006 proceeds to a step 2510, wherein the transaction is refused, and a security alert is generated so that appropriate action(s) may be taken.

When, at the step 2502, it is determined that the entity proposing the transaction is connected to a valid source, the routine 2006 proceeds to a step 2504, wherein it is determined whether the ID of the interface station, card reader or barcode reader is valid, and is properly linked to the source to which is connected.

When, at the step 2504, it is determined that the ID of the entity proposing the transaction is not valid, the routine proceeds to the step 2510 (discussed above).

When, at the step 2504, it is determined that the ID of the entity proposing the transaction is valid, the routine 2006 proceeds to a step 2506, wherein it is determined whether the Pocket Vault ID (if available) is valid. It should be appreciated that, when a card reader 106, a barcode reader 107 or an RF signal receiver is employed, it is possible that the ID from the Pocket Vault will not be transmitted to the network server 114. Therefore, the step 2506 may be skipped in such a situation.

When, at the step 2506, it is determined that the Pocket Vault ID (when available and required) is not valid, the routine 2006 proceeds to the step 2510 (discussed above).

When, at the step 2506, it is determined that the Pocket Vault ID (when) is valid or is not required, the routine 2006 proceeds to a step 2508, wherein it is determined whether the Pocket Vault ID (if available) is linked to the ID of the entity proposing the transaction, e.g., a commercial interface station 104c, a card reader 106, or a barcode reader 107.

When, at the step 2508, it is determined that the ID of the Pocket Vault 102 (when available) is not linked to the ID of the entity proposing the transaction, the routine 2006 proceeds to the step 2510 (discussed above).

When, at the step 2508, it is determined that the Pocket Vault ID is linked to the ID of the entity proposing the transaction, or that the ID of the Pocket Vault is not required, the routine 2006 proceeds to a step 2512, wherein the Pocket Vault use is authorized.

With regard to the information checked in connection with the routine 2006 to determine whether a particular Pocket Vault use is authorized, it should be appreciated that, in some embodiments, fewer than all of the verification steps discussed above may be performed when lesser degrees of security are desired or required. For example, in some embodiments, there may be no restrictions as to who can operate an interface station, the source to which the station is connected, and/or the ID of the station.

One illustrative example of an application of the network system 100 (FIG. 1) is in the distribution of building access key cards and similar limited-use, time-sensitive media to individual operators. The following typical scenario involves distribution of hotel room key cards to hotel guests who make room reservations over the Internet. Using a hotel's secure web site, the prospective guest, who is also a Pocket Vault holder, may secure a room for a specific time period by providing a credit card number. This step may or may not involve use of a credit card stored on the Pocket Vault 102. If it does involve use of a Pocket Vault credit card, this card may, for example, be accessed while the Pocket Vault 102 is interfaced with the holder's personal interface station 104b. Next, the prospective hotel guest may link to the network server 114 (while staying within the hotel's website), and follow on-screen instructions for downloading the key card for his/her room onto the Pocket Vault 102 (e.g., to ensure that Pocket Vault 102 is interfaced with the pocket vault interface unit 302, and to ensure that the Pocket Vault holder has activated the Pocket Vault 102 by the appropriate security mechanism such as a thumbprint for bio-metric ID verification). After downloading is complete, the display 216 of the Pocket Vault 102 may include an icon for the hotel room key (e.g., the hotel's logo), along with the icons for media previously loaded. When the room key card icon is selected, the Pocket Vault 102 may encode the Chameleon Card with the magnetic stripe coding to unlock the guest's hotel room.

After the time period of the guest's room reservation has expired, the Pocket Vault 102 may automatically delete the room key icon. This deletion may occur for the convenience of the Pocket Vault holder, not necessarily for hotel security reasons, since the room's lock will reject any previously-used key card (Chameleon or traditional key card) after the key card's specified time period has expired.

Having thus described at least one illustrative embodiment of the invention, various alterations, modifications and improvements will readily occur to those skilled in the art. Such alterations, modifications and improvements are intended to be within the spirit and scope of the invention. Accordingly, the foregoing description is by way of example only and is not intended as limiting. The invention is limited only as defined in the following claims and the equivalents thereto.

What is claimed is:

1. A method, comprising steps of:
(A) storing at least first account information for a first media issued by a first media issuer and second account information for a second media issued by a second media issuer in a database in communication with a transfer server so that the first account information and the second account information exist simultaneously in the database;
(B) establishing a communication link via a non-dedicated public communications channel between a controller associated with the database and a portable electronic device distinct and remotely located from the database, and transferring at least the first account information and the second account information from the database to a memory of the portable electronic device via the communication link so that at least the first account information and the second account information are caused to exist simultaneously in the memory of the portable electronic device;
(C) transporting the portable electronic device to a vicinity of a first point-of-sale (POS) terminal;
(D) when the portable electronic device is in the vicinity of the first POS terminal, manipulating a user input of the portable electronic device to select the first media for use in a first transaction at the first POS terminal;
(E1) causing a token attached to the portable electronic device to embody at least a portion of the first account information;
(E2) after performing the step (E1), detaching the token from the portable electronic device, with the token continuing to embody at least the portion of the first account information after the token has been detached from the portable electronic device;
(E3) after performing the step (E2), and when the token is still detached from the portable electronic device, interfacing the token with the first POS terminal and transferring at least the portion of the first account information from the token to the first POS terminal;
(E4) after performing the step (E3), reattaching the token to the portable electronic device;
(F) transporting the portable electronic device to a vicinity of a second POS terminal;
(G) when the portable electronic device is in the vicinity of the second POS terminal, manipulating the user input on the portable electronic device to select the second media for use in a second transaction at the second POS terminal;
(H1) causing the token to embody at least a portion of the second account information;
(H2) after performing the step (H1), detaching the token from the portable electronic device, with the token continuing to embody at least the portion of the second account information after the token has been detached from the portable electronic device;
(H3) after performing the step (H2), and when the token is still detached from the portable electronic device, interfacing the token with the second POS terminal and transferring at least the portion of the second account information from the token to the second POS terminal; and
(H4) after performing the step (H3), re-attaching the token to the portable electronic device.

2. The method of claim 1, further comprising steps of:
(I) employing a user-authenticator included in the first portable electronic device to authenticate an identity of a user of the first portable electronic device; and
(J) enabling each of the steps (E2) and (H2) to be performed only after the user authenticator has authenticated the identity of the user.

3. The method of claim 2, wherein the step (I) comprises:
measuring a biometric characteristic of the user of the portable electronic device; and
comparing the measured biometric characteristic with a representation of a biometric characteristic stored in memory of the portable electronic device.

4. The method of claim 1, wherein the first and second media issuers are unrelated.

5. The method of claim 1, further comprising steps of:
(I) storing at least third account information for a third media issued by a third media issuer and fourth account information for a fourth media issued by a fourth media issuer in the database so that the first account information, second account information, third account information, and fourth account information exist simultaneously in the database;
(J) establishing a second communication link via a non-dedicated public communications channel between the controller associated with the database and a second portable electronic device distinct and remotely located from the database, and transferring at least the third account information and the fourth account information from the database to a memory of the second portable electronic device via the second communication link so that at least the third account information and the fourth account information are caused to exist simultaneously in the memory of the second portable electronic device;
(K) transporting the second portable electronic device to a vicinity of a third POS terminal;
(L) when the second portable electronic device is in the vicinity of the third POS terminal, manipulating a user input of the second portable electronic device to select the third media for use in a third transaction at the third POS terminal;
(M1) causing a second token attached to the second portable electronic device to embody at least a portion of the third account information;
(M2) after performing the step (M1), detaching the second token from the second portable electronic device, with the second token continuing to embody at least the portion of the third account information after the second token has been detached from the second portable electronic device;
(M3) after performing the step (M2), and when the second token is still detached from the second portable electronic device, interfacing the second token with the third POS terminal and transferring at least the portion of the third account information from the second token to the third POS terminal;
(M4) after performing the step (M3), re-attaching the second token to the second portable electronic device;
(N) transporting the second portable electronic device to a vicinity of a fourth POS terminal;
(O) when the second portable electronic device is in the vicinity of the fourth POS terminal, manipulating the user input on the second portable electronic device to select the fourth media for use in a fourth transaction at the fourth POS terminal;

(P1) causing the second token to embody at least a portion of the fourth account information;

(P2) after performing the step (P1), detaching the second token from the second portable electronic device, with the second token continuing to embody at least the portion of the fourth account information after the second token has been detached from the second portable electronic device;

(P3) after performing the step (P2), and when the second token is still detached from the second portable electronic device, interfacing the second token with the fourth POS terminal and transferring at least the portion of the fourth account information from the second token to the fourth POS terminal; and (P4) after performing the step (P3), re-attaching the second token to the second portable electronic device.

6. The method of claim 1, wherein the step (E1) further comprises causing the token to embody at least the portion of the first account information so that at least the portion of the first account information can be read from the token by a magnetic stripe reader.

7. The method of claim 6, wherein the step (E1) further comprises causing a simulated magnetic stripe to be generated on the token.

8. The method of claim 1, further comprising steps of:

(I) employing a user-authenticator included in the first portable electronic device to authenticate an identity of a user of the first portable electronic device; and (J) enabling the transfer of at least the first account information and the second account information from the database to the memory of the portable electronic device to be performed only after the user authenticator has authenticated the identity of the user.

9. The method of claim 8, wherein the first and second media issuers are unrelated, and the method further comprises steps of:

enabling the transfer of the first account information from the database to the memory of the portable electronic device to be performed only after the controller associated with the database has received an authorization signal from the first media issuer; and enabling the transfer of the second account information from the database to the memory of the portable electronic device to be performed only after the controller associated with the database has received an authorization signal from the second media issuer.

10. The method of claim 1, wherein the first and second media issuers are unrelated, and the method further comprises steps of:

enabling the transfer of the first account information from the database to the memory of the portable electronic device to be performed only after the controller associated with the database has received an authorization signal from the first media issuer; and enabling the transfer of the second account information from the database to the memory of the portable electronic device to be performed only after the controller associated with the database has received an authorization signal from the second media issuer.

11. The method of claim 1, wherein the communications link comprises a secure communications link.

12. A method, comprising steps of:

(A) storing a first version of information including at least first account information for a first media issued by a first media issuer and second account information for a second media issued by a second media issuer in a memory of a portable electronic device so that at least the first account information and the second account information exist simultaneously in the memory;

(B) storing a second version of information including at least the first account information and the second account information in a database in communication with a transfer server distinct and remotely located from the portable electronic device so that at least the first account information and the second account information exist simultaneously in the database;

(C) transporting the portable electronic device to a vicinity of a first point-of-sale (POS) terminal;

(D) when the portable electronic device is in the vicinity of the first POS terminal, manipulating a user input on the portable electronic device to select the first media for use in a first transaction at the first POS terminal;

(E1) causing a token attached to the portable electronic device to embody at least a portion of the first account information;

(E2) after performing the step (E1), detaching the token from the portable electronic device, with the token continuing to embody at least the portion of the first account information after the token has been detached from the portable electronic device;

(E3) after performing the step (E2), and when the token is still detached from the portable electronic device, interfacing the token with the first POS terminal and transferring at least the portion of the first account information from the token to the first POS terminal;

(E4) after performing the step (E3), reattaching the token to the portable electronic device;

(F) transporting the portable electronic device to a vicinity of a second POS terminal;

(G) when the portable electronic device is in the vicinity of the second POS terminal, manipulating the user input on the portable electronic device to select the second media for use in a second transaction at the second POS terminal;

(H1) causing the token to embody at least a portion of the second account information;

(H2) after performing the step (H1), detaching the token from the portable electronic device, with the token continuing to embody at least the portion of the second account information after the token has been detached from the portable electronic device;

(H3) after performing the step (H2), and when the token is still detached from the portable electronic device, interfacing the token with the second POS terminal and transferring at least the portion of the second account information from the taken to the second POS terminal;

(H4) after performing the step (H3), re-attaching the token to the portable electronic device;

(I) altering one of the first version of information stored in the memory of the portable electronic device and the second version of information stored in the database; and (J) establishing a communication link via a non-dedicated public communications channel between a controller associated with the database and the portable electronic device, and communicating commands between the controller associated with the database and the portable electronic device that cause the alteration in the one of the first version of information stored in the memory of the portable electronic device and the second version of information stored in the database to be reflected in the other of the first version of information stored in the memory of the portable electronic device and the second version of information stored in the database.

13. The method of claim 12, further comprising steps of:
(K) employing a user-authenticator included in the portable electronic device to authenticate an identity of a user of the portable electronic device; and
(L) enabling each of the steps (E2) and (H2) to be performed only after the user authenticator has authenticated the identity of the user.

14. The method of claim 13, wherein the step (K) comprises:
measuring a biometric characteristic of the user of the portable electronic device; and
comparing the measured biometric characteristic with a representation of a biometric characteristic stored in memory of the portable electronic device.

15. The method of claim 12, wherein the first and second media issuers are unrelated.

16. The method of claim 12, wherein the step (E1) further comprises causing the token to embody at least the portion of the first account information so that at least the portion of the first account information can be read from the token by a magnetic stripe reader.

17. The method of claim 16, wherein the step (E1) further comprises causing a simulated magnetic stripe to be generated on the token.

18. The method of claim 12, further comprising steps of:
(K) employing a user-authenticator included in the first portable electronic device to authenticate an identity of a user of the first portable electronic device; and
(L) enabling the communication of commands between the controller associated with the database and the portable electronic device that cause the alteration in the one of the first version of information stored in the memory of the portable electronic device and the second version of information stored in the database to be reflected in the other of the first version of information stored in the memory of the portable electronic device and the second version of information stored in the database to take place only after the user authenticator has authenticated the identity of the user.

19. The method of claim 12, wherein the communications link comprises a secure communications link.

20. A system, comprising:
a transferring server comprising a database and a database controller, the database having stored therein so as to be accessible by the database controller at least first account information for a first media issued by a first media issuer and second account information for a second media issued by a second media issuer; and
a portable electronic device, distinct and remotely located from the network server, comprising a device controller, a memory, a user input device, a port, and a token releasably retained in the port, the device controller being configured to establish a communication link with the network server via a non-dedicated public communications channel and to enable a transfer of at least the first account information and the second account information from the database to the memory of the portable electronic device via the communication link, the device controller being further configured to select one of the first media and the second media for use in a transaction at a point-of-sale (POS) terminal in response to manipulation of the user input device, and to cause the token to embody at least a portion of the one of the first account information and the second account information that corresponds to the selected one of the first media ard the second media, the token being configured so that after the token is released from the port, the token can be interfaced with the POS terminal to transfer the information embodied by the token to the POS terminal.

21. The system of claim 20, wherein the portable electronic device further comprises a user-authenticator to authenticate an identity of a user of the portable electronic device, and the device controller is configured to enable the token embodying the one of the first account information and the second account information to be released from the port only after the user authenticator has authenticated the identity of the user.

22. The method of claim 21, wherein the user authenticator is configured to analyze a biometric characteristic of the user.

23. The system of claim 20, wherein the first and second media issuers are unrelated.

24. The system of claim 20, wherein the device controller is further configured to cause the token to embody at least the portion of the one of the first account information and the second account information that corresponds to the selected one of the first media and the second media so that the information embodied by the token can be read by a magnetic stripe reader included in the POS terminal.

25. The system of claim 24, wherein the device controller is further configured to cause the token to generate a simulate magnetic stripe that represents at least the portion of the one of the first account information and the second account information that corresponds to the selected one of the first media and the second media.

26. The system of claim 20, wherein the portable electronic device further comprises a user-authenticator to authenticate an identity of a user of the portable electronic device, and wherein the network server is configured to enable the transfer of at least the first account information and the second account information from the database to the memory of the portable electronic device to be performed only after the user authenticator has authenticated the identity of the user.

27. The system of claim 26, wherein the first and second media issuers are unrelated, and wherein the network server is further configured to enable the transfer of the first account information from the database to the memory of the portable electronic device to be performed only after the database controller has received an authorization signal from the first media issuer, and to enable the transfer of the second account information from the database to the memory of the portable electronic device to be performed only after the database controller has received an authorization signal from the second media issuer.

28. The system of claim 20, wherein the first and second media issuers are unrelated, and wherein the network server is further configured to enable the transfer of the first account information from the database to the memory of the portable electronic device to be performed only after the database controller has received an authorization signal from the first media issuer, and to enable the transfer of the second account information from the database to the memory of the portable electronic device to be performed only after the database controller has received an authorization signal from the second media issuer.

29. The system of claim 20, wherein the communications link comprises a secure communications link.

30. A system, comprising:
a transferring server comprising a database controller in communication with a database, the database having stored therein a first version of information including at least first account information for a first media issued by a first media issuer and second account information for a second media issued by a second media issuer; and a portable electronic device, distinct and remotely located from the network server, comprising a device controller, a memory, a user input device, a port, and a token releasably retained in the port, the memory having stored therein a second version of information including at least the first account information and the second account information, the device controller being configured to establish a communication link with the network server via a non-dedicated public communications channel and to enable communication of commands between the database controller and the device controller that cause alterations in one of the first version of information stored in the database and the second version of information stored in the memory to be reflected in the other of the first version of information stored in the database and the second version of information stored in the memory, the device controller being further configured to select one of the first media and the second media for use in a transaction at a point-of-sale (POS) terminal in response to manipulation of the user input device, and to cause the token to embody at least a portion of the one of the first account information and the second account information that corresponds to the selected one of the first media and the second media, the token being configured so that, after the token is released from the port, the token can be interfaced with the POS terminal to transfer the information embodied by the token to the POS terminal.

31. The system of claim 30, wherein the portable electronic device further comprises a user-authenticator to authenticate an identity of a user of the portable electronic device, and the device controller is configured to enable the token embodying the one of the first account information and the second account information to be released from the port only after the user authenticator has authenticated the identity of the user.

32. The system of claim 31, wherein the user authenticator is configured to analyze a biometric characteristic of the user.

33. The system of claim 30, wherein the device controller is further configured to cause the token to embody at least the portion of the one of the first account information and the second account information that corresponds to the selected one of the first media and the second media so that the information embodied by the token can be read by a magnetic stripe reader included in the POS terminal.

34. The system of claim 33, wherein the device controller is further configured to cause the token to generate a simulate magnetic stripe that represents at least the portion of the one of the first account information and the second account information that corresponds to the selected one of the first media and the second media.

35. The system of claim 30, wherein the first and second media issuers are unrelated.

36. The system of claim 30, wherein the portable electronic device further comprises a user-authenticator to authenticate an Identity of a user of the portable electronic device, and the network server is configured to enable communication of commands between the database controller and the device controller that cause alterations in one of the first version of information stored in the database and the second version of information stored in the memory to be reflected in the other of the first version of information stored in the database and the second version of information stored in the memory to take place only after the user authenticator has authenticated the identity of the user.

37. The system of claim 30, wherein the communications link comprises a secure communications link.

38. A system, comprising:

a transferring server in communication with a database having stored therein at least first account information for a first media issued by a first media issuer and second account information for a second media issued by a second media issuer;

a portable electronic device, distinct and remotely located from the database, comprising a memory, a port, and a token releasably retained in the port;

means for establishing a communication link via a non-dedicated public communications channel between a controller associated with the database and the portable electronic device, and for transferring at least the first account information and the second account information from the database to the memory of the portable electronic device via the communication link so that at least the first account information and the second account information are caused to exist simultaneously in the memory of the portable electronic device;

means for selecting one of the first media and the second media for use in a transaction at a point-of-sale (POS) terminal;

means for causing the token to embody at least a portion of one of the first account information and the second account information that corresponds to the selected one of the first media and the second media; and means for releasing the token from the port so that the token can be used to authorize the transaction at the POS terminal.

39. A system, comprising:

a portable electronic device comprising a memory having stored therein a first version of information including at least first account information for a first media issued by a first media issuer and second account information for a second media issued by a second media issuer, means for selecting one of the first media and the second media for use in a transaction at a point-of-sale (POS) terminal, a port, a token releasably retained in the port, means for causing the token to embody at least a portion of one of the first account information and the second account information that corresponds to the selected one of the first media and the second media, and means for releasing the token from the port so that the token can be used to authorize the transaction at the POS terminal;

a transferring server in communication with a database, distinct and remotely located from the portable electronic device, having stared therein a second version of information including at least the first account information and the second account information; and means for establishing a communication link via a non-dedicated public communications channel between a controller associated with the database and the portable electronic device, and for causing alterations In one of the first version of information stored in the portable electronic device and the second version of information stored in the database to be reflected in the other of the first version of information stored in the portable electronic device and the second version of information stored in the database.

* * * * *